Figure 1A:
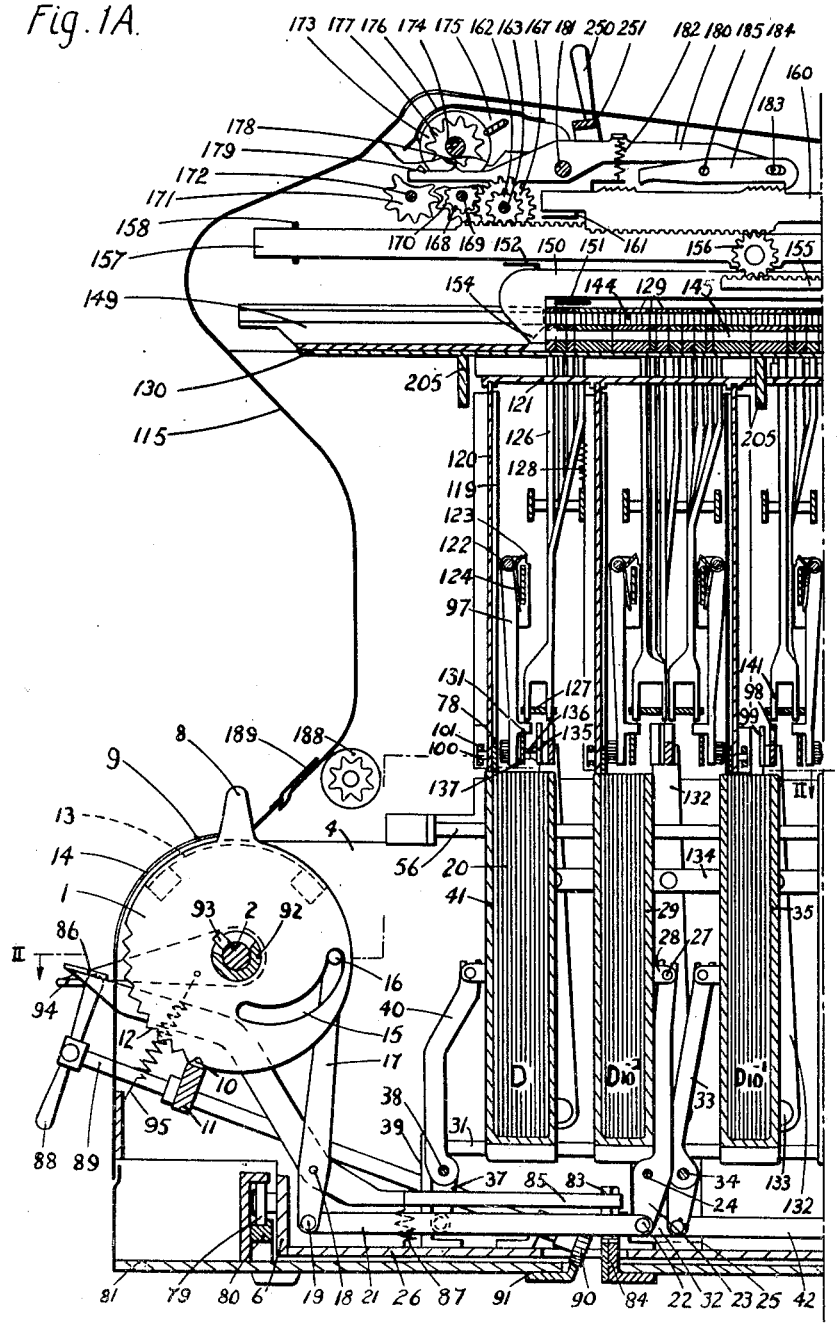

March 28, 1950 D. BROIDO 2,501,929
CALCULATING MACHINE
Filed Jan. 24, 1947 12 Sheets-Sheet 2

Inventor
Daniel Broido.
by
A. Knight Broad
Attorney

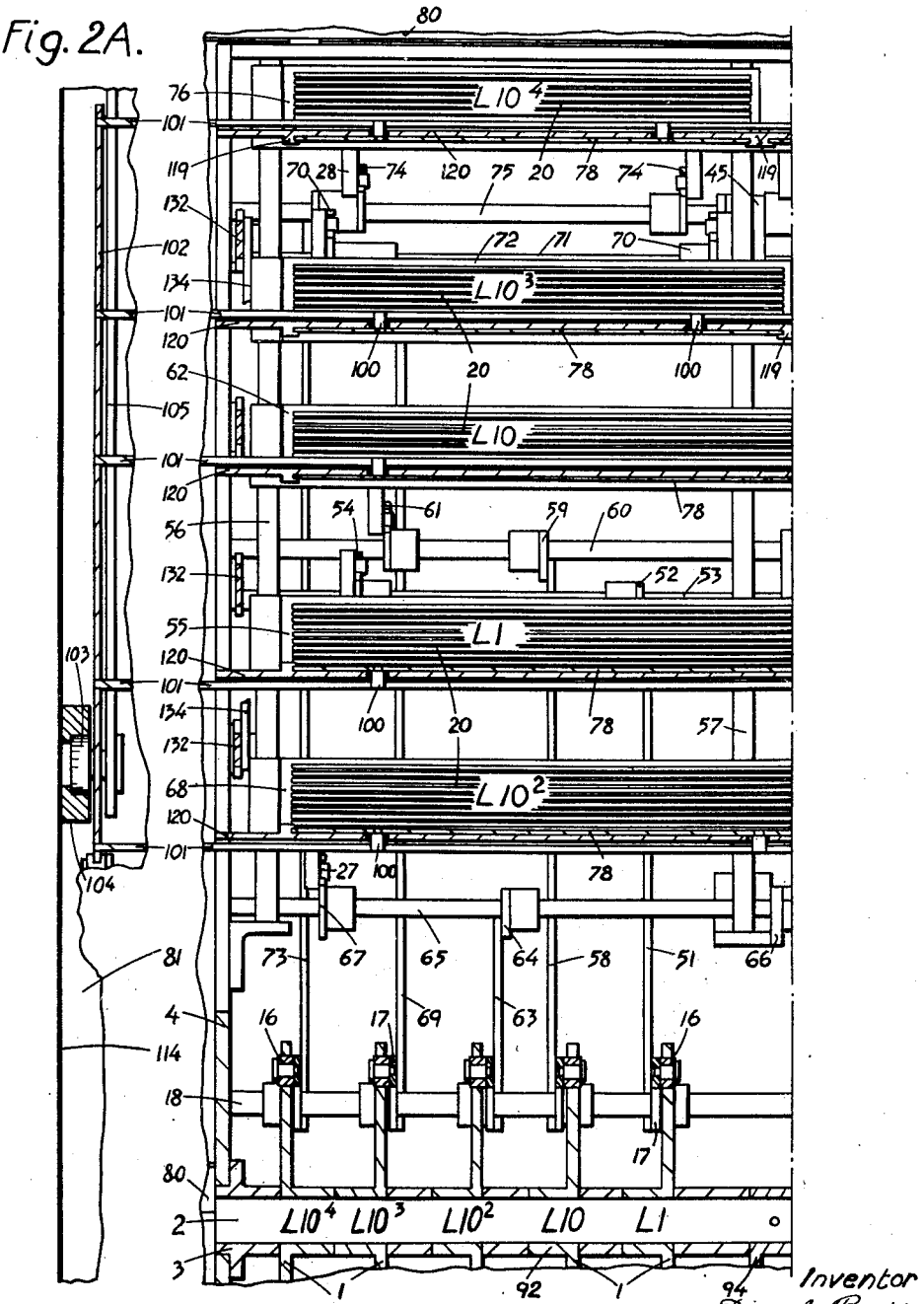

March 28, 1950     D. BROIDO     2,501,929
CALCULATING MACHINE

Filed Jan. 24, 1947     12 Sheets-Sheet 5

Inventor
Daniel Broido
by
A. Knight Leroad
Attorney

March 28, 1950   D. BROIDO   2,501,929
CALCULATING MACHINE
Filed Jan. 24, 1947   12 Sheets-Sheet 6

Inventor
Daniel Broido.
by
A. Knight Croad
Attorney

March 28, 1950 D. BROIDO 2,501,929
CALCULATING MACHINE
Filed Jan. 24, 1947 12 Sheets-Sheet 7
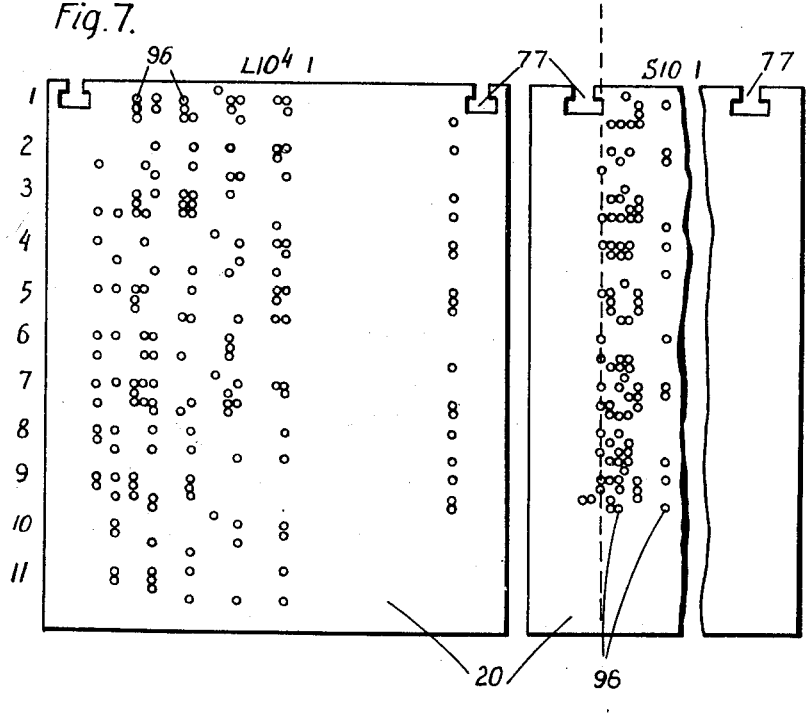
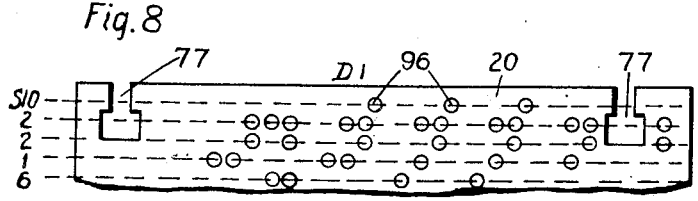
Inventor
Daniel Broido
by
A. Knight Croad
Attorney March 28, 1950  D. BROIDO  2,501,929
CALCULATING MACHINE
Filed Jan. 24, 1947  12 Sheets-Sheet 9

Inventor
Daniel Broido
by A. Knight Conrad
Attorney

March 28, 1950     D. BROIDO     2,501,929
CALCULATING MACHINE

Filed Jan. 24, 1947     12 Sheets—Sheet 10

Inventor
Daniel Broido
by
A. Knight Lewads
Attorney

March 28, 1950     D. BROIDO     2,501,929
CALCULATING MACHINE
Filed Jan. 24, 1947     12 Sheets-Sheet 12

Inventor
Daniel Broido
by A. Knight Leroad
Attorney

Patented Mar. 28, 1950

2,501,929

UNITED STATES PATENT OFFICE 2,501,929

CALCULATING MACHINE

Daniel Broido, Cockfosters, near Barnet, England

Application January 24, 1947, Serial No. 724,199
In Great Britain February 1, 1946

8 Claims. (Cl. 235—61)

This invention relates to calculating machines for non-uniform numerical systems comprising interrelated sets of units, such as pounds, shillings, pence, and fractions of a penny.

In the specification to my prior British Patent No. 566,942 there is described a machine of this type suitable inter alia for multiplication of sterling amounts by decimal amounts. In this machine, the set-up values of the sterling factor and the decimal multiples thereof are represented by suitably notched plates mounted on a carriage shiftable transversely of the stationary totalising register for the purpose of selecting those representations which correspond to the denomination of the respective multiplier digit, the machine being operated repeatedly in accordance with the multiplier digit. Thus, in order to multiply by 700, the carriage is shifted into the hundreds position, and the main operating shaft is rotated seven times. Calculating machines of this type are commonly known as repeated-addition machines.

In the specification to my prior British Patent No. 575,324 there is described a machine suitable, inter alia not only for multiplication of sterling by decimal amounts, but vice versa. This machine is similar to that described in the first-mentioned patent specification insofar as it is a repeated-addition machine with representations of decimal (or non-decimal) multiples mounted on a shiftable carriage.

In the specification to my prior British Patent No. 577,330 there is described a calculating machine suitable for the decimal numerical system only. In this machine, notched plates representing the partial products of the set-up values are mounted on a carriage shiftable transversely of the stationary totalising register in accordance with the denominations of the second factor. The first factor and one digit at a time of the second factor are set up prior to the operation of the machine, which operation involves only a single cycle irrespective of the multiplier digit. Thus in order to multiply by 700, the digit 7 is set up, the carriage is shifted into the hundreds position, and the main operating shaft is rotated once. Calculating machines of this type are commonly known as partial products machines.

The present invention contemplates a combination of a machine suitable for non-uniform numerical systems such as described in the first mentioned patent specification and/or in the second mentioned patent specification with a single-cycle operation such as described in the third mentioned patent specification. Such a combination involves the provision of means for storing a considerable number of representations of partial products.

The main object of the present invention is to devise a calculating machine suitable for multiplication of a non-uniform factor by a decimal amount, or vice versa, the multiplication by any digit being effected in a single operation irrespective of the digit of the multiplier.

Another object is to devise a machine suitable for division of a non-uniform amount by another non-uniform amount or by a decimal factor, the division by any set-up digit being effected in a single operating cycle.

A further object is to devise a machine for calculations involving non-uniform and decimal factors, comprising stored representations of products of all digits of all denominations of the first factor multiplied, respectively, by all digits of all denominations of the second factor, the said products being expressed in the final denominations.

Further objects will become apparent as the description proceeds.

With these objects in view, a machine made according to the present invention for calculations involving non-uniform and decimal factors comprises stored representations of products of all digits of all denominations of the first factor multiplied, respectively, by all digits of all denominations of the second factor, said products being expressed in the final denominations, a first set-up mechanism for selecting for operation representations corresponding to the desired digits of the desired denominations of the first factor, a second set-up mechanism for selecting for operation representations corresponding to the desired digit of the second factor, a third set-up mechanism for selecting for operation representations corresponding to the desired denomination of the second factor, means for sensing the selected representations, a totalizing register, value-entering means for entering the sensed values either additively or subtractively into the totalizing register, and operating means for actuating the said sensing means and the said value-entering means once during multiplication or division by set-up digit of the second factor.

In a preferred embodiment of the invention adapted for the sterling numerical system the set-up mechanism has a capacity of £99,999:19:11.99d. for sterling values; the pounds section of the set-up mechanism may be used for decimal factors, which thus may go up to 99,999. The set-up factor, such as multiplicand, dividend, or divisor, will be referred to generally as the first factor, while the second factor refers generally to multiplier or quotient. The capacity of the machine for decimal second factors is 9,999,999.9999, and for sterling second factors £9,999,999:19:11⅞d.

Provision is made for the following operations: multiplication of sterling multiplicands by decimal multipliers (whole numbers) and vice-versa; multiplication of sterling amounts by decimal fractions; multiplication of two decimal factors; division of sterling dividends by sterling divisors, of sterling dividends by decimal divisors, and of decimal dividends by decimal divisors. Multiplication and division by any set-up digit requires only a single operating cycle. Addition and subtraction is performed as multiplication by 1, the amount being entered into the totalizing register subtractively in the case of subtraction.

The main feature of the present invention is the provision of representations of all products of the set-up values multiplied by all digits of all denominations of the second factor, within the machine capacity, the said products being expressed in the final denominations.

For convenience, the following abbreviations are used in the specification:

*Set-up (first) factor*

$D10^{-2}$ indicates hundredths-of-penny denomination .00d. to .09d.
$D10^{-1}$ indicates tenths-of-penny denomination .0d. to .9d.
D indicates pence denomination 0d. to 11d.
S1 indicates units of shillings denomination 0/— to 9/—
S10 indicates tens of shillings denomination 00/— and 10/—
L1 indicates units of pounds denomination £0 to £9
L10 indicates tens of pounds denomination £00 to £90
$L10^2$ indicates hundreds of pounds denomination £000 to £900
$L10^3$ indicates thousands of pounds denomination £0,000 to £9,000
$L10^4$ indicates ten-thousands of pounds denomination £00,000 to £90,000

*Second factor*

0 indicates units denomination ($10^0$) 1 to 9
+1 indicates tens denomination ($10^1$) 10 to 90
+2 indicates hundreds denomination ($10^2$) 100 to 900
+3 indicates thousands denomination ($10^3$) 1,000 to 9,000
+4 indicates ten-thousands denomination ($10^4$) 10,000 to 90,000
+5 indicates hundred-thousands denomination ($10^5$) 100,000 to 900,000
+6 indicates millions denomination ($10^6$) 1,000,000 to 9,000,000
−1 indicates tenths denomination ($10^{-1}$) .1 to .9
−2 indicates hundredths denomination ($10^{-2}$) .01 to .09
−3 indicates thousandths denomination ($10^{-3}$) .001 to .009
−4 indicates tenths-of-thousandths denomination ($10^{-4}$) .0001 to .0009
S10 indicates tens of shillings denomination 10/—
S1 indicates units of shillings denomination 1/— to 9/—
D indicates pence denomination 1d. to 11d.
D/8 indicates eighths-of-penny denomination ⅛d. to ⅞d.

The products of all values listed above are shown in Tables $D10^{-2}$ to $L10^4$ hereinafter contained. In Tables $D10^{-2}$ and $D10^{-1}$ the products by −1 to −4 denominations are omitted, since their digital value is the same as in the case of the 0 (units) denomination only the decimal point being displaced to the left. Similarly, columns −3 and −4 are omitted in Tables S1 and S10. Columns +1 to +6 are omitted in Tables L1 to $L10^4$, since their digital value is the same as in the case of the 0 column, a zero being added on the right of the respective product in each successive column. The left-hand column in each table shows the multiplier digits.

As already mentioned, the pounds section of the set-up mechanism may be used for decimal first factors. Consequently, columns S10 to $D/8$ in Tables L1 to $L10^4$ show the products of the respective decimal values multiplied by the various sterling values. Thus, a multiplication 99,999 × ⅛d. involves the following products:

| | | |
|---|---|---|
| 90,000×⅛d.=£46:17:6d. | Table $L10^4$ 9 |
| 9,000×⅛d.= £4:13:9d. | Table $L10^3$ 9 |
| 900×⅛d.= 9/4.5d. | Table $L10^2$ 9 |
| 90×⅛d.= 11.25d. | Table L10 9 |
| 9×⅛d.= 1.125d. | Table L1 9 |

99,999×⅛d.=£52: 1:7.875d.

The machine about to be described does not provide for multiplication of sterling amounts by sterling amounts, although a machine suitable for such calculations may be constructed according to the present invention. All the numerical values shown in the above tables are represented and stored in the machine, but it will be understood from the following description that a single representation of a certain value may be used repeatedly to represent the same digit of various associated denominations. Thus, in Table $D10^{-2}$ 1 columns 0 and +1, top row, show .01d. and .1d. as the product .01d.×1 and .01d.×10, respectively. Both products contain the digit 1, but in one case this 1 is one hundredth of a penny, and in the other case it is one tenth of a penny. This 1 is represented in the machine but once, provision being made for entering it into the correct denominational registering wheel of the totaliser, as will be fully described hereafter.

In operation, the required representations are selected from the great number of stored representations firstly by selecting representations associated with the required digits and denominations of the first factor; secondly, by selecting from the first-selected representations those associated with the required denomination of the second factor; and thirdly, by selecting from the second-selected representations those associated with the required digit of the second factor. "Digit" is meant to signify any digital value of a certain denomination; thus, the D denomination has twelve digits 0–11, the S10 denomination has two digits 0 and 1, the $D/8$ denomination has eight digits 0–⅞, while all the remaining denominations each have ten digits 0–9.

Figure 1B:
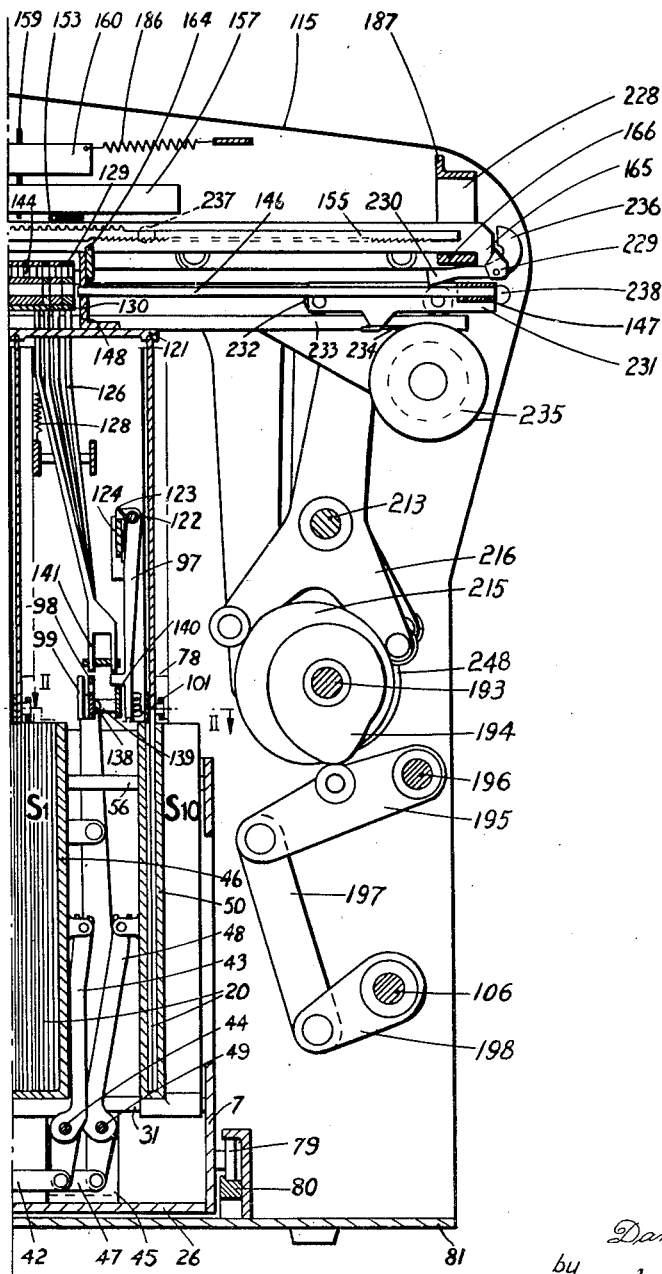
Figure 2B:
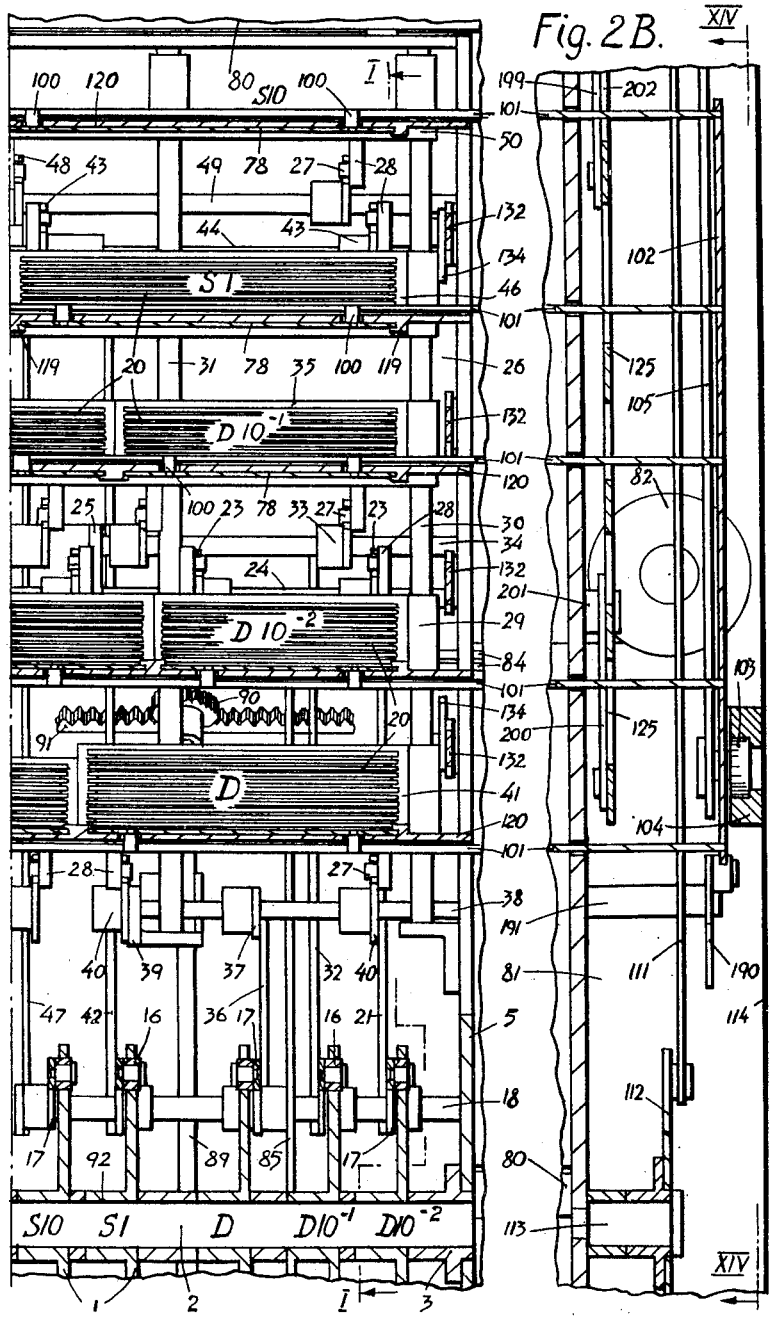
Figure 3:
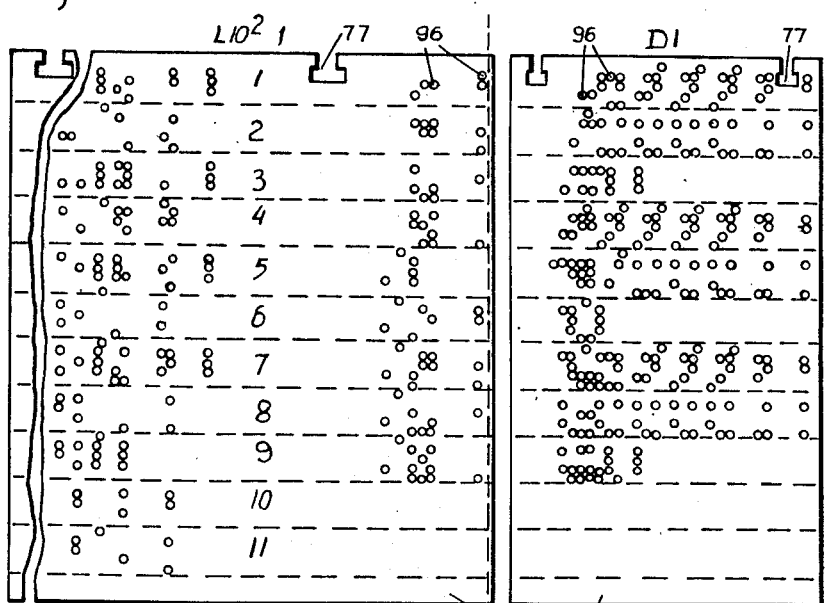
Figure 4:
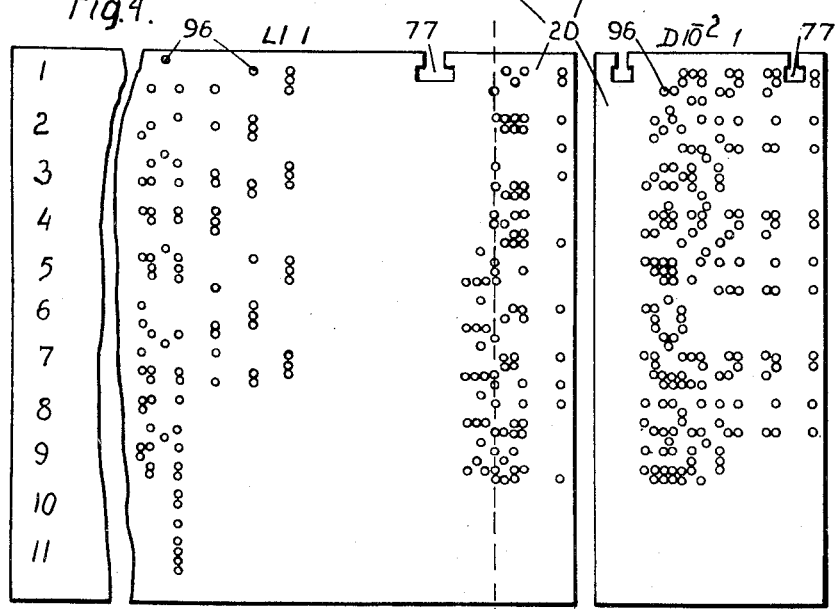
Figure 5:
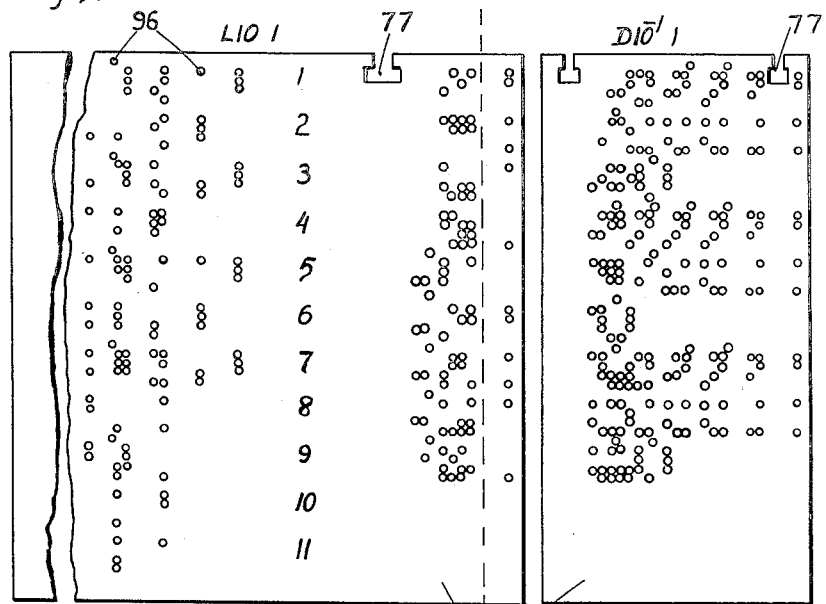
Figure 6:
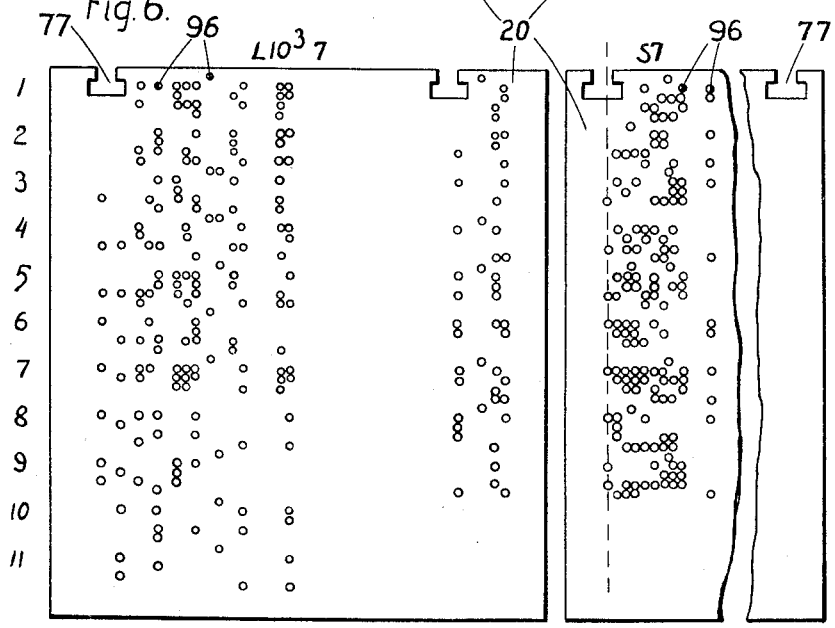

In the accompanying drawings which illustrate a preferred embodiment of the invention:

Figures 1A, 1B together constitute a vertical section of the machine on line I—I of Figure 2B, on a slightly smaller scale, Figures 2A, 2B together constitute a horizontal section on line II—II of Figures 1A, 1B, Figures 3 to 7 show some perforated plates, representing the partial products of the first, second, third, fourth, and fifth bank, respectively.

Figure 9:
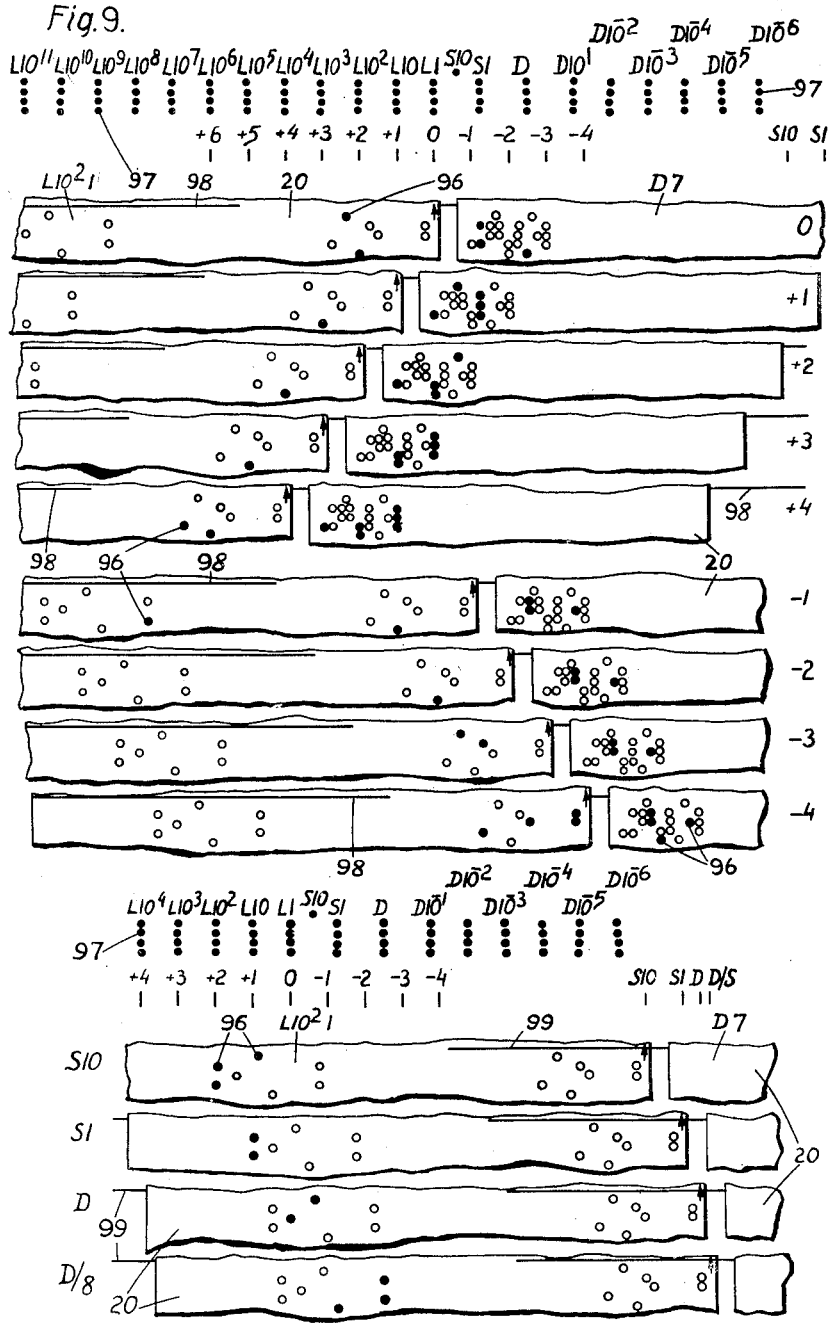
Figure 10:
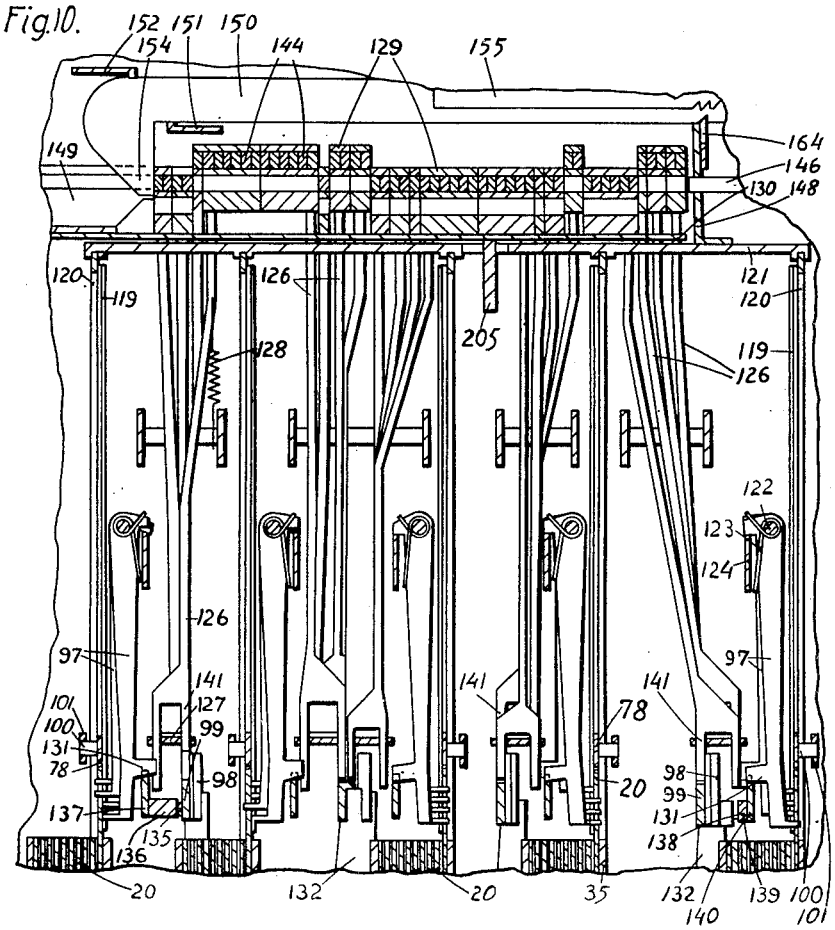
Figure 11:
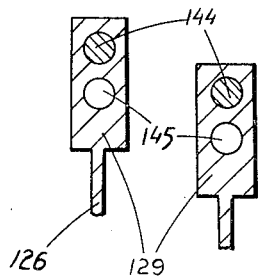
Figure 12:
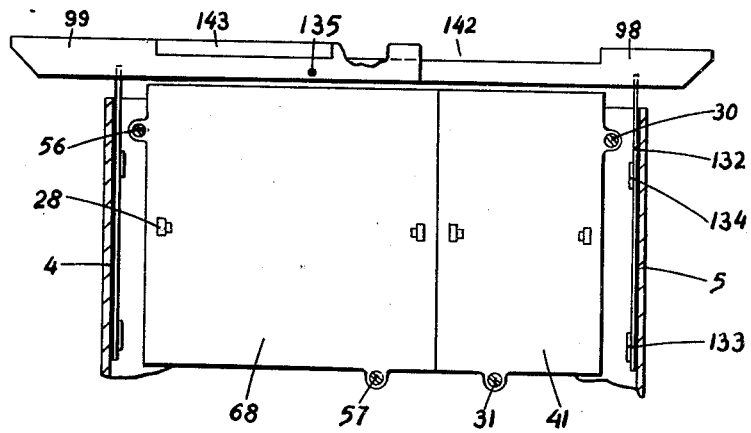

Figure 8 shows, on a larger scale, a portion of a perforated plate,

Figure 9 illustrates diagrammatically the co-operation of the perforated plates with the sensing mechanism, Figure 10 is a vertical section through the pence sensing and value-entering mechanism showing the positions of parts at the end of the sensing operation, Figure 11 shows parts of the differential mechanism, on a larger scale, Figure 12 is a front elevation of the containers for perforated plates and of the locking bars of the first bank.

Figure 13:
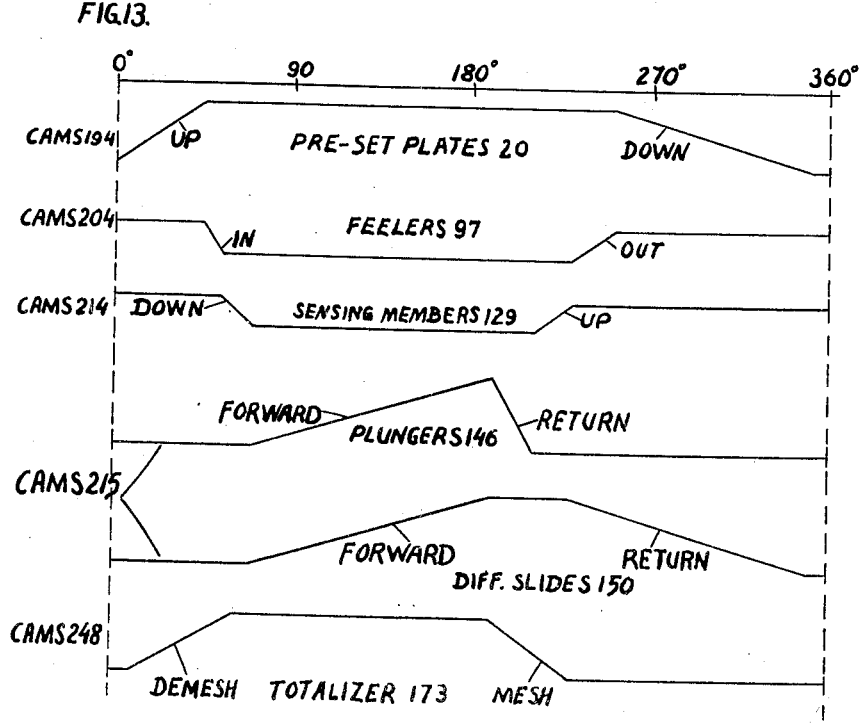

Figure 13 is a timing chart, and

Figure 14A:
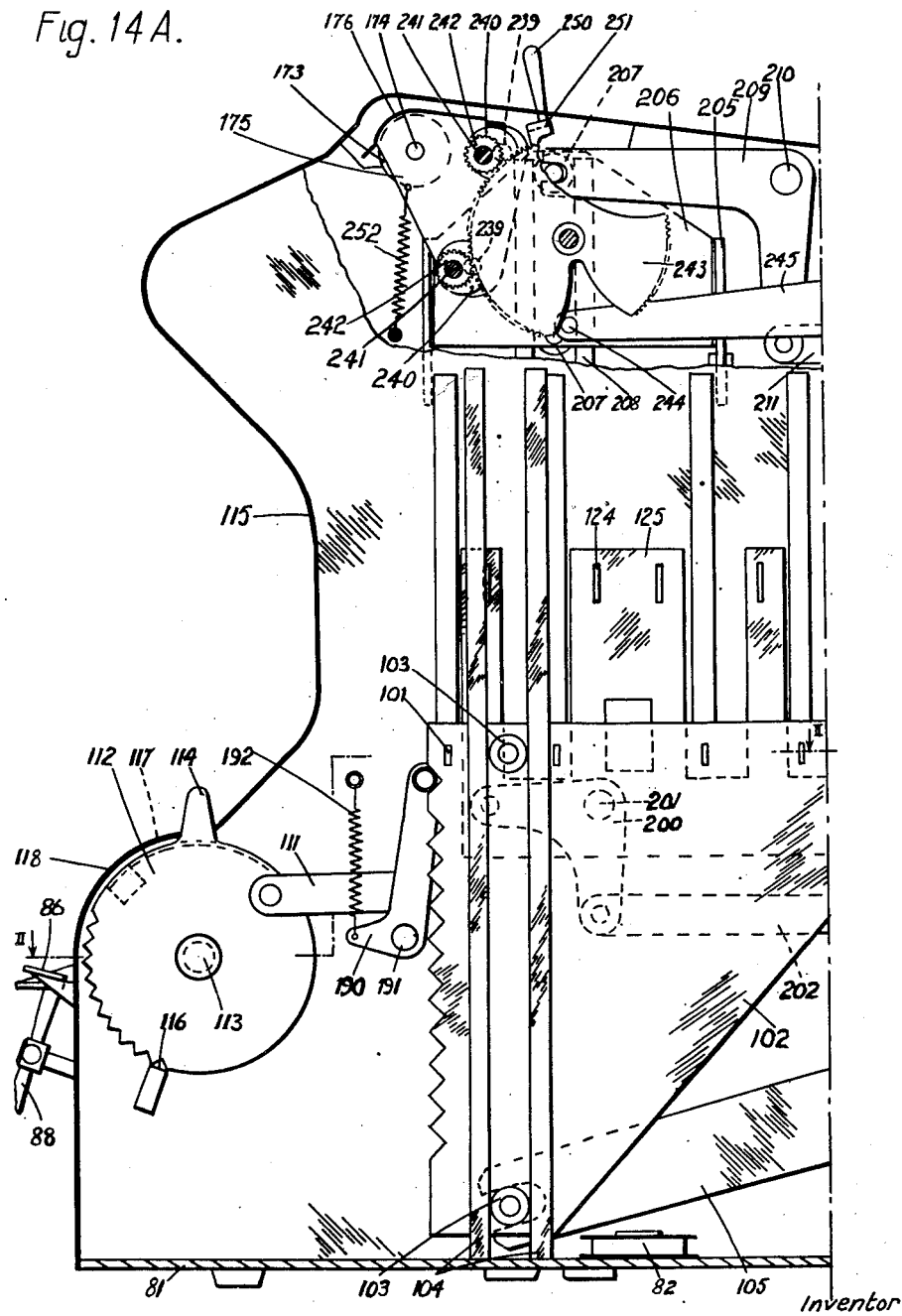
Figure 14B:
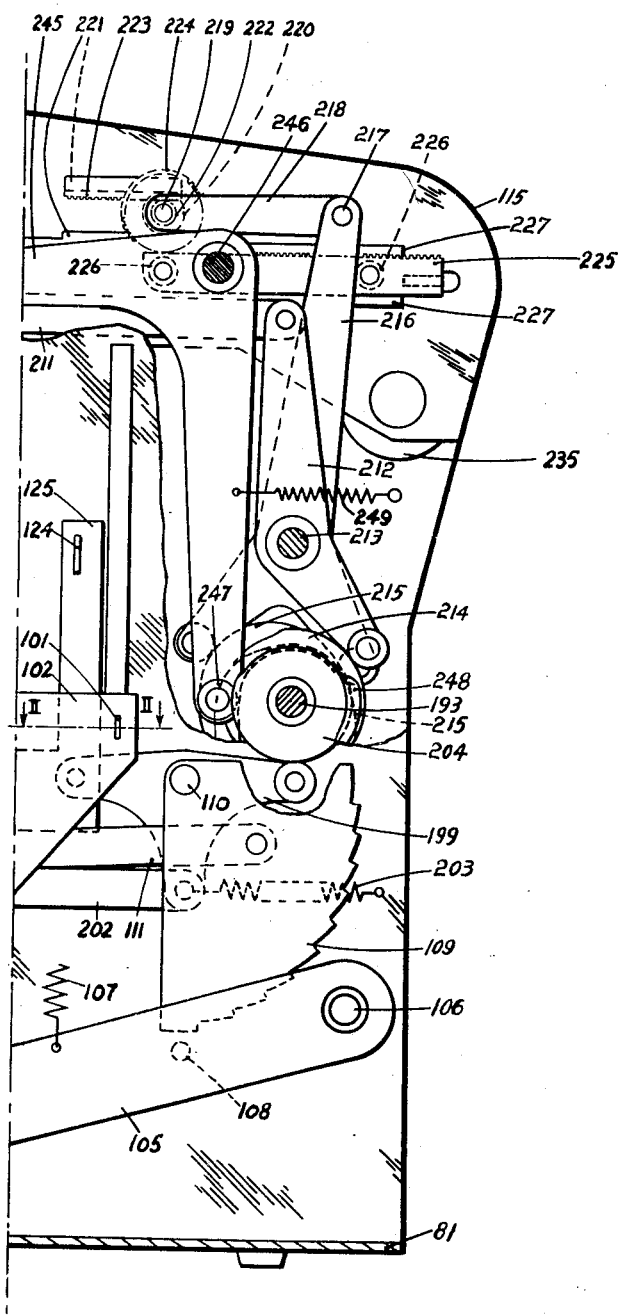

Figures 14A, 14B together constitute a section, similar to Figures 1A, 1B, on line XIV—XIV of Figure 2B, a portion of the supporting structure being broken away to show the operating mechanism.

*Set-up mechanism for the first factor and denominational set-up mechanism for the second factor*

The values of the first factor are set up on discs 1, Figures 1A, 2A, 2B, rotatable on a shaft 2 journalled in bearings 3 in side plates 4, 5 which are interconnected by a number of crossbars such as 6, 7 to form a rigid structure serving as a carriage. Each setting disc 1 has a finger tip 8 protruding through a slot in the carriage cover 9; numerals indicating the position of finger tips 8 may be arranged on the carriage cover along the respective slots. Each setting disc 1 is located by a spring-loaded ball 10 in a housing 11 secured in the carriage structure; balls 10 coact with teeth 12 formed on discs 1. A strip 13 fixed to each disc 1 has numerals visible through an aperture 14 in the carriage cover 9. There are two setting discs 1 associated respectively with $D10^{-2}$ and $D10^{-1}$ denominations and settable in ten positions 0–9; a disc 1 associated with D denomination and settable in twelve positions 0–11; a disc of the S1 denomination settable in ten positions 0–9; a disc of the S10 denomination settable in two positions 0 and 10; and five setting discs 1 associated respectively with denominations L1 to $L10^4$ and settable in ten positions 0–9. Each setting disc 1 has a slot 15 of suitable length engaged by a roller 16 journalled in a lever 17 rockable on a shaft 18 fixedly supported in the carriage structure 4, 5. A connecting rod pivoted as at 19 to each lever 17 serves to move a set of perforated plates 20 fully described hereafter. There is one set of plates 20 associated with each set-up denomination $D10^{-2}$ to $L10^4$, the number of plates 20 within each set being equal to the number of digits in the respective denomination. Thus, the D set has twelve plates, the S10 set has two plates, and each of the remaining sets comprises ten plates 20.

The set of plates 20 are arranged in five banks clearly shown in Figures 1A, 1B, 2A, 2B. Considering first the $D10^{-2}$ denomination its lever 17 is linked at 19 to a connecting rod 21 linked at 22 to the lower end of one of two forks 23 fixedly mounted on a shaft 24 journalled in carriage plate 5 and in a bracket 25 fixed to the carriage base 26. Forks 23 engage pins 27 fixed in lugs 28 formed on a container 29 of the second bank. Container 29 is mounted for horizontal movement on rods 30, 31 fixedly supported in the carriage structure. When the setting disc 1 of the $D10^{-2}$ denomination is rocked into the position in which the desired number appears in the respective aperture 14, container 29 is moved forward (to the left as viewed in Figure 1A) by its forks 23 and rod 21 a corresponding number of steps, so that the perforated plate 20 associated with this particular numeral is brought into a working position, in readiness to be engaged by the setting means for the second factor, as will be described in due course. Similarly the $D10^{-1}$ setting disc 1 is linked by a connecting rod 32 to one of two forks 33 fixedly mounted on a shaft 34; these forks 33 engage pins 27 on lugs 28 on a container 35 of the third bank. The D setting disc 1 is linked by a connecting rod 36 to a bracket 37 fixedly mounted on a shaft 38 journalled in carriage plate 5 and in a bracket 39 fixed to carriage base 26; fixedly mounted on shaft 38 are two forks 40 engaging, as described, a container 41 of the first bank. The S1 setting disc 1 is linked by a connecting rod 42 to one of two forks 43 on a shaft 44 journalled in a bracket 45 and in carriage plate 5; forks 43 engage a container 46 of the fourth bank. The S10 setting disc 1 is linked by a rod 47 to one of two forks 48 fixedly mounted on a shaft 49 and engaging a container 50 of the fifth bank. The L1 setting disc is connected by a rod 51 to a bracket 52 fixedly mounted on a shaft 53 journalled in bracket 25 and carriage plate 4; two forks 54 fixedly mounted on shaft 53 serve to move a container 55 of the second bank slidable on rods 56, 57 secured in the carriage structure. The L10 setting disc 1 is connected by a rod 58 to a bracket 59 on a shaft 60 fixedly supporting two forks 61 serving to move a container 62 of the third bank. The $L10^2$ setting disc is connected by a rod 63 to a bracket 64 on a shaft 65 journalled in carriage plate 4 and in a bracket 66; forks 67 fixed to shaft 65 serve to shift a container 68 of the first bank along rods 56, 57. The $L10^3$ setting disc is connected by a rod 69 to one of two forks 70 fixedly mounted on a shaft 71 journalled in carriage plate 4 and in bracket 45; forks 70 shift a container 72 of the fourth bank. Finally, the $L10^4$ setting disc 1 is connected by a rod 73 to one of two forks 74 on a shaft 75, which forks serve to shift a container 76 of the fifth bank.

It is necessary to arrange the sets of perforated plates 20 on five banks as described above, since the capacity of the pounds section of the set-up mechanism is five denominations. With reference to the calculation example in column 3, up to five partial products may have to be sensed simultaneously and the corresponding five sets of representations of partial products must be arranged separately, one set on each bank. Of course, the present invention is not limited to five pounds denominations, since a machine constructed according to the invention may comprise any number of banks.

As clearly shown in Figures 3 to 8, each perforated plate 20 has two recesses 77 near the upper edge. A coupling plate 78, Figures 1A, 1B, 2A, 2B, is positioned just above each pair of containers 41, 68 (first bank), 29, 55 (second bank), 35–62 (third bank), 46, 72 (fourth bank), and 50, 76 (fifth bank). Each plate 78 has four coupling lugs (not shown), one for each recess 77 in the respective plates 20, each coupling lug being of the same shape as the recess but slightly smaller so as to fit into it. Normally, that is when the setting discs 1 are set to zero, the coupling lugs in plates 78 engage recesses 77 of the "0" plates 20 of the respective sets; when a disc 1 is set to "1," the coupling lugs in the respective plate 78 engage recesses 77 in the "1" plate 20 of this set, and so forth. Thus, by setting the discs 1 as desired, those plates 20 which correspond to the set-up digits of the respective denominations are coupled to plates 78, for the purpose to be explained hereafter.

Journalled in crossbars 6, 7 of the carriage are rollers 79 running in rails 80 secured to the machine base plate 81. A spring barrel 82 tends to pull the carriage transversely of the machine, to the right as viewed in Figure 2B. A customary double escapement pawl 83 pivoted in the carriage structure coacts with a double escapement rack 84 fixed to machine base 81, and normally prevents the carriage from shifting under the influence of spring 82. A shift lever 85 pivoted on shaft 18 engages a slot in pawl 83 and has a forward tip 86, Figure 1A, protruding through a slot in carriage cover 9. When tip 86 is depressed, lever 85 causes pawl 83 momentarily to disengage rack 84, and the carriage steps one half-step to the right; when tip 86 is released, a spring 87 restores lever 85, pawl 83 is restored and the carriage shifts another half-step. The carriage may be restored to the left by turning a knob 88 fixedly mounted on a shaft 89 journalled in the carriage structure; a gear 90 on shaft 89 meshes with a rack 91 fixed to machine base 81. These carriage-shifting means constitute the denominational set-up mechanism for the second factor, as will be clearly understood as the description proceeds.

Each setting disc 1 is mounted on a boss 92 which has a recess engaged by a lug 93 fixed to shaft 2. A clearing lever 94 fixedly mounted on shaft 2 protrudes forwardly through a slot in carriage cover 9. When lever 94 is lifted up, it rotates shaft 2, so that lugs 93 pick up their associated discs 1 and restore them to the normal (zero) position. Clearing lever 94 may be restored by a spring 95.

Representations of Partial Products

Perforated plates 20 are shown in Figures 3 to 7 illustrating sets $L10^2$ and $D$ of the first bank, sets $L1$ and $D10^{-2}$ of the second bank, sets $L10$ and $D10^{-1}$ of the third bank, sets $L10^3$ and $S1$ of the fourth bank, and sets $L10^4$ and $S10$ of the fifth bank, respectively. Only one plate of each set is shown, since all plates are formed in a similar manner. Each set comprises as many plates 20 as there are digits in the respective denomination; the 0 plate in each set is not perforated. All plates except the 0 plate in each set are perforated to represent the partial products of multiplying the value associated with each plate by the various multiplier digits. For this purpose each plate 20 may be thought to be divided into imaginary horizontal strips shown in dotted lines in Figure 3, each strip being associated with a multiplier digit as indicated by numerals 1 to 11. Thus, the plate $L10^21$ shown in Figure 3 contains, in the first or top strip, the products of multiplying £100 by the digit 1 of any decimal denomination from $-4$ to $+6$, as listed in column 3 and (partly) in the first row of Table $L10^21$, and also the products of multiplying 100 by the digit 1 of any non-uniform denomination $S10$ to $D/8$; in the second strip, all products (partly shown in the second row of Table $L10^21$) of multiplying these values by the digit 2 of all denominations, and so forth. Plates of the $L1$–$L10^4$ sets are divided into 11 strips, while the remaining sets $S10$–$D10^{-2}$ have only nine strips each, since in the present embodiment of the invention sterling amounts cannot be multiplied by sterling amounts. The dotted vertical line approximately in the middle of Figures 3–7 indicates the position of the $L1$ sensing pins, as will be explained hereafter.

As clearly shown in Figure 8, each strip may be thought to have five imaginary lines indicated $S10, 2, 2, 1,$ and 6. Any hole 96 placed on line $S10$ represents the digit 1 of the tens of shillings denomination, or 10/—. Any hole 96 placed on line 2, 2, 1, or 6 represents the digit associated with this particular line; holes 96 arranged vertically above each other represent, in combination, the sum of digits associated with the respective lines. Thus, the two holes on the left of Figure 8 each represent the digit 1, since they are placed on line 1; the next two holes to the right represent together the digit 4, since they are on lines 2; the next two holes 96 represent the digit 8, since they are on line 2 and 6, respectively, and so on. Representation of numerical values by means of a positional code is well known in the art, and any suitable positional code may be used.

The positioning of holes 96 along the lines $S10, 2, 2, 1, 6$ is best explained diagrammatically with reference to Figure 9. As indicated by symbols $L10^{11}$ to $D10^{-6}$ along the top edge of the drawing, each result denomination is associated with four feelers 97 indicated by four black dots just below the respective symbol, except the $S10$ denomination which is associated with only one feeler 97 positioned somewhat higher than the other feelers. The line of symbols $+6$ to $S1$ (together with symbols $D$ and $D/8$ which should be shown to the right of $S1$ but are beyond the usable space of the drawing) indicates the possible positions of the carriage on which the plates 20 are mounted; it will be remembered that each position is associated with a denomination of the second factor. It is assumed that £100:0:7d is to be multiplied by 6, so that the "6" strips of plates $L10^21$ and $D7$ (first bank) are selected for operation; these strips 6 are shown in the upper part of Figure 9 in the decimal positions of the carriage, as indicated by symbols 0 to $-4$ along the right-hand edge of the drawing, and as indicated by arrows near the right-hand edges of the $L10^21$ strips.

Considering first the $D7$ plate in the 0 position associated with multiplication (or division) by units, it will be seen that when the strip $D7 \times 6$ is shifted upwards into alignment with feelers 97 there will be two holes 96 (shown as black dots) aligned with $S1$ feelers, these two holes together representing the digit 3, while a hole representing 6 will be aligned with $D$ feelers; consequently, feelers 97 will register 3/6d., which is the product of $7d. \times 6$. When the $D7$ plate is shifted into the $+1$ position associated with multiplication (or division) by tens, the feelers will register 1 ($L1$), 1 ($S10$) and 5 ($S1$), or $£1:15:0 = 7d. \times 6 \times 10$. When shifted into $+2$ position, plate $D7$ will register $£17:10:0 = 7d. \times 6 \times 10^2$. In the $+3$ position, plate $D7$ will register $£175 = 7d. \times 6 \times 10^3$ and in the $+4$ position the amount will be $£1,750 = 7d. \times 6 \times 10^4$. Positions $+5$ and $+6$ are not shown in Figure 9, since the holes affected are the same as those shown black in positions $+3$ and $+4$, these holes being sensed by feelers 97 associated with next higher pounds denominations, the amounts registered being £17,500 and £175,000, respectively. All holes 96 shown as circles cannot be sensed by feelers 97, since in the respective positions they are not aligned with any feelers. It may be pointed out here that as fully described in the specification of my prior British Patent No. 566,942, the carriage shift along the decimal positions $-4$ to $+6$ is equal to the lateral spacing between feelers 97 of adjacent pounds denominations $L1$ to $L10^{11}$, and also of fractions-of-penny denominations $D10^{-6}$ to $D10^{-1}$, whereas it is not equal to the spacing between feelers associated with non-uniform denominations $D$, $S1$, and $S10$; in this manner, a hole 96 representing a certain pounds digit may be aligned with feelers 97 of any one pounds denomination but never with feelers of shillings, pence, and fractions-of-penny denominations, and so forth.

Continuing with the $D7 \times 6$ strip, in the $-1$ position the amount registered will be $4.2d. = 7d. \times 6 \times 10^{-1}$; in position $-2$, the amount $.42d. = 7d. \times 6 \times 10^{-2}$; in position $-3$, the amount $.042d. = 7d. \times 6 \times 10^{-3}$; finally, in position $-4$ the amount registered will be $.0042d. = 7d. \times 6 \times 10^{-4}$.

Sonsidering now the $L10^21 \times 6$ strip, in position 0 the feelers $L10^2$ will register 6, or $£600 = £100 \times 6$. There will be another hole aligned with the $L10^{10}$ feelers 97, but this hole is rendered inoperative by a locking device shown diagrammatically as a black line 98; this locking device 98 travels with the carriage and is operative only in the decimal positions of the carriage, as will be fully described hereafter. In position $+1$, the hole previously sensed by $L10^2$ feelers is sensed by the $L10^3$ feelers as $£6,000 = £100 \times 6 \times 10$, and so forth; no other holes 20 become active while the carriage shifts to the left from the initial position 0. Similarly, in position −1 the amount registered is £60 = £100 × 6 × 10⁻¹; in position −2 it is £6=£100×6×10⁻². In position −3 the feelers 97 register 12/—=£100×6×10⁻³; and in position −4, 1/2.4d.=£100×6×10⁻⁴. It will be understood that in actual operation both the L10²1×6 and the D7×6 strips are sensed simultaneously; thus, when multiplying £100:0:7d.×600 the carriage is shifted into +2 position, and the feelers sense the amount £60,017:10:0; when multiplying £100:0:7d. by 6×10⁻⁴ or .0006 the carriage is shifted into −4 position, and the feelers sense 1/2.4042d., and so forth.

Considering now the multiplication by non-uniform factors, the lower part of Figure 9 shows again the 6 strip on plate L10²1 which is used, in this case, to multiply 100 by the digit 6 of various sterling denominations. Since pence cannot be multiplied by sterling amounts, the D set of plates 20 remains in the 0 position; when multiplying, this 0 plate is moved, alongside with the L10²1 plate into alignment with feelers 97, but of course this 0 plate has no holes 96. When shifted into the S10 position and upon alignment of the 6 strip with feelers 97, plate L10²1 will have two holes, representing 2 and 1 respectively, aligned with L10² feelers to register £300=100×60/—. In position S1, these same holes will be aligned with L10 feelers to register £30=100×6/—. In position D, the amount registered is £2:10:0=100×6d.; finally, in position D/8 the amount registered is 6/3d.=100×⁶⁄₈d.=100×¾d.

When the carriage is in the non-decimal positions S10 to D/8, the locking bar 98 is rendered inoperative and another locking bar 99 is brought into operation by means to be described hereafter. This locking bar 99 renders inoperative any feelers 97 with which it may be aligned; thus as indicated in Figure 9 lower part, a feeler D10⁻⁴ will not enter the hole 96 which becomes aligned with it when the carriage is shifted into the S10 position, since all feelers D10⁻² to D10⁻⁶ are locked by the bar 99. It may be added that locking bars 98, 99 are arranged to lock any feelers 97 which may be beyond the reach of perforated plates 20; thus, in position D/8 locking bar 99 locks feelers L10⁴ which otherwise would enter the empty space to the left of plate L10². The space between plates L10² and D is filled as will be described hereafter.

All partial products are precomputed as shown in Tables D10⁻² to L10⁴, and the plates 20 are perforated accordingly as explained above with reference to Figures 3–9.

*Digital set-up mechanism for the second factor*

It has been already explained that the denomination of the second factor is determined by the position of the carriage; the digit of the respective denomination is set up in the following manner:

As already mentioned, a coupling plate 78 is arranged above each denominational set of plates 20, these plates 78 being coupled to those plates 20 which have been previously shifted into engagement with coupling plates 78 by a corresponding setting of discs 1. As shown in Figures 2A, 2B, each coupling plate 78 has two pins 100 engaging a horizontal slot in a crossbar 101. Crossbars 101 extend beyond the carriage plates 4, 5 and are fixed at each end to an end plate 102 having rollers 103 running in vertical rails 104 secured to the machine structure. Each end plate 102 is supported by a fork 105 fixedly mounted on a shaft 106, Figure 14B, journalled in the machine structure and biased by springs 107. A stud 108 in one of the forks 105 coacts with a stepped plate 109 pivoted at 110 in the machine structure. A rod 111 connects the stepped plate 109 with a setting disc 112, Figure 14A, journalled at 113 in the machine structure. Setting disc 112 has a finger tip 114 protruding through a slot in the machine cover 115; a spring-loaded ball 116 locates the setting disc 112 in any one of eleven setting positions, corresponding to the highest possible multiplier digit. A numeral strip 117 fixed to disc 112 is visible through an aperture 118 in the machine cover 115.

Forks 105 are normally held, by means to be described hereafter, in the position shown in Figures 14A, 14B. At the beginning of each operating cycle shaft 106 is released and is rotated by springs 107, until stud 108 abuts against the previously positioned stepped plate 109. During this rotation of shaft 106 the forks 105 lift the end plates 102, crossbars 101 fixed thereto, coupling plates 78 slidably connected to crossbars 101, and plates 20 coupled to plates 78 into the position corresponding to the set-up multiplier digit, so that the required strips on plates 20 are aligned with feelers 97. Thus, when the setting disc 112 is set to 1, strip 1 on all pre-set plates 20 will be now aligned with feelers 97, as shown in Figure 10; when disc 112 is set to 2, strips 2 will be now aligned with feelers 97, and so forth. Shaft 106, forks 105, crossbars 101, coupling plates 78 and plates 20 coupled thereto are restored after each operating cycle, so that the first factor may be re-set if desired.

Coupling plates 78 are slidable vertically in channels 119 formed on plates 120 which are fixed to carriage plates 4, 5 and are slidable horizontally in channels formed in a plate 121 fixed to the machine structure. As the crossbars 101 move upwards, coupling plates 78 pull those plates 20 to which they are coupled into the channels 119, thus providing the necessary support for plates 20 during the sensing operation.

*Sensing and value-entering mechanism*

This mechanism forms the subject matter of my co-pending United States patent application No. 736,130 and will be now described only so far as necessary for a proper understanding of the present invention.

Each denominational registering element of the totalizing register, to be described hereafter, is associated with five sets of feelers 97, Figures 1A, 1B, one set for each bank of plates 20, each set comprising four feelers 97 except the sets associated with the S10 denomination, which have a single feeler 97 each, as illustrated in Figure 9. Feelers 97 associated with each bank are rockably mounted on a rod 122, Figures 1A, 1B, 10, supported in the machine structure; each feeler is biased towards the respective coupling plate 78 by a torsion spring 123 but is normally withheld from the plate 20 by a crossbar 124. Crossbars 124 are fixed at each end to an end plate 125, Figures 2B, 14A, 14B, thus forming a rigid frame which can be lowered, by means to be described hereafter, after the pre-set plates 20 have been raised according to the setting of disc 112. Thus, feelers 97 are released to rock towards the respective raised plates 20 and to enter the holes 96 herein or not, as the case may be.

Each feeler 97 coacts with a pin 126, Figures 1A, 1B, 10, guided for vertical movement in slots in plate 121 and in guides 127 secured in the machine structure. Pins 126 are biased downwards individually by springs 128 anchored in the machine structure; only a few springs 128 are shown in the drawings to avoid overloading, but it will be understood that each pin 126 has its own spring 128. Each pin 126 is fixed to a member 129 forming part of a differential value-entering mechanism presently to be described. Members 129 rest on a lift plate 130 which is lowered, by means to be described hereafter, after the feelers 97 have sensed the previously elevated plates 20. If a feeler 97 has entered a hole 96 in plate 20, its associated pin 126 is free to move downward when lift plate 130 has been lowered; however, if a feeler 97 has not found a hole 96 to enter into, its rearward extension 131 does not allow the associated pin 126 to move downwards appreciably. However, only those pins 126 are free to move downwards which are not locked by locking bars 98, 99 already mentioned. There is one pair of locking bars 98, 99 associated with each bank of plates 20, except the second and the third bank which are both controlled by the same pair of bars 98, 99. Each pair of bars 98, 99 is supported at each end by a lever 132 pivoted at 133 in the carriage plate 4, 5, respectively; levers 132 mounted on each carriage plate are interconnected by a rod 134. Locking bar 99 of the first bank has a ball 135 running on a stationary cam face 136 secured to a crossbar 137 fixed to the machine structure. Similarly, locking bar 98 of the fifth bank has a ball 138 running on a stationary cam 139 fixed to a crossbar 140. Cams 136, 139 are so shaped that, as long as the carriage remains in decimal positions +6 to −4, locking bars 98 are aligned with prongs 141 on pins 126, as shown in Figures 1A, 1B; when the carriage moves to the non-decimal positions S10 to $^D/8$, locking bars rock around their pivots 133 so that the "non-decimal" locking bars 99 are aligned with prongs 141, as shown in Figure 10. Locking bars 98, 99 have cut-outs 142, 143 shown in Figure 12; prongs 141 are free to move downwards only when aligned with cut-out 142 or 143. In this manner, locking bars 98, 99 lock certain denominational sets of pins 126 and unlock other sets of pins 126, as already explained with reference to Figure 9. Locking bars 98 are sufficiently long to lock pins 126 on the right-hand side of the carriage when the latter is in the extreme left-hand position +6; similarly, bars 99 are sufficiently long to lock pins 126 on the left-hand side of the carriage when the latter is in the extreme right-hand position $^D/8$.

Members 129 are arranged in denominational groups, each group being associated with a result denomination $D10^{-6}$ to $L10^{11}$. As shown in Figure 11, each member 129 has an upper bore normally filled with transmission elements 144, and a lower bore 145 normally empty of these transmission elements. As shown in Figures 1A, 1B, 10, members 129 are of varying thickness filled with a corresponding number of transmission elements 144 which are of standard thickness. Members 129 associated with feelers 97 arranged in line with the 2 lines of holes 96 in plates 20, as indicated in Figure 9, contain two elements 144 each; members 129 associated with those feelers 97 which sense the S10 line and the 1 line of holes 96 contain one element 144 each; and members 129 associated with those feelers 97 which sense the 6 line of holes 96 each contain six transmission elements 144. When the lift plate 130 is being lowered, members 129 associated with those feelers 97 which have entered holes 96 move downwards to such an extent as to align their upper bores containing the transmission elements 144 with a plunger 146 presently to be described; members 129 associated with those feelers 97 which have not entered holes 96 move but slightly so as to align their lower bores 145 with a plunger 146. Figure 10 shows the position of parts of the pence (D) denominational sensing and value-entering mechanism at the end of the sensing operation, illustrating the calculation example of column 3. In this example, the following values have to be entered into the pence registering element of the totalizer:

6d. from the $L10^{49}$ plate 20, fifth bank
9d. from the $L10^{39}$ plate 20, fourth bank
4d. from the $L10^{29}$ plate 20, first bank
11d. from the $L10\ 9$ plate 20, third bank, and
1d. from the $L1\ 9$ plate 20, second bank The total amount to be registered is 31d. It will be seen from an inspection of Figure 10 that the following members 129 have been lowered in the course of this sensing operation: one member 129 (fifth bank) containing six elements 144; three members 129 (fourth bank) containing two, one, and six elements 144; two members 129 (first bank) each containing two elements 144; four members 129 (third bank) containing two, two, one, and six elements 144; and one member 129 (second bank) containing one transmission element 144. Altogether eleven members 129 have been lowered, containing a total of thirty-one transmission elements 144, corresponding in number to 31d. to be registered, so that thirty-one elements 144 are aligned with the associated plunger 146.

There is one plunger 146 associated with each denominational group of members 129, all plungers being fixed to a common crossbar 147, Figure 1B, and being guided in a guide 148 supported in the machine structure. After the lift plate 130 has been lowered, crossbar 147 is moved forward, by means to be described hereafter, an amount equal to the total thickness of all members 129 in a denominational group; plungers 146 move through bores in members 129 and drive the transmission elements 144 (of those members 129 which have been previously lowered) through lower bores 145 of those members 129 which have not been previously lowered to the full extent. As the transmission elements 144 are pushed out of a denominational group of members 129 by plungers 146, these elements 144 enter a hole in a lift block 149, Figure 1A, fixedly mounted on lift plate 130. It will be understood that the number of transmission elements 144 pushed out of a denominational group of members 129 into the lift block 149 equals the amount to be entered into the respective denominational registering element of the totalizer; with reference to Figure 10, thirty-one elements 144 will be pushed into the lift block 149 in the case of the pence denomination.

A differential slide 150, Figures 1A, 1B, is mounted for horizontal movement in guides 151, 152, 148, 153 above each denominational group of members 129. Each differential slide 150 has a lug 154 descending into a slot in the lift block 149, so that normally each lug 154 just touches the foremost member 129. If no members 129 in a denominational group have been lowered in the course of the sensing operation, the associated plunger 146 would at the end of forward stroke just touch the respective lug 154. Generally, however, some members 129 have been lowered, and as the transmission elements 144 are pushed out of the members 129 by plungers 146, they push the respective lugs 154 and differential slides 150 towards the front of the machine. The amount of movement of each differential slide 150 is equal to the total thickness of all those elements 144 which have been pushed out of the respective denominational group of members 129; thus, this movement is proportionate to the amount to be entered into the respective denominational registering element of the totalizer.

Fixed to each differential slide 150 is a rack 155 meshing with a gear 156 journalled in a driving rack 157 slidable in guides 158, 159 secured in the machine structure. Each gear 156 also meshes with a carry rack 160 slidable in guides 161, 159. Each driving rack 157 meshes with a pinion 162 rotatable on shaft 163 fixedly supported in the machine structure; pinions 162 are arranged, as will be described hereafter, to drive the numeral wheels of the totalizing register. It will be seen that, as long as the carry racks 160 remain stationary, the rotation of pinions 162 is proportionate to the respective amounts to be registered.

Each rack 155 has along its lower edge ratchet teeth coacting with a stop bar 164 mounted for upward movement on guide 148. At the end of forward stroke of plungers 146 the stop bar 164 is shifted upwards, by means to be described hereafter, into engagement with ratchet teeth on racks 155; thus, it prevents any overthrow of differential slides 150.

On completion of their forward stroke, plungers 146 are immediately restored by their crossbar 147, whereupon the lift plate 130 is restored to its upper position, thus restoring all members 129 and the lift block 149. Transmission elements 144 which have been previously pushed out of members 129 into the lift block 149 are now aligned with upper bores in members 129. Each differential slide 150 has a lug 165 coacting with a restoring bar 166; during the forward stroke of plungers 146 this bar 166 has been moved forward to allow for free movement of differential slides 150, but now it is restored, by means to be described hereafter, thus engaging all lugs 165 and restoring all differential slides 150 to the initial position. Meanwhile the feelers 97 have been restored by crossbars 124, and the previously lifted plates 20 by coupling plates 78 and crossbars 101, thus completing the sensing operation. The sequence of the various movements comprising an operating cycle is shown in the timing chart of Figure 13.

Totalizing register

As shown in Figure 1A, a gear 167 is fixed to each pinion 162; it meshes with a pinion 168 rotatable on a shaft 169. Fixed to each pinion 168 is a gear 170 meshing with another gear 171 rotatable on a shaft 172; shafts 172, 169 are fixedly supported in the machine structure.

The totalizing register comprises numeral wheels 173 rotatable on a shaft 174 journalled at either end in an end plate 175 interconnected by means such as a cover 176 to form a rigid structure. Numerals on wheels 173 are visible through apertures in the totalizer cover 176. Each numeral wheel 173 has a gear 177 positioned substantially above and midways between the respective gears 170, 171. The totalizer structure is shiftable, by means to be described hereafter, so as to mesh each gear 177 either with gear 170 for additive calculations or with gear 171 for subtractive calculations; this meshing operation takes place prior to the return stroke of the differential slides 150. Thus, totalizer wheels 173 are rotated according to the movement of the respective differential slides 150 either additively or subtractively as required.

Each numeral wheel 173 has a customary one-tooth pinion or lug 178 coacting with lugs 179 on a rocker 180 mounted on a shaft 181 fixedly supported in the machine structure. Each rocker 180 is biased by a spring 182 clockwise as viewed in Figure 1A. The rearward end of each rocker 180 is formed with a lug 183 engaging a slot in an escapement pawl 184 rockable on a shaft 185 fixed in the supporting structure. Escapement pawls 184 engage, in the usual manner, ratchet teeth cut along the upper edges of the respective carry racks 160, which are tensioned towards the rear of the machine by springs 186, Figure 1B. Each one-tooth pinion 178 co-operates, through rocker 180 and pawl 184, with carry rack 160 associated with the next higher denomination to allow the rack to shift one step at the time when a tens-transfer has to be effected. This movement of rack 160 is transmitted, through gear 156, rack 157, gears 162, 167, 168, and 170 or 171, to gear 177 and numeral wheel 173. Carry racks 160 are restored during the forward stroke of plungers 146 by a crossbar 187.

The totalizing register may be cleared by any customary method, for instance by turning the totalizer shaft 174 containing a comb bar coacting with zero studs on wheels 173. This method is well known and does not require a detailed description.

Auxiliary devices

The machine comprises a register for the second factor (multiplier or quotient) generally indicated at 188, Figure 1A, and constructed in any known manner, for instance as described in the specifications to my prior British Patents Nos. 577,330 and 575,324. This register has one numeral wheel for each carriage position; that is, eleven wheels marked 0—9 for decimal positions −4 to +6, a wheel marked 01 repeated five times for the S10 position, a wheel marked 0—9 for the S1 position, a wheel marked 0—11 for the D position, and a wheel marked 0, ⅛, ¼, ⅜, ½, ⅝, ¾, ⅞ for the D/8 position. A pointer 189 fixed to the carriage cover 9 may extend to the suitably marked wheels 188 to indicate the carriage position. Registers of this general type are well known and do not require a detailed description.

Auxiliary devices such as interlocks for ensuring a fool-proof operation, decimal point indicators, and so forth, may be used in the machine; as they are well known to those skilled in the art, their description has been omitted, inasmuch as it is not required for a proper understanding of the invention.

Operating means

As shown in Figure 14A, each end plate 102 supporting the crossbars 101 has teeth coacting with a locating rocker 190 pivoted at 191 and biased by a spring 192. Forks 105 actuating the end plates 102 are fixedly mounted on shaft 106, Figure 14B, as already described. A main operating shaft 193 is journalled in the machine structure and is arranged to be rotated clockwise, once during each operating cycle, by any suitable means such as a handle or a motor. A cam 194, Figure 1B, fixedly mounted on shaft 193 coacts with a rocker 195 pivoted at 196. A connecting rod 197 links the rocker 195 to a bracket 198 fixedly mounted on shaft 106. As the main shaft 193 is rotated, cam 194 allows the shaft 106 to rotate clockwise under the influence of springs 107 until the lug 108 abuts against the stepped plate 109 previously positioned as described, according to the required digit of the second factor. Thus, crossbars 101, coupling plates 78, and pre-set perforated plates 20 are lifted as required.

End plates 125, Figures 14A, 14B, to which are fixed the crossbars 124 supporting the feelers 97, are each linked to a rocker 199 pivoted at 110 and to a bell-crank 200 pivoted at 201. Each rocker 199 is linked to the respective bell-crank 200 by a connecting rod 202 and is biased by a spring 203 on to a cam 204 fixedly mounted on main shaft 193. After the lifting of plates 20 cams 204 allow the end plates 125 to move downwards, thus releasing the feelers 97 for the sensing operation.

Lift plate 130, Figures 1A, 1B, supporting the sensing members 129, is fixed to two crossbars 205 fixed at each end to an end plate 206, Figure 14A. Rollers 207 journalled in each end plate 206 run in rails 208 fixed to the machine structure. Each end plate 206 is supported by a forked bell-crank 209 pivoted at 210 and linked by a connecting rod 211 to a rocker 212, Figure 14B, pivoted at 213 and coacting with a cam 214 on main shaft 193. During rotation of shaft 193, cams 214 first allow the lift plate 130 to move downwards due to its weight or a spring (not shown) in order to position the sensing members 129 according to the sensed amounts, whereupon lift plate 130 and members 129 are restored by cams 214.

The differential driving mechanism described above is operated by two cams 215 on main shaft 193. Each cam 215 coacts with a two-armed rocker 216 pivoted at 213 and connected at 217 to a link 218 having a pin 219 rotatably supporting a roller 220 running in rails 221 fixed to the machine structure. A pinion 222 rotatable on each pin 219 meshes with a rack 223 fixed to the machine structure. Fixed to each pinion 222 is a gear 224 meshing with a rack 225 in which are journalled rollers 226 running in rails 227 fixed to the supporting structure. Racks 225 are fixed to a cross-member 228 comprising the restoring bars 166 and 187, Figure 1B. It will be seen from the above and with reference to the timing chart of Figure 13, that as cams 215 rotate, bars 166, 187 are moved on completion of the sensing operation first to the left as viewed in Figure 1B, and then restored into the position shown. Two brackets 229 fixedly mounted on bar 166 have pawls 230 biased by springs (not shown) into corresponding notches in end plates 231 supporting the crossbar 147 to which the plungers 146 are secured as described above. End plates 231 have rollers 232 running in rails 233 fixed to the machine structure. A spring 234 mounted in a barrel 235 is attached to each end plate 231 and tensions it towards the rear of the machine (to the right as viewed in Figure 1B). As the bars 166, 187 are moved forward, pawls 230 push end plates 231, crossbar 147, and plungers 146 forward; plungers 146 enter members 129 and drive slides 150 differentially, through transmission elements 144, as described above. On completion of forward stroke of plungers 146 tails 236 on pawls 230 engage fixed stops 237 and cause the pawls to disengage end plates 231, which are then restored by springs 234 on to a fixed stop 238. At the same time pawls 230 engage the stop bar 164 and cause it to move upwards and to engage teeth on racks 155 in order to prevent any overthrow of differential slides 150. At the same time, all previously displaced carry racks 160 are restored by bar 187. As shown in the timing chart of Figure 13, bars 166, 187 remain stationary for a certain period after completion of forward stroke in order to allow for the restoring movement of sensing members 129 and for the meshing operation presently to be described, whereupon they are restored by cams 215, bar 166 positively restoring all differential slides 150.

End plates 175, Figure 14A, of the totalizing register 173 are each mounted on two pivots 239; each pivot 239 is eccentrically fixed to a disc 240 having another eccentric pivot 241 journalled in the machine structure. Gears 242 fixedly mounted on pivots 241 of each end plate 175 mesh with a gear 243 which has a recess engaged by a roller or stud 244 in a bell-crank 245 pivoted at 246, Figure 14B. Rollers 247 in bell-cranks 245 coact with cams 248 fixedly mounted on main shaft 193, being biased by springs 249. The machine is conditioned for additive calculations such as multiplication and addition, and for subtractive calculations such as division and subtraction, by means of a control lever 250, Figure 14A, fixed to a crossbar 251 interconnecting the two gears 243. This control lever 250 can be set manually either into the position shown in Figure 14A for additive operation, or it can be rocked towards the rear of the machine for subtractive operation. Springs 252 anchored in the machine structure normally maintain gears 177 of the totalizer, Figure 1A, in mesh either with gears 170 (for additive operation) or with gears 171 (for subtractive operation). At the beginning of each operating cycle cams 248 cause the studs 244, Figure 14A, on bell-cranks 245 to move upwards, thus causing gears 243 to rock clockwise if they have been previously positioned as shown for additive operation, or counter-clockwise if they have been previously positioned for subtractive operation; in either case gears 243 rotate gears 242 and eccentric discs 240 so as to lift the totalizer structure substantially upwards, thus demeshing the totalizer gears 177 from gears 170 or 171, but not far enough to reach the dead centre of eccentric discs 240. On completion of forward stroke of plungers 146 cams 248 cause studs 244 to move downwards, and springs 252 pull the totalizer structure downwards, eccentric discs 240 rotating away from the dead-centre position, so that totalizer gears 177 are again meshed with gears 170 or 171, as the case may be. Thus as the differential slides 150 are positively restored by the bar 166, racks 155 on slides 150 drive the totalizer gear 177 either additively or subtractively as required, the carry racks 160 effecting the tens transfer whenever necessary.

As will be apparent to those skilled in the art, the invention is not limited to the sterling numerical system, as the machine described above may be modified to suit other non-uniform numerical systems, such as weights and measures, Indian currency, and so forth.

Table D10⁻¹

|   | +6 | +5 | +4 | +3 | +2 | +1 | 0 |
|---|---|---|---|---|---|---|---|
| 1 | £41:13:4 | £4: 3:4 | 8/4 | 10 d. | 1d. | .1d. | .01d. |
| 2 | 83: 6:8 | 8: 6:8 | 16/8 | 1/ 8 | 2 | .2 | .02 |
| 3 | 125: 0:0 | 12:10:0 | £1: 5:0 | 2/ 6 | 3 | .3 | .03 |
| 4 | 166:13:4 | 16:13:4 | 1:13:4 | 3/ 4 | 4 | .4 | .04 |
| 5 | 208: 6:8 | 20:16:8 | 2: 1:8 | 4/ 2 | 5 | .5 | .05 |
| 6 | 250: 0:0 | 25: 0:0 | 2:10:0 | 5/- | 6 | .6 | .06 |
| 7 | 291:13:4 | 29: 3:4 | 2:18:4 | 5/10 | 7 | .7 | .07 |
| 8 | 333: 6:8 | 33: 6:8 | 3: 6:8 | 6/ 8 | 8 | .8 | .08 |
| 9 | 375: 0:0 | 37:10:0 | 3:15:0 | 7/ 6 | 9 | .9 | .09 |

Table D10⁻²

|   | +6 | +5 | +4 | +3 | +2 | +1 | 0 |
|---|---|---|---|---|---|---|---|
| 1 | £83: 6:8 | £8: 6:8 | 16/8 | 1/8 | 2d. | .2d. | .02d. |
| 2 | 166:13:4 | 16:13:4 | £1:13:4 | 3/4 | 4 | .4 | .04 |
| 3 | 250: 0:0 | 25: 0:0 | 2:10:0 | 5/- | 6 | .6 | .06 |
| 4 | 333: 6:8 | 33: 6:8 | 3: 6:8 | 6/8 | 8 | .8 | .08 |
| 5 | 416:13:4 | 41:13:4 | 4:13:4 | 8/4 | 10 | 1.0 | .10 |
| 6 | 500: 0:0 | 50: 0:0 | 5: 0:0 | 10/- | 1/- | 1.2 | .12 |
| 7 | 583: 6:8 | 58: 6:8 | 5:16:8 | 11/8 | 1/2 | 1.4 | .14 |
| 8 | 666:13:4 | 66:13:4 | 6:13:4 | 13/4 | 1/4 | 1.6 | .16 |
| 9 | 750: 0:0 | 75: 0:0 | 7:10:0 | 15/- | 1/6 | 1.8 | .18 |

Table D10⁻³

|   | +6 | +5 | +4 | +3 | +2 | +1 | 0 |
|---|---|---|---|---|---|---|---|
| 1 | £125 | £12:10:0 | £1: 5:0 | 2/6d. | 3d. | .3d. | .03d. |
| 2 | 250 | 25: 0:0 | 2:10:0 | 5/- | 6 | .6 | .06 |
| 3 | 375 | 37:10:0 | 3:15:0 | 7/6 | 9 | .9 | .09 |
| 4 | 500 | 50: 0:0 | 5: 0:0 | 10/- | 1/- | 1.2 | .12 |
| 5 | 625 | 62:10:0 | 6: 5:0 | 12/6 | 1/3 | 1.5 | .15 |
| 6 | 750 | 75: 0:0 | 7:10:0 | 15/- | 1/6 | 1.8 | .18 |
| 7 | 875 | 87:10:0 | 8:15:0 | 17/6 | 1/9 | 2.1 | .21 |
| 8 | 1,000 | 100: 0:0 | 10: 0:0 | 1:0:0 | 2/- | 2.4 | .24 |
| 9 | 1,125 | 112:10:0 | 11: 5:0 | 1:2:6 | 2/3 | 2.7 | .27 |

Table D10⁻⁴

|   | +6 | +5 | +4 | +3 | +2 | +1 | 0 |
|---|---|---|---|---|---|---|---|
| 1 | £166:13:4 | £16:13:4 | £1:13:4 | 3/4 | 4d. | .4d. | .04d. |
| 2 | 333: 6:8 | 33: 6:8 | 3: 6:8 | 6/8 | 8 | .8 | .08 |
| 3 | 500: 0:0 | 50: 0:0 | 5: 0:0 | 10/- | 1/- | 1.2 | .12 |
| 4 | 666:13:4 | 66:13:4 | 6:13:4 | 13/4 | 1/4 | 1.6 | .16 |
| 5 | 833: 6:8 | 83: 6:8 | 8: 6:8 | 16/8 | 1/8 | 2.0 | .20 |
| 6 | 1,000: 0:0 | 100: 0:0 | 10: 0:0 | £1: 0:0 | 2/- | 2.4 | .24 |
| 7 | 1,166:13:4 | 116:13:4 | 11:13:4 | 1: 3:4 | 2/4 | 2.8 | .28 |
| 8 | 1,333: 6:8 | 133: 6:8 | 13: 6:8 | 1: 6:8 | 2/8 | 3.2 | .32 |
| 9 | 1,500: 0:0 | 150: 0:0 | 15: 0:0 | 1:10:0 | 3/- | 3.6 | .36 |

Table D10⁻⁵

|   | +6 | +5 | +4 | +3 | +2 | +1 | 0 |
|---|---|---|---|---|---|---|---|
| 1 | £208: 6:8 | £20:16:8 | £2: 1:8 | 4/2 | 5d. | .5d. | .05d. |
| 2 | 416:13:4 | 41:13:4 | 4: 3:4 | 8/4 | 10 | 1.0 | .10 |
| 3 | 625: 0:0 | 62:10:0 | 6: 5:0 | 12/6 | 1/ 3 | 1.5 | .15 |
| 4 | 833: 6:8 | 83: 6:8 | 8: 6:8 | 16/8 | 1/ 8 | 2.0 | .20 |
| 5 | 1,041:13:4 | 104: 3:4 | 10: 8:4 | £1: 0:10 | 2/ 1 | 2.5 | .25 |
| 6 | 1,250: 0:0 | 125: 0:0 | 12:10:0 | 1: 5:0 | 2/ 6 | 3.0 | .30 |
| 7 | 1,458: 6:8 | 145:16:8 | 14:11:8 | 1: 9: 2 | 2/11 | 3.5 | .35 |
| 8 | 1,666:13:4 | 166:13:4 | 16:13:4 | 1:13: 4 | 3/ 4 | 4.0 | .40 |
| 9 | 1,875: 0:0 | 187:10:0 | 18:15:0 | 1:17: 6 | 3/ 9 | 4.5 | .45 |

Table D10⁻⁶

|   | +6 | +5 | +4 | +3 | +2 | +1 | 0 |
|---|---|---|---|---|---|---|---|
| 1 | £250 | £25 | £2:10:0 | 5/- | 6d. | .6d. | .06d. |
| 2 | 500 | 50 | 5: 0:0 | 10/- | 1/- | 1.2 | .12 |
| 3 | 750 | 75 | 7:10:0 | 15/- | 1/6 | 1.8 | .18 |
| 4 | 1,000 | 100 | 10: 0:0 | £1: 0:0 | 2/- | 2.4 | .24 |
| 5 | 1,250 | 125 | 12:10:0 | 1: 5:0 | 2/6 | 3.0 | .30 |
| 6 | 1,500 | 150 | 15: 0:0 | 1:10:0 | 3/- | 3.6 | .36 |
| 7 | 1,750 | 175 | 17:10:0 | 1:15:0 | 3/6 | 4.2 | .42 |
| 8 | 2,000 | 200 | 20: 0:0 | 2: 0:0 | 4/- | 4.8 | .48 |
| 9 | 2,250 | 225 | 22:10:0 | 2: 5:0 | 4/6 | 5.4 | .54 |

Table D10⁻⁷

|   | +6 | +5 | +4 | +3 | +2 | +1 | 0 |
|---|---|---|---|---|---|---|---|
| 1 | £291:13:4 | £29: 3:4 | £2:18:4 | 5/10 | 7d. | .7d. | .07d. |
| 2 | 583: 6:8 | 58: 6:8 | 5:16:8 | 11/ 8 | 1/ 2 | 1.4 | .14 |
| 3 | 875: 0:0 | 87:10:0 | 8:15:0 | 17/ 6 | 1/ 9 | 2.1 | .21 |
| 4 | 1,166:13:4 | 116:13:4 | 11:13:4 | £1: 3: 4 | 2/ 4 | 2.8 | .28 |
| 5 | 1,458: 6:8 | 145:16:8 | 14:11:8 | 1: 9: 2 | 2/11 | 3.5 | .35 |
| 6 | 1,750: 0:0 | 175: 0:0 | 17:10:0 | 1:15: 0 | 3/ 6 | 4.2 | .42 |
| 7 | 2,041:13:4 | 204: 3:4 | 20: 8:4 | 2: 0:10 | 4/ 1 | 4.9 | .49 |
| 8 | 2,333: 6:8 | 233: 6:8 | 23: 6:8 | 2: 6: 8 | 4/ 8 | 5.6 | .56 |
| 9 | 2,625: 0:0 | 262:10:0 | 26: 5:0 | 2:12: 6 | 5/ 3 | 6.3 | .63 |

Table D10⁻⁸

|   | +6 | +5 | +4 | +3 | +2 | +1 | 0 |
|---|---|---|---|---|---|---|---|
| 1 | £333: 6:8 | £33: 6:8 | £3: 6:8 | 6/8 | 8d. | .8d. | .08d. |
| 2 | 666:13:4 | 66:13:4 | 6:13:4 | 13/4 | 1/4 | 1.6 | .16 |
| 3 | 1,000: 0:0 | 100: 0:0 | 10: 0:0 | £1: 0:0 | 2/- | 2.4 | .24 |
| 4 | 1,333: 6:8 | 133: 6:8 | 13: 6:8 | 1: 6:8 | 2/8 | 3.2 | .32 |
| 5 | 1,666:13:4 | 166:13:4 | 16:13:4 | 1:13:4 | 3/4 | 4.0 | .40 |
| 6 | 2,000: 0:0 | 200: 0:0 | 20: 0:0 | 2: 0:0 | 4/- | 4.8 | .48 |
| 7 | 2,333: 6:8 | 233: 6:8 | 23: 6:8 | 2: 6:8 | 4/8 | 5.6 | .56 |
| 8 | 2,666:13:4 | 266:13:4 | 26:13:4 | 2:13:4 | 5/4 | 6.4 | .64 |
| 9 | 3,000: 0:0 | 300: 0:0 | 30: 0:0 | 3: 0:0 | 6/- | 7.2 | .72 |

Table D10⁻⁹

|   | +6 | +5 | +4 | +3 | +2 | +1 | 0 |
|---|---|---|---|---|---|---|---|
| 1 | £375 | £37:10:0 | £3:15:0 | 7/6 | 9d. | .9d. | .09d. |
| 2 | 750 | 75: 0:0 | 7:10:0 | 15/- | 1/6 | 1.8 | .18 |
| 3 | 1,125 | 112:10:0 | 11: 5:0 | £1: 2:6 | 2/3 | 2.7 | .27 |
| 4 | 1,500 | 150: 0:0 | 15: 0:0 | 1:10:0 | 3/- | 3.6 | .36 |
| 5 | 1,875 | 187:10:0 | 18:15:0 | 1:17:6 | 3/9 | 4.5 | .45 |
| 6 | 2,250 | 225: 0:0 | 22:10:0 | 2: 5:0 | 4/6 | 5.4 | .54 |
| 7 | 2,625 | 262:10:0 | 26: 5:0 | 2:12:6 | 5/3 | 6.3 | .63 |
| 8 | 3,000 | 300: 0:0 | 30: 0:0 | 3: 0:0 | 6/- | 7.2 | .72 |
| 9 | 3,375 | 337:10:0 | 33:15:0 | 3: 7:6 | 6/9 | 8.1 | .81 |

Table D10⁻¹¹

|   | +6 | +5 | +4 | +3 | +2 | +1 | 0 |
|---|---|---|---|---|---|---|---|
| 1 | £416:13:4 | £41:13:4 | £4: 3:4 | 8/4 | 10d. | 1d. | .1d. |
| 2 | 833: 6:8 | 83: 6:8 | 8: 6:8 | 16/8 | 1/ 8 | 2 | .2 |
| 3 | 1,250: 0:0 | 125: 0:0 | 12:10:0 | £1: 5:0 | 2/ 6 | 3 | .3 |
| 4 | 1,666:13:4 | 166:13:4 | 16:13:4 | 1:13:4 | 3/ 4 | 4 | .4 |
| 5 | 2,083: 6:8 | 208: 6:8 | 20:16:8 | 2: 1:8 | 4/ 2 | 5 | .5 |
| 6 | 2,500: 0:0 | 250: 0:0 | 25: 0:0 | 2:10:0 | 5/ - | 6 | .6 |
| 7 | 2,916:13:4 | 291:13:4 | 29: 3:4 | 2:18:4 | 5/10 | 7 | .7 |
| 8 | 3,333: 6:8 | 333: 6:8 | 33: 6:8 | 3: 6:8 | 6/ 8 | 8 | .8 |
| 9 | 3,750: 0:0 | 375: 0:0 | 37:10:0 | 3:15:0 | 7/ 6 | 9 | .9 |

Table D10⁻¹²

|   | +6 | +5 | +4 | +3 | +2 | +1 | 0 |
|---|---|---|---|---|---|---|---|
| 1 | £833: 6:8 | £83: 6:8 | £8: 6:8 | 16/8 | 1/8 | 2d. | .2d. |
| 2 | 1,666:13:4 | 166:13:4 | 16:13:4 | £1:13:4 | 3/4 | 4 | .4 |
| 3 | 2,500: 0:0 | 250: 0:0 | 25: 0:0 | 2:10:0 | 5/- | 6 | .6 |
| 4 | 3,333: 6:8 | 333: 6:8 | 33: 6:8 | 3: 6:8 | 6/8 | 8 | .8 |
| 5 | 4,166:13:4 | 416:13:4 | 41:13:4 | 4:13:4 | 8/4 | 10 | 1.0 |
| 6 | 5,000: 0:0 | 500: 0:0 | 50: 0:0 | 5: 0:0 | 10/- | 1/ - | 1.2 |
| 7 | 5,833: 6:8 | 583: 6:8 | 58: 6:8 | 5:16:8 | 11/8 | 1/ 2 | 1.4 |
| 8 | 6,666:13.4 | 666:13:4 | 66:13:4 | 6:13:4 | 13/4 | 1/ 4 | 1.6 |
| 9 | 7,500: 0:0 | 750: 0:0 | 75: 0:0 | 7:10:0 | 15/- | 1/ 6 | 1.8 |

Table D10⁻¹³

|   | +6 | +5 | +4 | +3 | +2 | +1 | 0 |
|---|---|---|---|---|---|---|---|
| 1 | £1,250 | £125 | £12:10:0 | £1: 5:0 | 2/6 | 3d. | .3d. |
| 2 | 2,500 | 250 | 25: 0:0 | 2:10:0 | 5/- | 6 | .6 |
| 3 | 3,750 | 375 | 37:10:0 | 3:15:0 | 7/6 | 9 | .9 |
| 4 | 5,000 | 500 | 50: 0:0 | 5: 0:0 | 10/- | 1/ - | 1.2 |
| 5 | 6,250 | 625 | 62:10:0 | 6: 5:0 | 12/6 | 1/3 | 1.5 |
| 6 | 7,500 | 750 | 75: 0:0 | 7:10:0 | 15/- | 1/6 | 1.8 |
| 7 | 8,750 | 875 | 87:10:0 | 8:15:0 | 17/6 | 1/9 | 2.1 |
| 8 | 10,000 | 1,000 | 100: 0:0 | 10: 0:0 | £1:0:0 | 2/- | 2.4 |
| 9 | 11,250 | 1,125 | 112:10:0 | 11: 5:0 | 1:2:6 | 2/3 | 2.7 |

*Table D10⁻¹⁴*

|   | +6 | +5 | +4 | +3 | +2 | +1 | 0 |
|---|---|---|---|---|---|---|---|
| 1 | £1,666:13:4 | £166:13:4 | £16:13:4 | £1:13:4 | 3/4 | 4d. | .4d. |
| 2 | 3,333: 6:8 | 333: 6:8 | 33: 6:8 | 3: 6:8 | 6/8 | 8 | .8 |
| 3 | 5,000: 0:0 | 500: 0:0 | 50: 0:0 | 5: 0:0 | 10/- | 1/- | 1.2 |
| 4 | 6,666:13:4 | 666:13:4 | 66:13:4 | 6:13:4 | 13/4 | 1/4 | 1.6 |
| 5 | 8,333: 6:8 | 833: 6:8 | 83: 6:8 | 8: 6:8 | 16/8 | 1/8 | 2.0 |
| 6 | 10,000: 0:0 | 1,000: 0:0 | 100: 0:0 | 10: 0:0 | £1: 0:0 | 2/- | 2.4 |
| 7 | 11,666:13:4 | 1,166:13:4 | 116:13:4 | 11:13:4 | 1: 3:4 | 2/4 | 2.8 |
| 8 | 13,333: 6:8 | 1,333: 6:8 | 133: 6:8 | 13: 6:8 | 1: 6:8 | 2/8 | 3.2 |
| 9 | 15,000: 0:0 | 1,500: 0:0 | 150: 0:0 | 15: 0:0 | 1:10:0 | 3/- | 3.6 |

*Table D10⁻¹⁵*

|   | +6 | +5 | +4 | +3 | +2 | +1 | 0 |
|---|---|---|---|---|---|---|---|
| 1 | £2,083 :6:8 | £208: 6:8 | £20:16:8 | £2: 1:8 | 4/2 | 5d. | .5d. |
| 2 | 4,166:13:4 | 416:13:4 | 41:13:4 | 4: 3:4 | 8/4 | 10 | 1.0 |
| 3 | 6,250: 0:0 | 625: 0:0 | 62:10:0 | 6: 5:0 | 12/6 | 1/3 | 1.5 |
| 4 | 8,333: 6:8 | 833: 6:8 | 83: 6:8 | 8: 6:8 | 16/8 | 1/8 | 2.0 |
| 5 | 10,416:13:4 | 1,041:13:4 | 104: 3:4 | 10: 8:4 | £1: 0:10 | 2/1 | 2.5 |
| 6 | 12,500: 0:0 | 1,250: 0:0 | 125: 0:0 | 12:10:0 | 1: 5: 0 | 2/6 | 3.0 |
| 7 | 14,583: 6:8 | 1,458: 6:8 | 145:16:8 | 14:11:8 | 1: 9: 2 | 2/11 | 3.5 |
| 8 | 16,666:13:4 | 1,666:13:4 | 166:13:4 | 16:13:4 | 1:13: 4 | 3/4 | 4.0 |
| 9 | 18,750: 0:0 | 1,875: 0:0 | 187:10:0 | 18:15:0 | 1:17: 6 | 3/9 | 4.5 |

*Table D10⁻¹⁶*

|   | +6 | +5 | +4 | +3 | +2 | +1 | 0 |
|---|---|---|---|---|---|---|---|
| 1 | £2,500 | £250 | £25 | £2:10:0 | 5/- | 6d. | .6d. |
| 2 | 5,000 | 500 | 50 | 5: 0:0 | 10/- | 1/- | 1.2 |
| 3 | 7,500 | 750 | 75 | 7:10:0 | 15/- | 1/6 | 1.8 |
| 4 | 10,000 | 1,000 | 100 | 10: 0:0 | £1: 0:0 | 2/- | 2.4 |
| 5 | 12,500 | 1,250 | 125 | 12:10:0 | 1: 5:0 | 2/6 | 3.0 |
| 6 | 15,000 | 1,500 | 150 | 15: 0:0 | 1:10:0 | 3/- | 3.6 |
| 7 | 17,500 | 1,750 | 175 | 17:10:0 | 1:15:0 | 3/6 | 4.2 |
| 8 | 20,000 | 2,000 | 200 | 20: 0:0 | 2: 0:0 | 4/- | 4.8 |
| 9 | 22,500 | 2,250 | 225 | 22:10:0 | 2: 5:0 | 4/6 | 5.4 |

*Table D10⁻¹⁷*

|   | +6 | +5 | +4 | +3 | +2 | +1 | 0 |
|---|---|---|---|---|---|---|---|
| 1 | £2,916:13:4 | £291:13:4 | £29: 3:4 | £2:18:4 | 5/10 | 7d. | .7d. |
| 2 | 5,833: 6:8 | 583: 6:8 | 58: 6:8 | 5:16:8 | 11/8 | 1/2 | 1.4 |
| 3 | 8,750: 0:0 | 875: 0:0 | 87:10:0 | 8:15:0 | 17/6 | 1/9 | 2.1 |
| 4 | 11,666:13:4 | 1,166:13:4 | 116:13:4 | 11:13:4 | £1: 3: 4 | 2/4 | 2.8 |
| 5 | 14,584: 6:8 | 1,458: 6:8 | 145:16:8 | 14:11:8 | 1: 9: 2 | 2/11 | 3.5 |
| 6 | 17,500: 0:0 | 1,750: 0:0 | 175: 0:0 | 17:10:0 | 1:15: 0 | 3/6 | 4.2 |
| 7 | 20,416:13:4 | 2,041:13:4 | 204: 3:4 | 20: 8:4 | 2: 0:10 | 4/1 | 4.9 |
| 8 | 23,333: 6:8 | 2,333: 6:8 | 233: 6:8 | 23: 6:8 | 2: 6: 8 | 4/8 | 5.6 |
| 9 | 26,250: 0:0 | 2,625: 0:0 | 262:10:0 | 26: 5:0 | 2:12: 6 | 5/3 | 6.3 |

*Table D10⁻¹⁸*

|   | +6 | +5 | +4 | +3 | +2 | +1 | 0 |
|---|---|---|---|---|---|---|---|
| 1 | £3,333: 6:8 | £333: 6:8 | £33: 6:8 | £3: 6:8 | 6/8 | 8d. | .8d. |
| 2 | 6,666:13:4 | 666:13:4 | 66:13:4 | 6:13:4 | 13/4 | 1/4 | 1.6 |
| 3 | 10,000: 0:0 | 1,000: 0:0 | 100: 0:0 | 10: 0:0 | £1: 0:0 | 2/- | 2.4 |
| 4 | 13,333: 6:8 | 1,333: 6:8 | 133: 6:8 | 13: 6:8 | 1: 6:8 | 2/8 | 3.2 |
| 5 | 16,666:13:4 | 1,666:13:4 | 166:13:4 | 16:13:4 | 1:13:4 | 3/4 | 4.0 |
| 6 | 20,000: 0:0 | 2,000: 0:0 | 200: 0:0 | 20: 0:0 | 2: 0:0 | 4/- | 4.8 |
| 7 | 23,333: 6:8 | 2,333: 6:8 | 233: 6:8 | 23: 6:8 | 2: 6:8 | 4/8 | 5.6 |
| 8 | 26,666:13:4 | 2,666:13:4 | 266:13:4 | 26:13:4 | 2:13:4 | 5/4 | 6.4 |
| 9 | 30,000: 0:0 | 3,000: 0:0 | 300: 0:0 | 30: 0:0 | 3: 0:0 | 6/- | 7.2 |

*Table D10⁻¹⁹*

|   | +6 | +5 | +4 | +3 | +2 | +1 | 0 |
|---|---|---|---|---|---|---|---|
| 1 | £3,750 | £375 | £37:10:0 | £3:15:0 | 7/6 | 9d. | .9d. |
| 2 | 7,500 | 750 | 75: 0:0 | 7:10:0 | 15/- | 1/6 | 1.8 |
| 3 | 11,250 | 1,125 | 112:10:0 | 11: 5:0 | £1: 2:6 | 2/3 | 2.7 |
| 4 | 15,000 | 1,500 | 150: 0:0 | 15: 0:0 | 1:10:0 | 3/- | 3.6 |
| 5 | 18,750 | 1,875 | 187:10:0 | 18:15:0 | 1:17:6 | 3/9 | 4.5 |
| 6 | 22,500 | 2,250 | 225: 0:0 | 22:10:0 | 2: 5:0 | 4/6 | 5.4 |
| 7 | 26,250 | 2,625 | 262:10:0 | 26: 5:0 | 2:12:6 | 5/3 | 6.3 |
| 8 | 30,000 | 3,000 | 300: 0:0 | 30: 0:0 | 3: 0:0 | 6/- | 7.2 |
| 9 | 33,750 | 3,375 | 337:10:0 | 33:15:0 | 3: 7:6 | 6/9 | 8.1 |

*Table D1*

|   | +6 | +5 | +4 | +3 | +2 | +1 | 0 | -1 | -2 |
|---|---|---|---|---|---|---|---|---|---|
| 1 | £4,166:13:4 | £416:13:4 | £41:13:4 | £4: 3:4 | 8/4 | 10d. | 1d. | .1 | .01d. |
| 2 | 8,333: 6:8 | 833: 6:8 | 83: 6:8 | 8: 6:8 | 16/8 | 1/8 | 2 | .2 | .02 |
| 3 | 12,500: 0:0 | 1,250: 0:0 | 125: 0:0 | 12:10:0 | £1: 5:0 | 2/6 | 3 | .3 | .03 |
| 4 | 16,666:13:4 | 1,666:13:4 | 166:13:4 | 16:13:4 | 1:13:4 | 3/4 | 4 | .4 | .04 |
| 5 | 20,833: 6:8 | 2,083: 6:8 | 208: 6:8 | 20:16:8 | 2: 1:8 | 4/2 | 5 | .5 | .05 |
| 6 | 25,000: 0:0 | 2,500: 0:0 | 250: 0:0 | 25: 0:0 | 2:10:0 | 5/- | 6 | .6 | .06 |
| 7 | 29,166:13:4 | 2,916:13:4 | 291:13:4 | 29: 3:4 | 2:18:4 | 5/10 | 7 | .7 | .07 |
| 8 | 33,333: 6:8 | 3,333: 6:8 | 333: 6:8 | 33: 6:8 | 3: 6:8 | 6/8 | 8 | .8 | .08 |
| 9 | 27,500: 0:0 | 3,750: 0:0 | 375: 0:0 | 37:10:0 | 3:15:0 | 7/6 | 9 | .9 | .09 |

*Table D2*

|   | +6 | +5 | +4 | +3 | +2 | +1 | 0 | -1 | -2 |
|---|---|---|---|---|---|---|---|---|---|
| 1 | £8,333: 6:8 | £833: 6:8 | £83: 6:8 | £8: 6:8 | 16/8 | 1/8 | 2d. | .2 | .02d. |
| 2 | 16,666:13:4 | 1,666:13:4 | 166:13:4 | 16:13:4 | £1:13:4 | 3/4 | 4 | .4 | .04 |
| 3 | 25,000: 0:0 | 2,500: 0:0 | 250: 0:0 | 25: 0:0 | 2:10:0 | 5/- | 6 | .6 | .06 |
| 4 | 33,333: 6:8 | 3,333: 6:8 | 333: 6:8 | 33: 6:8 | 3: 6:8 | 6/8 | 8 | .8 | .08 |
| 5 | 41,666:13:4 | 4,166:13:4 | 416:13:4 | 41:13:4 | 4: 3:4 | 8/4 | 10 | 1.0 | .10 |
| 6 | 50,000: 0:0 | 5,000: 0:0 | 500: 0:0 | 50: 0:0 | 5: 0:0 | 10/- | 1/- | 1.2 | .12 |
| 7 | 58,333: 6:8 | 5,833: 6:8 | 583: 6:8 | 58: 6:8 | 5:16:8 | 11/8 | 1/2 | 1.4 | .14 |
| 8 | 66,666:13:4 | 6,666:13:4 | 666:13:4 | 66:13:4 | 6:13:4 | 13/4 | 1/4 | 1.6 | .16 |
| 9 | 75,000: 0:0 | 7,500: 0:0 | 750: 0:0 | 75: 0:0 | 7:10:0 | 15/- | 1/6 | 1.8 | .18 |

*Table D3*

|   | +6 | +5 | +4 | +3 | +2 | +1 | 0 | -1 | -2 |
|---|---|---|---|---|---|---|---|---|---|
| 1 | £12,500 | £1,250 | £125 | £12:10:0 | £1: 5:0 | 2/6 | 3d. | .3d. | .03d. |
| 2 | 25,000 | 2,500 | 250 | 25: 0:0 | 2:10:0 | 5/- | 6 | .6 | .06 |
| 3 | 37,500 | 3,750 | 375 | 37:10:0 | 3:15:0 | 7/6 | 9 | .9 | .09 |
| 4 | 50,000 | 5,000 | 500 | 50: 0:0 | 5: 0:0 | 10/- | 1/- | 1.2 | .12 |
| 5 | 62,500 | 6,250 | 625 | 62:10:0 | 6: 5:0 | 12/6 | 1/3 | 1.5 | .15 |
| 6 | 75,000 | 7,500 | 750 | 75: 0:0 | 7:10:0 | 15/- | 1/6 | 1.8 | .18 |
| 7 | 87,500 | 8,750 | 875 | 87:10:0 | 8:15:0 | 17/6 | 1/9 | 2.1 | .21 |
| 8 | 100,000 | 10,000 | 1,000 | 100: 0:0 | 10: 0:0 | £1:0:0 | 2/- | 2.4 | .24 |
| 9 | 112,500 | 11,250 | 1,125 | 112:10:0 | 11: 5:0 | 1: 2:6 | 2/3 | 2.7 | .27 |

Table D4

| | +6 | +5 | +4 | +3 | +2 | +1 | 0 | −1 | −2 |
|---|---|---|---|---|---|---|---|---|---|
| 1 | £16,666:13:4 | £1,666:13:4 | £166:13:4 | £16:13:4 | £1:13:4 | 3/4 | 4d. | .4d. | .04d. |
| 2 | 33,333: 6:8 | 3,333: 6:8 | 333: 6:8 | 33: 6:8 | 3: 6:8 | 6/8 | 8 | .8 | .08 |
| 3 | 50,000: 0:0 | 5,000: 0:0 | 500: 0:0 | 50: 0:0 | 5: 0:0 | 10/– | 1/– | 1.2 | .12 |
| 4 | 66,666:13:4 | 6,666:13:4 | 666:13:4 | 66:13:4 | 6:13:4 | 13/4 | 1/4 | 1.6 | .16 |
| 5 | 83,333: 6:8 | 8,333: 6:8 | 833: 6:8 | 83: 6:8 | 8: 6:8 | 16/8 | 1/8 | 2.0 | .20 |
| 6 | 100,000: 0:0 | 10,000: 0:0 | 1,000: 0:0 | 100: 0:0 | 10: 0:0 | £1: 0:0 | 2/– | 2.4 | .24 |
| 7 | 116,666:13:4 | 11,666:13:4 | 1,166:13:4 | 116:13:4 | 11:13:4 | 1: 3:4 | 2/4 | 2.8 | .28 |
| 8 | 133,333: 6:8 | 13,333: 6:8 | 1,333: 6:8 | 133: 6:8 | 13: 6:8 | 1: 6:8 | 2/8 | 3.2 | .32 |
| 9 | 150,000: 0:0 | 15,000: 0:0 | 1,500: 0:0 | 150: 0:0 | 15: 0:0 | 1:10:0 | 3/– | 3.6 | .36 |

Table D5

| | +6 | +5 | +4 | +3 | +2 | +1 | 0 | −1 | −2 |
|---|---|---|---|---|---|---|---|---|---|
| 1 | £20,833: 6:8 | £2,083: 6:8 | £208: 6:8 | £20:16:8 | £2: 1:8 | 4/2 | 5d. | .5d. | .05d. |
| 2 | 41,666:13:4 | 4,166:13:4 | 416:13:4 | 41:13:4 | 4: 3:4 | 8/4 | 10 | 1.0 | .10 |
| 3 | 62,500: 0:0 | 6,250: 0:0 | 625: 0:0 | 62:10:0 | 6: 5:0 | 12/6 | 1/3 | 1.5 | .15 |
| 4 | 83,333: 6:8 | 8,333: 6:8 | 833: 6:8 | 83: 6:8 | 8: 6:8 | 16/8 | 1/8 | 2.0 | .20 |
| 5 | 104,166:13:4 | 10,416:13:4 | 1,041:13:4 | 104: 3:4 | 10: 8:4 | £1: 0:10 | 2/1 | 2.5 | .25 |
| 6 | 125,000: 0:0 | 12,500: 0:0 | 1,250: 0:0 | 125: 0:0 | 12:10:0 | 1: 5:0 | 2/6 | 3.0 | .30 |
| 7 | 145,833: 6:8 | 14,583: 6:8 | 1,458: 6:8 | 145:16:8 | 14:11:8 | 1: 9:2 | 2/11 | 3.5 | .35 |
| 8 | 166,666:13:4 | 16,666:13:4 | 1,666:13:4 | 166:13:4 | 16:13:4 | 1:13:4 | 3/4 | 4.0 | .40 |
| 9 | 187,500: 0:0 | 18,750: 0:0 | 1,875: 0:0 | 187:10:0 | 18:15:0 | 1:17:6 | 3/9 | 4.5 | .45 |

Table D6

| | +6 | +5 | +4 | +3 | +2 | +1 | 0 | −1 | −2 |
|---|---|---|---|---|---|---|---|---|---|
| 1 | £25,000 | £2,500 | £250 | £25 | £2:10:0 | 5/– | 6d. | .6d. | .06d. |
| 2 | 50,000 | 5,000 | 500 | 50 | 5: 0:0 | 10/– | 1/– | 1.2 | .12 |
| 3 | 75,000 | 7,500 | 750 | 75 | 7:10:0 | 15/– | 1/6 | 1.8 | .18 |
| 4 | 100,000 | 10,000 | 1,000 | 100 | 10: 0:0 | £1: 0:0 | 2/– | 2.4 | .24 |
| 5 | 125,000 | 12,500 | 1,250 | 125 | 12:10:0 | 1: 5:0 | 2/6 | 3.0 | .30 |
| 6 | 150,000 | 15,000 | 1,500 | 150 | 15: 0:0 | 1:10:0 | 3/– | 3.6 | .36 |
| 7 | 175,000 | 17,500 | 1,750 | 175 | 17:10:0 | 1:15:0 | 3/6 | 4.2 | .42 |
| 8 | 200,000 | 20,000 | 2,000 | 200 | 20: 0:0 | 2: 0:0 | 4/– | 4.8 | .48 |
| 9 | 225,000 | 22,500 | 2,250 | 225 | 22:10:0 | 2: 5:0 | 4/6 | 5.4 | .54 |

Table D7

| | +6 | +5 | +4 | +3 | +2 | +1 | 0 | −1 | −2 |
|---|---|---|---|---|---|---|---|---|---|
| 1 | £29,166:13:4 | £2,916:13:4 | £291:13:4 | £29: 3:4 | £2:18:4 | 5/10 | 7d. | .7d. | .07d. |
| 2 | 58,333: 6:8 | 5,833: 6:8 | 583: 6:8 | 58: 6:8 | 5:16:8 | 11/8 | 1/2 | 1.4 | .14 |
| 3 | 87,500: 0:0 | 8,750: 0:0 | 875: 0:0 | 87:10:0 | 8:15:0 | 17/6 | 1/9 | 2.1 | .21 |
| 4 | 116,666:13:4 | 11,666:13:4 | 1,166:13:4 | 116:13:4 | 11:13:4 | £1: 3:4 | 2/4 | 2.8 | .28 |
| 5 | 145,833: 6:8 | 14,583: 6:8 | 1,458: 6:8 | 145:16:8 | 14:11:8 | 1: 9:2 | 2/11 | 3.5 | .35 |
| 6 | 175,000: 0:0 | 17,500: 0:0 | 1,750: 0:0 | 175: 0:0 | 17:10:0 | 1:15: 0 | 3/6 | 4.2 | .42 |
| 7 | 204,166:13:4 | 20,416:13:4 | 2,041:13:4 | 204: 3:4 | 20: 8:4 | 2: 0:10 | 4/1 | 4.9 | .49 |
| 8 | 233,333: 6:8 | 23,333: 6:8 | 2,333: 6:8 | 233: 6:8 | 23: 6:8 | 2: 6: 8 | 4/8 | 5.6 | .56 |
| 9 | 262,500: 0:0 | 26,250: 0:0 | 2,625: 0:0 | 262:10:0 | 26: 5:0 | 2:12: 6 | 5/3 | 6.3 | .63 |

Table D8

| | +6 | +5 | +4 | +3 | +2 | +1 | 0 | −1 | −2 |
|---|---|---|---|---|---|---|---|---|---|
| 1 | £33,333: 6:8 | £3,333: 6:8 | £333: 6:8 | £33: 6:8 | £3: 6:8 | 6/8 | 8d. | .8d. | .08d. |
| 2 | 66,666:13:4 | 6,666:13:4 | 666:13:4 | 66:13:4 | 6:13:4 | 13/4 | 1/4 | 1.6 | .16 |
| 3 | 100,000: 0:0 | 10,000: 0:0 | 1,000: 0:0 | 100: 0:0 | 10: 0:0 | £1: 0:0 | 2/– | 2.4 | .24 |
| 4 | 133,333: 6:8 | 13,333: 6:8 | 1,333: 6:8 | 133: 6:8 | 13: 6:8 | 1: 6:8 | 2/8 | 3.2 | .32 |
| 5 | 166,666:13:4 | 16,666:13:4 | 1,666:13:4 | 166:13:4 | 16:13:4 | 1:13:4 | 3/4 | 4.0 | .40 |
| 6 | 200,000: 0:0 | 20,000: 0:0 | 2,000: 0:0 | 200: 0:0 | 20: 0:0 | 2: 0:0 | 4/– | 4.8 | .48 |
| 7 | 233,333: 6:8 | 23,333: 6:8 | 2,333: 6:8 | 233: 6:8 | 23: 6:8 | 2: 6:8 | 4/8 | 5.6 | .56 |
| 8 | 266,666:13:4 | 26,666:13:4 | 2,666:13:4 | 266:13:4 | 26:13:4 | 2:13:4 | 5/4 | 6.4 | .64 |
| 9 | 300,000: 0:0 | 30,000: 0:0 | 3,000: 0:0 | 300: 0:0 | 30: 0:0 | 3: 0:0 | 6/– | 7.2 | .72 |

Table D9

| | +6 | +5 | +4 | +3 | +2 | +1 | 0 | −1 | −2 |
|---|---|---|---|---|---|---|---|---|---|
| 1 | £37,500 | £3,750 | £375 | £ 37:10:0 | £3:15:0 | 7/6 | 9d. | .9d. | .09d. |
| 2 | 75,000 | 7,500 | 750 | 75: 0:0 | 7:10:0 | 15/– | 1/6 | 1.8 | .18 |
| 3 | 112,500 | 11,250 | 1,125 | 112: 0:0 | 11: 5:0 | £1: 2:6 | 2/3 | 2.7 | .27 |
| 4 | 150,000 | 15,000 | 1,500 | 150: 0:0 | 15: 0:0 | 1:10:0 | 3/– | 3.6 | .36 |
| 5 | 187,500 | 18,750 | 1,875 | 187:10:0 | 18:15:0 | 1:17:6 | 3/9 | 4.5 | .45 |
| 6 | 225,000 | 22,500 | 2,250 | 225: 0:0 | 22:10:0 | 2: 5:0 | 4/6 | 5.4 | .54 |
| 7 | 262,500 | 26,250 | 2,625 | 262:10:0 | 26: 5:0 | 2:12:6 | 5/3 | 6.3 | .63 |
| 8 | 300,000 | 30,000 | 3,000 | 300: 0:0 | 30: 0:0 | 3: 0:0 | 6/– | 7.2 | .72 |
| 9 | 337,500 | 33,750 | 3,375 | 337:10:0 | 33:15:0 | 3: 7:6 | 6/9 | 8.1 | .81 |

Table D10

|   | ÷6 | ÷5 | ÷4 | ÷3 | ÷2 | ÷1 | 0 | −1 | −2 |
|---|---|---|---|---|---|---|---|---|---|
| 1 | £41,666:13:4 | £4,166:13:4 | £416:13:4 | £41:13:4 | £4: 3:4 | 8/4 | 10d. | 1d. | .1d. |
| 2 | 83,333: 6:8 | 8,333: 6:8 | 833: 6:8 | 83: 6:8 | 8: 6:8 | 16/8 | 1/8 | 2 | .2 |
| 3 | 125,000: 0:0 | 12,500: 0:0 | 1,250: 0:0 | 125: 0:0 | 12:10:0 | £1: 5:0 | 2/6 | 3 | .3 |
| 4 | 166,666:13:4 | 16,666:13:4 | 1,666:13:4 | 166:13:4 | 16:13:4 | 1:13:4 | 3/4 | 4 | .4 |
| 5 | 208,333: 6:8 | 20,833: 6:8 | 2,083: 6:8 | 208: 6:8 | 20:16:8 | 2: 1:8 | 4/2 | 5 | .5 |
| 6 | 250,000: 0:0 | 25,000: 0:0 | 2,500: 0:0 | 250: 0:0 | 25: 0:0 | 2:10:0 | 5/– | 6 | .6 |
| 7 | 291,666:13:4 | 29,166:13:4 | 2,916:13:4 | 291:13:4 | 29: 3:4 | 2:18:4 | 5/10 | 7 | .7 |
| 8 | 333,333: 6:8 | 33,333: 6:8 | 3,333: 6:8 | 333: 6:8 | 33: 6:8 | 3: 6:8 | 6/8 | 8 | .8 |
| 9 | 375,000: 0:0 | 37,500: 0:0 | 3,750: 0:0 | 375: 0:0 | 37:10:0 | 3:15:0 | 7/6 | 9 | .9 |

Table D11

|   | ÷6 | ÷5 | ÷4 | ÷3 | ÷2 | ÷1 | 0 | −1 | −2 |
|---|---|---|---|---|---|---|---|---|---|
| 1 | £45,833: 6:8 | £4,583: 6:8 | £458: 6:8 | £45:16:8 | £4:11:8 | 9/2 | 11d. | 1.1d. | .11d. |
| 2 | 91,666:13:4 | 9,166:13:4 | 916:13:4 | 91:13:4 | 9: 3:4 | 18/4 | 1/10 | 2.2 | .22 |
| 3 | 137,500: 0:0 | 13,750: 0:0 | 1,375: 0:0 | 137:10:0 | 13:15:0 | £1: 7:6 | 2/9 | 3.3 | .33 |
| 4 | 183,333: 6:8 | 18,333: 6:8 | 1,833: 6:8 | 183: 6:8 | 18: 6:8 | 1:16:8 | 3/8 | 4.4 | .44 |
| 5 | 229,166:13:4 | 22,916:13:4 | 2,291:13:4 | 229: 3:4 | 22:18:4 | 2: 5:10 | 4/7 | 5.5 | .55 |
| 6 | 275,000: 0:0 | 27,500: 0:0 | 2,750: 0:0 | 275: 0:0 | 27:10:0 | 2:15:0 | 5/6 | 6.6 | .66 |
| 7 | 320,888: 6:8 | 32,088: 6:8 | 3,208: 6:8 | 320:16:8 | 32: 1:8 | 3: 4:2 | 6/5 | 7.7 | .77 |
| 8 | 366,666:13:4 | 36,666:13:4 | 3,666:13:4 | 366:13:4 | 36:13:4 | 3:13:4 | 7/4 | 8.8 | .88 |
| 9 | 412,500: 0:0 | 41,250: 0:0 | 4,125: 0:0 | 412:10:0 | 41: 5:0 | 4: 2:6 | 8/3 | 9.9 | .99 |

Table S1

|   | +2 | +1 | 0 | −1 | −2 |
|---|---|---|---|---|---|
| 1 | £5 | 10/– | 1/– | 1.2d. | .12d. |
| 2 | 10 | £1: 0:0 | 2/– | 2.4 | .24 |
| 3 | 15 | 1:10:0 | 3/– | 3.6 | .36 |
| 4 | 20 | 2: 0:0 | 4/– | 4.8 | .48 |
| 5 | 25 | 2:10:0 | 5/– | 6.0 | .60 |
| 6 | 30 | 3: 0:0 | 6/– | 7.2 | .72 |
| 7 | 35 | 3:10:0 | 7/– | 8.4 | .84 |
| 8 | 40 | 4: 0:0 | 8/– | 9.6 | .96 |
| 9 | 45 | 4:10:0 | 9/– | 10.8 | 1.08 |

Table S2

|   | +1 | 0 | −1 | −2 |
|---|---|---|---|---|
| 1 | £1:0:0 | 2/– | 2.4d. | .24d. |
| 2 | 2:0:0 | 4/– | 4.8 | .48 |
| 3 | 3:0:0 | 6/– | 7.2 | .72 |
| 4 | 4:0:0 | 8/– | 9.6 | .96 |
| 5 | 5:0:0 | 10/– | 1/– | 1.20 |
| 6 | 6:0:0 | 12/– | 1/2.4 | 1.44 |
| 7 | 7:0:0 | 14/– | 1/4.8 | 1.68 |
| 8 | 8:0:0 | 16/– | 1/7.2 | 1.92 |
| 9 | 9:0:0 | 18/– | 1/9.6 | 2.16 |

Table S3

|   | +2 | +1 | 0 | −1 | −2 |
|---|---|---|---|---|---|
| 1 | £15 | £1:10:0 | 3/– | 3.6 | .36d. |
| 2 | 30 | 3: 0:0 | 6/– | 7.2 | .72 |
| 3 | 45 | 4:10:0 | 9/– | 10.8 | 1.08 |
| 4 | 60 | 6: 0:0 | 12/– | 1/2.4 | 1.44 |
| 5 | 75 | 7:10:0 | 15/– | 1/6. | 1.80 |
| 6 | 90 | 9: 0:0 | 18/– | 1/9.6 | 2.16 |
| 7 | 105 | 10:10:0 | £1:1:0 | 2/1.2 | 2.52 |
| 8 | 120 | 12: 0:0 | 1:4:0 | 2/4.8 | 2.88 |
| 9 | 135 | 13:10:0 | 1:7:0 | 2/8.4 | 3.24 |

Table S4

|   | +1 | 0 | −1 | −2 |
|---|---|---|---|---|
| 1 | £2 | 4/– | 4.8d. | .48 |
| 2 | 4 | 8/– | 9.6 | .96 |
| 3 | 6 | 12/– | 1/2.4 | 1.44 |
| 4 | 8 | 16/– | 1/7.2 | 1.92 |
| 5 | 10 | £1: 0:0 | 2/– | 2.40 |
| 6 | 12 | 1: 4:0 | 2/4.8 | 2.88 |
| 7 | 14 | 1: 8:0 | 2/9.6 | 3.36 |
| 8 | 16 | 1:12:0 | 3/2.4 | 3.84 |
| 9 | 18 | 1:16:0 | 3/7.2 | 4.32 |

Table S5

|   | +2 | +1 | 0 | −1 | −2 |
|---|---|---|---|---|---|
| 1 | £25 | £2:10:0 | 5/– | 6d. | .6d. |
| 2 | 50 | 5: 0:0 | 10/– | 1/– | 1.2 |
| 3 | 75 | 7:10:0 | 15/– | 1/6 | 1.8 |
| 4 | 100 | 10: 0:0 | £1: 0:0 | 2/– | 2.4 |
| 5 | 125 | 12:10:0 | 1: 5:0 | 2/6 | 3.0 |
| 6 | 150 | 15: 0:0 | 1:10:0 | 3/– | 3.6 |
| 7 | 175 | 17:10:0 | 1:15:0 | 3/6 | 4.2 |
| 8 | 200 | 20: 0:0 | 2: 0:0 | 4/– | 4.8 |
| 9 | 225 | 22:10:0 | 2: 5:0 | 4/6 | 5.4 |

Table S6

|   | +1 | 0 | −1 | −2 |
|---|---|---|---|---|
| 1 | £3 | 6/– | 7.2d. | .72d. |
| 2 | 6 | 12/– | 1/2.4 | 1.44 |
| 3 | 9 | 18/– | 1/9.6 | 2.16 |
| 4 | 12 | £1: 4:0 | 2/4.8 | 2.88 |
| 5 | 15 | 1:10:0 | 3/– | 3.60 |
| 6 | 18 | 1:16:0 | 3/7.2 | 4.32 |
| 7 | 21 | 2: 2:0 | 4/2.4 | 5.04 |
| 8 | 24 | 2: 8:0 | 4/9.6 | 5.76 |
| 9 | 27 | 2:14:0 | 5/4.8 | 6.48 |

Table S7

|   | +2 | +1 | 0 | −1 | −2 |
|---|---|---|---|---|---|
| 1 | £35 | £3:10:0 | 7/– | 8.4d. | .84d. |
| 2 | 70 | 7: 0:0 | 14/– | 1/4.8 | 1.68 |
| 3 | 105 | 10:10:0 | £1: 1:0 | 2/1.2 | 2.52 |
| 4 | 140 | 14: 0:0 | 1: 8:0 | 2/9.6 | 3.36 |
| 5 | 175 | 17:10:0 | 1:15:0 | 3/6 | 4.20 |
| 6 | 210 | 21: 0:0 | 2: 2:0 | 4/2.4 | 5.04 |
| 7 | 245 | 24:10:0 | 2: 9:0 | 4/10.8 | 5.88 |
| 8 | 280 | 28: 0:0 | 2:16:0 | 5/7.2 | 6.72 |
| 9 | 315 | 31:10:0 | 3: 3:0 | 6/3.6 | 7.56 |

Table S8

|   | +1 | 0 | −1 | −2 |
|---|---|---|---|---|
| 1 | £4 | 8/– | 9.6d. | .96d. |
| 2 | 8 | 16/– | 1/7.2 | 1.92 |
| 3 | 12 | £1: 4:0 | 2/4.8 | 2.88 |
| 4 | 16 | 1:12:0 | 3/2.4 | 3.84 |
| 5 | 20 | 2: 0:0 | 4/– | 4.80 |
| 6 | 24 | 2: 8:0 | 4/9.6 | 5.76 |
| 7 | 28 | 2:16:0 | 5/7.2 | 6.72 |
| 8 | 32 | 3: 4:0 | 6/4.8 | 7.68 |
| 9 | 36 | 3:12:0 | 7/2.4 | 8.64 |

Table S9

|   | +2    | +1      | 0       | −1      | −2     |
|---|-------|---------|---------|---------|--------|
| 1 | £45   | £4:10:0 | 9/−     | 10.8d.  | 1.08d. |
| 2 | 90    | 9: 0:0  | 18/−    | 1/9.6   | 2.16   |
| 3 | 135   | 13:10:0 | £1: 7:0 | 2/8.4   | 3.24   |
| 4 | 180   | 18: 0:0 | 1:16:0  | 3/7.2   | 4.32   |
| 5 | 225   | 22:10:0 | 2: 5:0  | 4/6     | 5.40   |
| 6 | 270   | 27: 0:0 | 2:14:0  | 5/4.8   | 6.48   |
| 7 | 315   | 31:10:0 | 3: 3:0  | 6/3.6   | 7.56   |
| 8 | 360   | 36: 0:0 | 3:12:0  | 7/2.4   | 8.64   |
| 9 | 405   | 40:10:0 | 4: 1:0  | 8/1.2   | 9.72   |

Table S10

|   | +1  | 0       | −1   | −2    |
|---|-----|---------|------|-------|
| 1 | £5  | 10/−    | 1/−  | 1.2d. |
| 2 | 10  | £1: 0:0 | 2/−  | 2.4   |
| 3 | 15  | 1:10:0  | 3/−  | 3.6   |
| 4 | 20  | 2: 0:0  | 4/−  | 4.8   |
| 5 | 25  | 2:10:0  | 5/−  | 6.0   |
| 6 | 30  | 3: 0:0  | 6/−  | 7.2   |
| 7 | 35  | 3:10:0  | 7/−  | 8.4   |
| 8 | 40  | 4: 0:0  | 8/−  | 9.6   |
| 9 | 45  | 4:10:0  | 9/−  | 10.8  |

Table L1 1

|    | 0   | −1    | −2    | −3    | −4    | S10    | S1    | D   | D/8    |
|----|-----|-------|-------|-------|-------|--------|-------|-----|--------|
| 1  | £1  | 2/−   | 2.4d. | .24d. | .024d.| 10/−   | 1/−   | 1d. | .125d. |
| 2  | 2   | 4/−   | 4.8   | .48   | .048  | 1: 0:0 | 2/−   | 2   | .250   |
| 3  | 3   | 6/−   | 7.2   | .72   | .072  | 1:10:0 | 3/−   | 3   | .375   |
| 4  | 4   | 8/−   | 9.6   | .96   | .096  | 2: 0:0 | 4/−   | 4   | .500   |
| 5  | 5   | 10/−  | 1/−   | 1.20  | .120  | 2:10:0 | 5/−   | 5   | .625   |
| 6  | 6   | 12/−  | 1/2.4 | 1.44  | .144  | 3: 0:0 | 6/−   | 6   | .750   |
| 7  | 7   | 14/−  | 1/4.8 | 1.68  | .168  | 3:10:0 | 7/−   | 7   | .875   |
| 8  | 8   | 16/−  | 1/7.2 | 1.92  | .192  | 4: 0:0 | 8/−   | 8   | ------ |
| 9  | 9   | 18/−  | 1/9.6 | 2.16  | .216  | 4:10:0 | 9/−   | 9   | ------ |
| 10 | --- | ---   | ---   | ---   | ---   | ---    | ---   | 10  | ------ |
| 11 | --- | ---   | ---   | ---   | ---   | ---    | ---   | 11  | ------ |

Table L1 2

|    | 0   | −1     | −2    | −3    | −4    | S10 | S1   | D    | D/8   |
|----|-----|--------|-------|-------|-------|-----|------|------|-------|
| 1  | £2  | 4/−    | 4.8d. | .48   | .048d.| £1  | 2/−  | 2d.  | .25d. |
| 2  | 4   | 8/−    | 9.6   | .96   | .096  | 2   | 4/−  | 4    | .50   |
| 3  | 6   | 12/−   | 1/2.4 | 1.44  | .144  | 3   | 6/−  | 6    | .75   |
| 4  | 8   | 16/−   | 1/7.2 | 1.92  | .192  | 4   | 8/−  | 8    | 1.00  |
| 5  | 10  | £1: 0:0| 2/−   | 2.40  | .240  | 5   | 10/− | 10   | 1.25  |
| 6  | 12  | 1: 4:0 | 2/4.8 | 2.88  | .288  | 6   | 12/− | 1/−  | 1.50  |
| 7  | 14  | 1: 8:0 | 2/9.6 | 3.36  | .336  | 7   | 14/− | 1/ 2 | 1.75  |
| 8  | 16  | 1:12:0 | 3/2.4 | 3.84  | .384  | 8   | 16/− | 1/ 4 | ----- |
| 9  | 18  | 1:16:0 | 3/7.2 | 4.32  | .432  | 9   | 18/− | 1/ 6 | ----- |
| 10 | --- | ---    | ---   | ---   | ---   | --- | ---  | 1/ 8 | ----- |
| 11 | --- | ---    | ---   | ---   | ---   | --- | ---  | 1/10 | ----- |

Table L1 3

|    | 0   | −1      | −2    | −3    | −4    | S10     | S1      | D   | D/8    |
|----|-----|---------|-------|-------|-------|---------|---------|-----|--------|
| 1  | £3  | 6/−     | 7.2d. | .72d. | .072d.| £1:10:0 | 3/−     | 3d. | .375d. |
| 2  | 6   | 12/−    | 1/2.4 | 1.44  | .144  | 3: 0:0  | 6/−     | 6   | .750   |
| 3  | 9   | 18/−    | 1/9.6 | 2.16  | .216  | 4:10:0  | 9/−     | 9   | 1.125  |
| 4  | 12  | £1: 4:0 | 2/4.8 | 2.88  | .288  | 6: 0:0  | 12/−    | 1/− | 1.500  |
| 5  | 15  | 1:10:0  | 3/−   | 3.60  | .360  | 7:10:0  | 15/−    | 1/3 | 1.875  |
| 6  | 18  | 1:16:0  | 3/7.2 | 4.32  | .432  | 9: 0:0  | 18/−    | 1/6 | 2.250  |
| 7  | 21  | 2: 2:0  | 4/2.4 | 5.04  | .504  | 10:10:0 | £1:1:0  | 1/9 | 2.625  |
| 8  | 24  | 2: 8:0  | 4/9.6 | 5.76  | .576  | 12: 0:0 | 1:4:0   | 2/− | -----  |
| 9  | 27  | 2:14:0  | 5/4.8 | 6.48  | .648  | 13:10:0 | 1:7:0   | 2/3 | -----  |
| 10 | --- | ---     | ---   | ---   | ---   | ---     | ---     | 2/6 | -----  |
| 11 | --- | ---     | ---   | ---   | ---   | ---     | ---     | 2/9 | -----  |

Table L1 4

|    | 0   | −1      | −2    | −3    | −4    | S10 | S1      | D   | D/8   |
|----|-----|---------|-------|-------|-------|-----|---------|-----|-------|
| 1  | £4  | 8/−     | 9.6d. | .96d. | .096d.| £2  | 4/−     | 4d. | .5    |
| 2  | 8   | 16/−    | 1/7.2 | 1.92  | .192  | 4   | 8/−     | 8   | 1.0   |
| 3  | 12  | £1: 4:0 | 2/4.8 | 2.88  | .288  | 6   | 12/−    | 1/− | 1.5   |
| 4  | 16  | 1:12:0  | 3/2.4 | 3.84  | .384  | 8   | 16/−    | 1/4 | 2.0   |
| 5  | 20  | 2: 0:0  | 4/−   | 4.80  | .480  | 10  | £1: 0:0 | 1/8 | 2.5   |
| 6  | 24  | 2: 8:0  | 4/9.6 | 5.76  | .576  | 12  | 1: 4:0  | 2/− | 3.0   |
| 7  | 28  | 2:16:0  | 5/7.2 | 6.72  | .672  | 14  | 1: 8:0  | 2/4 | 3.5   |
| 8  | 32  | 3: 4:0  | 6/4.8 | 7.68  | .768  | 16  | 1:12:0  | 2/8 | ----- |
| 9  | 36  | 3:12:0  | 7/2.4 | 8.64  | .864  | 18  | 1:16:0  | 3/− | ----- |
| 10 | --- | ---     | ---   | ---   | ---   | --- | ---     | 3/4 | ----- |
| 11 | --- | ---     | ---   | ---   | ---   | --- | ---     | 3/8 | ----- |

Table L1 5

|    | 0   | −1      | −2   | −3    | −4    | S10     | S1      | D    | D/8    |
|----|-----|---------|------|-------|-------|---------|---------|------|--------|
| 1  | £5  | 10/−    | 1/−  | 1.2d. | .12d. | £2:10:0 | 5/−     | 5d.  | .625d. |
| 2  | 10  | £1: 0:0 | 2/−  | 2.4   | .24   | 5: 0:0  | 10/−    | 10   | 1.250  |
| 3  | 15  | 1:10:0  | 3/−  | 3.6   | .36   | 7:10:0  | 15/−    | 1/ 3 | 1.875  |
| 4  | 20  | 2: 0:0  | 4/−  | 4.8   | .48   | 10: 0:0 | £1: 0:0 | 1/ 8 | 2.500  |
| 5  | 25  | 2:10:0  | 5/−  | 6.0   | .60   | 12:10:0 | 1: 5:0  | 2/ 1 | 3.125  |
| 6  | 30  | 3: 0:0  | 6/−  | 7.2   | .72   | 15: 0:0 | 1:10:0  | 2/ 6 | 3.750  |
| 7  | 35  | 3:10:0  | 7/−  | 8.4   | .84   | 17:10:0 | 1:15:0  | 2/11 | 4.375  |
| 8  | 40  | 4: 0:0  | 8/−  | 9.6   | .96   | 20: 0:0 | 2: 0:0  | 3/ 4 | -----  |
| 9  | 45  | 4:10:0  | 9/−  | 10.8  | .08   | 22:10:0 | 2: 5:0  | 3/ 9 | -----  |
| 10 | --- | ---     | ---  | ---   | ---   | ---     | ---     | 4/ 2 | -----  |
| 11 | --- | ---     | ---  | ---   | ---   | ---     | ---     | 4/ 7 | -----  |

Table L1 6

|   | 0 | −1 | −2 | −3 | −4 | S10 | S1 | D | D/8 |
|---|---|---|---|---|---|---|---|---|---|
| 1 | £6 | 12/− | 1/2.4d. | 1.44d. | .144d. | £3 | 6/− | 6d. | .75d. |
| 2 | 12 | £1: 4:0 | 2/4.8 | 2.88 | .288 | 6 | 12/− | 1/− | 1.50 |
| 3 | 18 | 1:16:0 | 3/7.2 | 4.32 | .432 | 9 | 18/− | 1/6 | 2.25 |
| 4 | 24 | 2: 8:0 | 4/9.6 | 5.76 | .576 | 12 | £1: 4:0 | 2/− | 3.00 |
| 5 | 30 | 3: 0:0 | 6/− | 7.20 | .720 | 15 | 1:10:0 | 2/6 | 3.75 |
| 6 | 36 | 3:12:0 | 7/2.4 | 8.64 | .864 | 18 | 1:16:0 | 3/− | 4.50 |
| 7 | 42 | 4: 4:0 | 8/4.8 | 10.08 | 1.008 | 21 | 2: 2:0 | 3/6 | 5.25 |
| 8 | 48 | 4:16:0 | 9/7.2 | 11.52 | 1.152 | 24 | 2: 8:0 | 4/− | ------ |
| 9 | 54 | 5: 8:0 | 10/9.6 | 1/0.96 | 1.296 | 27 | 2:14:0 | 4/6 | ------ |
| 10 | ------ | ------ | ------ | ------ | ------ | ------ | ------ | 5/− | ------ |
| 11 | ------ | ------ | ------ | ------ | ------ | ------ | ------ | 5/6 | ------ |

Table L1 7

|   | 0 | −1 | −2 | −3 | −4 | S10 | S1 | D | D/8 |
|---|---|---|---|---|---|---|---|---|---|
| 1 | £7 | 14/− | 1/4.8d. | 1.68d. | .168d. | £3:10:0 | 7/− | 7d. | .875d. |
| 2 | 14 | £1: 8:0 | 2/9.6 | 3.36 | .336 | 7: 0:0 | 14/− | 1/2 | 1.750 |
| 3 | 21 | 2: 2:0 | 4/2.4 | 5.04 | .504 | 10:10:0 | £1: 1:0 | 1/9 | 2.625 |
| 4 | 28 | 2:16:0 | 5/7.2 | 6.72 | .672 | 14: 0:0 | 1: 8:0 | 2/4 | 3.500 |
| 5 | 35 | 3:10:0 | 7/− | 8.40 | .840 | 17:10:0 | 1:15:0 | 2/11 | 4.375 |
| 6 | 42 | 4: 4:0 | 8/4.8 | 10.08 | 1.008 | 21: 0:0 | 2: 2:0 | 3/6 | 5.250 |
| 7 | 49 | 4:18:0 | 9/9.6 | 11.76 | 1.176 | 24:10:0 | 2: 9:0 | 4/1 | 6.125 |
| 8 | 56 | 5:12:0 | 11/2.4 | 1/1.44 | 1.344 | 28: 0:0 | 2:16:0 | 4/8 | ------ |
| 9 | 63 | 6: 6:0 | 12/7.2 | 1/3.12 | 1.512 | 31:10:0 | 3: 3:0 | 5/3 | ------ |
| 10 | ------ | ------ | ------ | ------ | ------ | ------ | ------ | 5/10 | ------ |
| 11 | ------ | ------ | ------ | ------ | ------ | ------ | ------ | 6/5 | ------ |

Table L1 8

|   | 0 | −1 | −2 | −3 | −4 | S10 | S1 | D | D/8 |
|---|---|---|---|---|---|---|---|---|---|
| 1 | £8 | 16/− | 1/7.2d. | 1.92 | .192d. | £4 | 8/− | 8d. | 1d. |
| 2 | 16 | £1:12:0 | 3/2.4 | 3.84 | .384 | 8 | 16/− | 1/4 | 2 |
| 3 | 24 | 2: 8:0 | 4/9.6 | 5.76 | .576 | 12 | £1: 4:0 | 2/− | 3 |
| 4 | 32 | 3: 4:0 | 6/4.8 | 7.68 | .768 | 16 | 1:12:0 | 2/8 | 4 |
| 5 | 40 | 4: 0:0 | 8/− | 9.6 | .96 | 20 | 2: 0:0 | 3/4 | 5 |
| 6 | 48 | 4:16:0 | 9/7.2 | 11.52 | 1.152 | 24 | 2: 8:0 | 4/− | 6 |
| 7 | 56 | 5:12:0 | 11/2.4 | 1/1.44 | 1.344 | 28 | 2:16:0 | 4/8 | 7 |
| 8 | 64 | 6: 8:0 | 12/9.6 | 1/3.36 | 1.536 | 32 | 3: 4:0 | 5/4 | ------ |
| 9 | 72 | 7: 4:0 | 14/4.8 | 1/5.28 | 1.728 | 36 | 3:12:0 | 6/− | ------ |
| 10 | ------ | ------ | ------ | ------ | ------ | ------ | ------ | 6/8 | ------ |
| 11 | ------ | ------ | ------ | ------ | ------ | ------ | ------ | 7/4 | ------ |

Table L1 9

|   | 0 | −1 | −2 | −3 | −4 | S10 | S1 | D | D/8 |
|---|---|---|---|---|---|---|---|---|---|
| 1 | £9 | 18/− | 1/9.6d. | 2.16d. | .216d. | £4:10:0 | 9/− | 9d. | 1.125d. |
| 2 | 18 | £1:16:0 | 3/7.2 | 4.32 | .432 | 9: 0:0 | 18/− | 1/6 | 2.250 |
| 3 | 27 | 2:14:0 | 5/4.8 | 6.48 | .648 | 13:10:0 | £1: 7:0 | 2/3 | 3.375 |
| 4 | 36 | 3:12:0 | 7/2.4 | 8.64 | .864 | 18: 0:0 | 1:16:0 | 3/− | 4.500 |
| 5 | 45 | 4:10:0 | 9/− | 10.80 | 1.080 | 22:10:0 | 2: 5:0 | 3/9 | 5.625 |
| 6 | 54 | 5: 8:0 | 10/9.6 | 1/0.96 | 1.296 | 27: 0:0 | 2:14:0 | 4/6 | 6.750 |
| 7 | 63 | 6: 6:0 | 12/7.2 | 1/3.12 | 1.512 | 31:10:0 | 3: 3:0 | 5/3 | 7.875 |
| 8 | 72 | 7: 4:0 | 14/4.8 | 1/5.28 | 1.728 | 36: 0:0 | 3:12:0 | 6/− | ------ |
| 9 | 81 | 8: 2:0 | 16/2.4 | 1/7.44 | 1.944 | 40:10:0 | 4: 1:0 | 6/9 | ------ |
| 10 | ------ | ------ | ------ | ------ | ------ | ------ | ------ | 7/6 | ------ |
| 11 | ------ | ------ | ------ | ------ | ------ | ------ | ------ | 8/3 | ------ |

Table L10 1

|   | 0 | −1 | −2 | −3 | −4 | S10 | S1 | D | D/8 |
|---|---|---|---|---|---|---|---|---|---|
| 1 | £10 | £1 | 2/− | 2.4d. | .24d. | £5 | 10/− | 10d. | 1.25d. |
| 2 | 20 | 2 | 4/− | 4.8 | .48 | 10 | £1: 0:0 | 1/ 8 | 2.50 |
| 3 | 30 | 3 | 6/− | 7.2 | .72 | 15 | 1:10:0 | 2/ 6 | 3.75 |
| 4 | 40 | 4 | 8/− | 9.6 | .96 | 20 | 2: 0:0 | 3/ 4 | 5.00 |
| 5 | 50 | 5 | 10/− | 1/− | 1.20 | 25 | 2:10:0 | 4/ 2 | 6.25 |
| 6 | 60 | 6 | 12/− | 1/2.4 | 1.44 | 30 | 3: 0:0 | 5/ − | 7.50 |
| 7 | 70 | 7 | 14/− | 1/4.8 | 1.68 | 35 | 3:10:0 | 5/10 | 8.75 |
| 8 | 80 | 8 | 16/− | 1/7.2 | 1.92 | 40 | 4: 0:0 | 6/ 8 | ------ |
| 9 | 90 | 9 | 18/− | 1/9.6 | 2.16 | 45 | 4:10:0 | 7/ 6 | ------ |
| 10 | ------ | ------ | ------ | ------ | ------ | ------ | ------ | 8/ 4 | ------ |
| 11 | ------ | ------ | ------ | ------ | ------ | ------ | ------ | 9/ 2 | ------ |

*Table L10 2*

|   | 0 | −1 | −2 | −3 | −4 | S10 | S1 | D | D/8 |
|---|---|---|---|---|---|---|---|---|---|
| 1 | £20 | £2 | 4/− | 4.8d. | .48d. | £10 | £1 | 1/8 | 2.5d. |
| 2 | 40 | 4 | 8/− | 9.6 | .96 | 20 | 2 | 3/4 | 5.0 |
| 3 | 60 | 6 | 12/− | 1/2.4 | 1.44 | 30 | 3 | 5/− | 7.5 |
| 4 | 80 | 8 | 16/− | 1/7.2 | 1.92 | 40 | 4 | 6/8 | 10.0 |
| 5 | 100 | 10 | £1: 0:0 | 2/− | 2.40 | 50 | 5 | 8/4 | 1/0.5 |
| 6 | 120 | 12 | 1: 4:0 | 2/4.8 | 2.88 | 60 | 6 | 10/− | 1/3.0 |
| 7 | 140 | 14 | 1: 8:0 | 2/9.6 | 3.36 | 70 | 7 | 11/8 | 1/5.5 |
| 8 | 160 | 16 | 1:12:0 | 3/2.4 | 3.84 | 80 | 8 | 13/4 | ------ |
| 9 | 180 | 18 | 1:16:0 | 3/7.2 | 4.32 | 90 | 9 | 15/− | ------ |
| 10 | ------ | ------ | ------ | ------ | ------ | ------ | ------ | 16/8 | ------ |
| 11 | ------ | ------ | ------ | ------ | ------ | ------ | ------ | 18/4 | ------ |

*Table L10 3*

|   | 0 | −1 | −2 | −3 | −4 | S10 | S1 | D | D/8 |
|---|---|---|---|---|---|---|---|---|---|
| 1 | £30 | £3 | 6/− | 7.2 | .72 | £15 | £1:00:0 | 2/6 | 3.75d. |
| 2 | 60 | 6 | 12/− | 1/2.4 | 1.44 | 30 | 3: 0:0 | 5/− | 7.50 |
| 3 | 90 | 9 | 18/− | 1/9.6 | 2.16 | 45 | 4:10:0 | 7/6 | 11.25 |
| 4 | 120 | 12 | £1: 4:0 | 2/4.8 | 2.88 | 60 | 6: 0:0 | 10/− | 1/ 3.00 |
| 5 | 150 | 15 | 1:10:0 | 3/− | 3.60 | 75 | 7:10:0 | 12/6 | 1/ 6.75 |
| 6 | 180 | 18 | 1:16:0 | 3/7.2 | 4.32 | 90 | 9: 0:0 | 15/− | 1/10.50 |
| 7 | 210 | 21 | 2: 2:0 | 4/2.4 | 5.04 | 105 | 10:10:0 | 17/6 | 2/ 2.25 |
| 8 | 240 | 24 | 2: 8:0 | 4/9.6 | 5.76 | 120 | 12: 0:0 | £1:0:0 | ------ |
| 9 | 270 | 27 | 2:14:0 | 5/4.8 | 6.48 | 135 | 13:10:0 | 1:2:6 | ------ |
| 10 | ------ | ------ | ------ | ------ | ------ | ------ | ------ | 1:5:0 | ------ |
| 11 | ------ | ------ | ------ | ------ | ------ | ------ | ------ | 1:7:6 | ------ |

*Table L10 4*

|   | 0 | −1 | −2 | −3 | −4 | S10 | S1 | D | D/8 |
|---|---|---|---|---|---|---|---|---|---|
| 1 | £40 | £4 | 8/− | 9.6d. | .96d. | £20 | £2 | 3/4 | 5d. |
| 2 | 80 | 8 | 16/− | 1/7.2 | 1.92 | 40 | 4 | 6/8 | 10 |
| 3 | 120 | 12 | £1: 4:0 | 2/4.8 | 2.88 | 60 | 6 | 10/− | 1/ 3 |
| 4 | 160 | 16 | 1:12:0 | 3/2.4 | 3.84 | 80 | 8 | 13/4 | 1/ 8 |
| 5 | 200 | 20 | 2: 0:0 | 4/− | 4.80 | 100 | 10 | 16/8 | 2/ 1 |
| 6 | 240 | 24 | 2: 8:0 | 4/9.6 | 5.76 | 120 | 12 | £1: 0:0 | 2/ 6 |
| 7 | 280 | 28 | 2:16:0 | 5/7.2 | 6.72 | 140 | 14 | 1: 3:4 | 2/11 |
| 8 | 320 | 32 | 3: 4:0 | 6/4.8 | 7.68 | 160 | 16 | 1: 6:8 | ------ |
| 9 | 360 | 36 | 3:12:0 | 7/2.4 | 8.64 | 180 | 18 | 1:10:0 | ------ |
| 10 | ------ | ------ | ------ | ------ | ------ | ------ | ------ | 1:13:4 | ------ |
| 11 | ------ | ------ | ------ | ------ | ------ | ------ | ------ | 1:16:8 | ------ |

*Table L10 5*

|   | 0 | −1 | −2 | −3 | −4 | S10 | S1 | D | D/8 |
|---|---|---|---|---|---|---|---|---|---|
| 1 | £50 | £5 | 10/− | 1/− | 1.2d. | £25 | £2:10:0 | 4/2 | 6.25d. |
| 2 | 100 | 10 | £1: 0:0 | 2/− | 2.4 | 50 | 5: 0:0 | 8/4 | 1/0.50 |
| 3 | 150 | 15 | 1:10:0 | 3/− | 3.6 | 75 | 7:10:0 | 12/6 | 1/6.75 |
| 4 | 200 | 20 | 2: 0:0 | 4/− | 4.8 | 100 | 10: 0:0 | 16/8 | 2/1.00 |
| 5 | 250 | 25 | 2:10:0 | 5/− | 6.0 | 125 | 12:10:0 | £1: 0:10 | 2/7.25 |
| 6 | 300 | 30 | 3: 0:0 | 6/− | 7.2 | 150 | 15: 0:0 | 1: 5: 0 | 3/1.50 |
| 7 | 350 | 35 | 3:10:0 | 7/− | 8.4 | 175 | 17:10:0 | 1: 9: 2 | 3/7.75 |
| 8 | 400 | 40 | 4: 0:0 | 8/− | 9.6 | 200 | 20: 0:0 | 1:13: 4 | ------ |
| 9 | 450 | 45 | 4:10:0 | 9/− | 10.8 | 225 | 22:10:0 | 1:17: 6 | ------ |
| 10 | ------ | ------ | ------ | ------ | ------ | ------ | ------ | 2: 1: 8 | ------ |
| 11 | ------ | ------ | ------ | ------ | ------ | ------ | ------ | 2: 5:10 | ------ |

*Table L10 6*

|   | 0 | −1 | −2 | −3 | −4 | S10 | S1 | D | D/8 |
|---|---|---|---|---|---|---|---|---|---|
| 1 | £60 | £6 | 12/− | 1/2.4 | 1.44d. | £30 | £3 | 5/− | 7.5d. |
| 2 | 120 | 12 | £1: 4:0 | 2/4.8 | 2.88 | 60 | 6 | 10/− | 1/ 3.0 |
| 3 | 180 | 18 | 1:16:0 | 3/7.2 | 4.32 | 90 | 9 | 15/− | 1/10.5 |
| 4 | 240 | 24 | 2: 8:0 | 4/9.6 | 5.76 | 120 | 12 | £1: 0:0 | 2/ 6.0 |
| 5 | 300 | 30 | 3: 0:0 | 6/− | 7.20 | 150 | 15 | 1: 5:0 | 3/ 1.5 |
| 6 | 360 | 36 | 3:12:0 | 7/2.4 | 8.64 | 180 | 18 | 1:10:0 | 3/ 9.0 |
| 7 | 420 | 42 | 4: 4:0 | 8/4.8 | 10.08 | 210 | 21 | 1:15:0 | 4/ 4.5 |
| 8 | 480 | 48 | 4:16:0 | 9/7.2 | 11.52 | 240 | 24 | 2: 0:0 | ------ |
| 9 | 540 | 54 | 5: 8:0 | 10/9.6 | 1/0.96 | 270 | 27 | 2: 5:0 | ------ |
| 10 | ------ | ------ | ------ | ------ | ------ | ------ | ------ | 2:10:0 | ------ |
| 11 | ------ | ------ | ------ | ------ | ------ | ------ | ------ | 2:15:0 | ------ |

Table L10 7

|   | 0 | −1 | −2 | −3 | −4 | S10 | S1 | D | D/8 |
|---|---|---|---|---|---|---|---|---|---|
| 1 | £70 | £7 | 14/− | 1/4.8 | 1.68d. | £35 | £3:10:0 | 5/10 | 8.75d. |
| 2 | 140 | 14 | £1: 8:0 | 2/9.6 | 3.36 | 70 | 7: 0:0 | 11/ 8 | 1/ 5.50 |
| 3 | 210 | 21 | 2: 2:0 | 4/2.4 | 5.04 | 105 | 10:10:0 | 17/ 6 | 2/ 2.25 |
| 4 | 280 | 28 | 2:16:0 | 5/7.2 | 6.72 | 140 | 14: 0:0 | £1: 3: 4 | 2/11.00 |
| 5 | 350 | 35 | 3:10:0 | 7/− | 8.40 | 175 | 17:10:0 | 1: 9: 2 | 3/ 7.75 |
| 6 | 420 | 42 | 4: 4:0 | 8/4.8 | 10.08 | 210 | 21: 0:0 | 1:15: 0 | 4/ 4.50 |
| 7 | 490 | 49 | 4:18:0 | 9/9.6 | 11.76 | 245 | 24:10:0 | 2: 0:10 | 5/ 1.25 |
| 8 | 560 | 56 | 5:12:0 | 11/2.4 | 1/1.44 | 280 | 28: 0:0 | 2: 6: 8 | ---------- |
| 9 | 630 | 63 | 6: 6:0 | 12/7.2 | 1/3.12 | 315 | 31:10:0 | 2:12: 6 | ---------- |
| 10 | ---------- | ---------- | ---------- | ---------- | ---------- | ---------- | ---------- | 2:18: 4 | ---------- |
| 11 | ---------- | ---------- | ---------- | ---------- | ---------- | ---------- | ---------- | 3: 4: 2 | ---------- |

Table L10 8

|   | 0 | −1 | −2 | −3 | −4 | S10 | S1 | D | D/8 |
|---|---|---|---|---|---|---|---|---|---|
| 1 | £80 | £8 | 16/− | 1/7.2 | 1.92d. | £40 | £4 | 6/8 | 10d. |
| 2 | 160 | 16 | £1:12:0 | 3/2.4 | 3.84 | 80 | 8 | 13/4 | 1/ 8 |
| 3 | 240 | 24 | 2: 8:0 | 4/9.6 | 5.76 | 120 | 12 | £1: 0:0 | 2/ 6 |
| 4 | 320 | 32 | 3: 4:0 | 6/4.8 | 7.68 | 160 | 16 | 1: 6:8 | 3/ 4 |
| 5 | 400 | 40 | 4: 0:0 | 8/− | 9.60 | 200 | 20 | 1:13:4 | 4/ 2 |
| 6 | 480 | 48 | 4:16:0 | 9/7.2 | 11.52 | 240 | 24 | 2: 0:0 | 5/ − |
| 7 | 560 | 56 | 5:12:0 | 11/2.4 | 1/1.44 | 280 | 28 | 2: 6:8 | 5/10 |
| 8 | 640 | 64 | 6: 8:0 | 12/9.6 | 1/3.36 | 320 | 32 | 2:13:4 | ---------- |
| 9 | 720 | 72 | 7: 4:0 | 14/4.8 | 1/5.28 | 360 | 36 | 3: 0:0 | ---------- |
| 10 | ---------- | ---------- | ---------- | ---------- | ---------- | ---------- | ---------- | 3: 6:8 | ---------- |
| 11 | ---------- | ---------- | ---------- | ---------- | ---------- | ---------- | ---------- | 3:13:4 | ---------- |

Table L10 9

|   | 0 | −1 | −2 | −3 | −4 | S10 | S1 | D | D/8 |
|---|---|---|---|---|---|---|---|---|---|
| 1 | £90 | £9 | 18/− | 1/9.6 | 2.16d. | £45 | £4:10:0 | 7/6 | 11.25d. |
| 2 | 180 | 18 | £1:16:0 | 3/7.2 | 4.32 | 90 | 9: 0:0 | 15/− | 1/10.50 |
| 3 | 270 | 27 | 2:14:0 | 5/4.8 | 6.48 | 135 | 13:10:0 | £1: 2:6 | 2/ 9.75 |
| 4 | 360 | 36 | 3:12:0 | 7/2.4 | 8.64 | 180 | 18: 0:0 | 1:10:0 | 3/ 9.00 |
| 5 | 450 | 45 | 4:10:0 | 9/− | 10.80 | 225 | 22:10:0 | 1:17:6 | 4/ 8.25 |
| 6 | 540 | 54 | 5: 8:0 | 10/9.6 | 1/0.96 | 270 | 27: 0:0 | 2: 5:0 | 5/ 7.50 |
| 7 | 630 | 63 | 6: 6:0 | 12/7.2 | 1/3.12 | 315 | 31:10:0 | 2:12:6 | 6/ 6.75 |
| 8 | 720 | 72 | 7: 4:0 | 14/4.8 | 1/5.28 | 360 | 36: 0:0 | 3: 0:0 | ---------- |
| 9 | 810 | 81 | 8: 2:0 | 16/2.4 | 1/7.44 | 405 | 40:10:0 | 3: 7:6 | ---------- |
| 10 | ---------- | ---------- | ---------- | ---------- | ---------- | ---------- | ---------- | 3:15:0 | ---------- |
| 11 | ---------- | ---------- | ---------- | ---------- | ---------- | ---------- | ---------- | 4: 2:6 | ---------- |

Table L10²1

|   | 0 | −1 | −2 | −3 | −4 | S10 | S1 | D | D/8 |
|---|---|---|---|---|---|---|---|---|---|
| 1 | £100 | £10 | £1 | 2/− | 2.4d. | £50 | £5 | 8/4 | 1/0.5d. |
| 2 | 200 | 20 | 2 | 4/− | 4.8 | 100 | 10 | 16/8 | 2/1.0 |
| 3 | 300 | 30 | 3 | 6/− | 7.2 | 150 | 15 | £1: 5:0 | 3/1.5 |
| 4 | 400 | 40 | 4 | 8/− | 9.6 | 200 | 20 | 1:13:4 | 4/2.0 |
| 5 | 500 | 50 | 5 | 10/− | 1/− | 250 | 25 | 2: 1:8 | 5/2.5 |
| 6 | 600 | 60 | 6 | 12/− | 1/2.4 | 300 | 30 | 2:10:0 | 6/3.0 |
| 7 | 700 | 70 | 7 | 14/− | 1/4.8 | 350 | 35 | 2:18:4 | 7/3.5 |
| 8 | 800 | 80 | 8 | 16/− | 1/7.2 | 400 | 40 | 3: 6:8 | ---------- |
| 9 | 900 | 90 | 9 | 18/− | 1/9.6 | 450 | 45 | 3:15:0 | ---------- |
| 10 | ---------- | ---------- | ---------- | ---------- | ---------- | ---------- | ---------- | 4: 3:4 | ---------- |
| 11 | ---------- | ---------- | ---------- | ---------- | ---------- | ---------- | ---------- | 4:11:8 | ---------- |

Table L10²2

|   | 0 | −1 | −2 | −3 | −4 | S10 | S1 | D | D/8 |
|---|---|---|---|---|---|---|---|---|---|
| 1 | £200 | £20 | £2 | 4/− | 4.8d. | £100 | £10 | 16/8 | 2/1d. |
| 2 | 400 | 40 | 4 | 8/− | 9.6 | 200 | 20 | £1:13:4 | 4/2 |
| 3 | 600 | 60 | 6 | 12/− | 1/2.4 | 300 | 30 | 2:10:0 | 6/3 |
| 4 | 800 | 80 | 8 | 16/− | 1/7.2 | 400 | 40 | 3: 6:8 | 8/4 |
| 5 | 1,000 | 100 | 10 | £1: 0:0 | 2/− | 500 | 50 | 4: 3:4 | 10/5 |
| 6 | 1,200 | 120 | 12 | 1: 4:0 | 2/4.8 | 600 | 60 | 5: 0:0 | 12/6 |
| 7 | 1,400 | 140 | 14 | 1: 8:0 | 2/9.6 | 700 | 70 | 5:16:8 | 14/7 |
| 8 | 1,600 | 160 | 16 | 1:12:0 | 3/2.4 | 800 | 80 | 6:13:4 | ---------- |
| 9 | 1,800 | 180 | 18 | 1:16:0 | 3/7.2 | 900 | 90 | 7:10:0 | ---------- |
| 10 | ---------- | ---------- | ---------- | ---------- | ---------- | ---------- | ---------- | 8: 6:8 | ---------- |
| 11 | ---------- | ---------- | ---------- | ---------- | ---------- | ---------- | ---------- | 9: 3:4 | ---------- |

*Table $L10^3$*

|  | 0 | −1 | −2 | −3 | −4 | S10 | S1 | D | D/8 |
|---|---|---|---|---|---|---|---|---|---|
| 1 | £300 | £30 | £3 | 6/− | 7.2d. | £150 | £15 | £1: 5:0 | 3/1.5 |
| 2 | 600 | 60 | 6 | 12/− | 1/2.4 | 300 | 30 | 2:10:0 | 6/3.0 |
| 3 | 900 | 90 | 9 | 18/− | 1/9.6 | 450 | 45 | 3:15:0 | 9/4.5 |
| 4 | 1,200 | 120 | 12 | £1: 4:0 | 2/4.8 | 600 | 60 | 5: 0:0 | 12/ 6.0 |
| 5 | 1,500 | 150 | 15 | 1:10:0 | 3/− | 750 | 75 | 6: 5:0 | 15/ 7.5 |
| 6 | 1,800 | 180 | 18 | 1:16:0 | 3/7.2 | 900 | 90 | 7:10:0 | 18/ 9.0 |
| 7 | 2,100 | 210 | 21 | 2: 2:0 | 4/2.4 | 1,050 | 105 | 8:15:0 | £1: 1/10.5 |
| 8 | 2,400 | 240 | 24 | 2: 8:0 | 4/9.6 | 1,200 | 120 | 10: 0:0 | ---------- |
| 9 | 2,700 | 270 | 27 | 2:14:0 | 5/4.8 | 1,350 | 135 | 11: 5:0 | ---------- |
| 10 | ---------- | ---------- | ---------- | ---------- | ---------- | ---------- | ---------- | 12:10:0 | ---------- |
| 11 | ---------- | ---------- | ---------- | ---------- | ---------- | ---------- | ---------- | 13:15:0 | ---------- |

*Table $L10^4$*

|  | 0 | −1 | −2 | −3 | −4 | S10 | S1 | D | D/8 |
|---|---|---|---|---|---|---|---|---|---|
| 1 | £400 | £40 | £4 | 8/− | 9.6d. | £200 | £20 | £1:13:4 | 4/2d. |
| 2 | 800 | 80 | 8 | 16/− | 1/7.2 | 400 | 40 | 3: 6:8 | 8/4 |
| 3 | 1,200 | 120 | 12 | £1: 4:0 | 2/4.8 | 600 | 60 | 5: 0:0 | 12/6 |
| 4 | 1,600 | 160 | 16 | 1:12:0 | 3/2.4 | 800 | 80 | 6:13:4 | 16/8 |
| 5 | 2,000 | 200 | 20 | 2: 0:0 | 4/− | 1,000 | 100 | 8: 6:8 | £1:0:10 |
| 6 | 2,400 | 240 | 24 | 2: 8:0 | 4/9.6 | 1,200 | 120 | 10: 0:0 | 1:5: 0 |
| 7 | 2,800 | 280 | 28 | 2:16:0 | 5/7.2 | 1,400 | 140 | 11:13:4 | 1:9: 2 |
| 8 | 3,200 | 320 | 32 | 3: 4:0 | 6/4.8 | 1,600 | 160 | 13: 6:8 | ---------- |
| 9 | 3,600 | 360 | 36 | 3:12:0 | 7/2.4 | 1,800 | 180 | 15: 0:0 | ---------- |
| 10 | ---------- | ---------- | ---------- | ---------- | ---------- | ---------- | ---------- | 16:13:4 | ---------- |
| 11 | ---------- | ---------- | ---------- | ---------- | ---------- | ---------- | ---------- | 18: 6:8 | ---------- |

*Table $L10^5$*

|  | 0 | −1 | −2 | −3 | −4 | S10 | S1 | D | D/8 |
|---|---|---|---|---|---|---|---|---|---|
| 1 | £500 | £50 | £5 | 10/− | 1/− | £250 | £25 | £2: 1:8 | 5/2.5d. |
| 2 | 1,000 | 100 | 10 | £1: 0:0 | 2/− | 500 | 50 | 4: 3:4 | 10/5.0 |
| 3 | 1,500 | 150 | 15 | 1:10:0 | 3/− | 750 | 75 | 6: 5:0 | 15/7.5 |
| 4 | 2,000 | 200 | 20 | 2: 0:0 | 4/− | 1,000 | 100 | 8: 6:8 | £1:0 :10.0 |
| 5 | 2,500 | 250 | 25 | 2:10:0 | 5/− | 1,250 | 125 | 10: 8:4 | 1: 6:0.5 |
| 6 | 3,000 | 300 | 30 | 3: 0:0 | 6/− | 1,500 | 150 | 12:10:0 | 1:11:3.0 |
| 7 | 3,500 | 350 | 35 | 3:10:0 | 7/− | 1,750 | 175 | 14:11:8 | 1:16:5.5 |
| 8 | 4,000 | 400 | 40 | 4: 0:0 | 8/− | 2,000 | 200 | 16:13:4 | ---------- |
| 9 | 4,500 | 450 | 45 | 4:10:0 | 9/− | 2,250 | 225 | 18:15:0 | ---------- |
| 10 | ---------- | ---------- | ---------- | ---------- | ---------- | ---------- | ---------- | 20:16:8 | ---------- |
| 11 | ---------- | ---------- | ---------- | ---------- | ---------- | ---------- | ---------- | 22:18:4 | ---------- |

*Table $L10^6$*

|  | 0 | −1 | −2 | −3 | −4 | S10 | S1 | D | D/8 |
|---|---|---|---|---|---|---|---|---|---|
| 1 | £600 | £60 | £6 | 12/− | 1/2.4 | £300 | £30 | £2:10:0 | 6/3 |
| 2 | 1,200 | 120 | 12 | £1: 4:0 | 2/4.8 | 600 | 60 | 5: 0:0 | 12/6 |
| 3 | 1,800 | 180 | 18 | 1:16:0 | 3/7.2 | 900 | 90 | 7:10:0 | 18/9 |
| 4 | 2,400 | 240 | 24 | 2: 8:0 | 4/9.6 | 1,200 | 120 | 10: 0:0 | £1: 5:0 |
| 5 | 3,000 | 300 | 30 | 3: 0:0 | 6/− | 1,500 | 150 | 12:10:0 | 1:11:3 |
| 6 | 3,600 | 360 | 36 | 3:12:0 | 7/2.4 | 1,800 | 180 | 15: 0:0 | 1:17:6 |
| 7 | 4,200 | 420 | 42 | 4: 4:0 | 8/4.8 | 2,100 | 210 | 17:10:0 | 2: 3:9 |
| 8 | 4,800 | 480 | 48 | 4:16:0 | 9/7.2 | 2,400 | 240 | 20: 0:0 | ---------- |
| 9 | 5,400 | 540 | 54 | 5: 8:0 | 10/9.6 | 2,700 | 270 | 22:10:0 | ---------- |
| 10 | ---------- | ---------- | ---------- | ---------- | ---------- | ---------- | ---------- | 25: 0:0 | ---------- |
| 11 | ---------- | ---------- | ---------- | ---------- | ---------- | ---------- | ---------- | 27:10:0 | ---------- |

*Table $L10^7$*

|  | 0 | −1 | −2 | −3 | −4 | S10 | S1 | D | D/8 |
|---|---|---|---|---|---|---|---|---|---|
| 1 | £700 | £70 | £7 | 14/− | 1/4.8 | £350 | £35 | £2:18:4 | 7/3.5d. |
| 2 | 1,400 | 140 | 14 | £1: 8:0 | 2/9.6 | 700 | 70 | 5:16:8 | 14/7.0 |
| 3 | 2,100 | 210 | 21 | 2: 2:0 | 4/2.4 | 1,050 | 105 | 8:15:0 | £1: 1:10.5 |
| 4 | 2,800 | 280 | 28 | 2:16:0 | 5/7.2 | 1,400 | 140 | 11:13:4 | 1: 9: 2.0 |
| 5 | 3,500 | 350 | 35 | 3:10:0 | 7/− | 1,750 | 175 | 14:11:8 | 1:16: 5.5 |
| 6 | 4,200 | 420 | 42 | 4: 4:0 | 8/4.8 | 2,100 | 210 | 17:10:0 | 2: 3: 9.0 |
| 7 | 4,900 | 490 | 49 | 4:18:0 | 9/9.6 | 2,450 | 245 | 20: 8:4 | 2:11: 0.5 |
| 8 | 5,600 | 560 | 56 | 5:12:0 | 11/2.4 | 2,800 | 280 | 23: 6:8 | ---------- |
| 9 | 6,300 | 630 | 63 | 6: 6:0 | 12/7.2 | 3,150 | 315 | 26: 5:0 | ---------- |
| 10 | ---------- | ---------- | ---------- | ---------- | ---------- | ---------- | ---------- | 29: 3:4 | ---------- |
| 11 | ---------- | ---------- | ---------- | ---------- | ---------- | ---------- | ---------- | 32: 1:8 | ---------- |

Table $L10^28$

| | 0 | −1 | −2 | −3 | −4 | S10 | S1 | D | D/8 |
|---|---|---|---|---|---|---|---|---|---|
| 1 | £800 | £80 | £8 | 16/- | 1/7.2 | £400 | £40 | £3: 6:8 | 8/4d. |
| 2 | 1,600 | 160 | 16 | £1:12:0 | 3/2.4 | 800 | 80 | 6:13:4 | 16/8 |
| 3 | 2,400 | 240 | 24 | 2: 8:0 | 5/9.6 | 1,200 | 120 | 10: 0:0 | £1: 5:0 |
| 4 | 3,200 | 320 | 32 | 3: 4:0 | 6/4.8 | 1,600 | 160 | 13: 6:8 | 1:13:4 |
| 5 | 4,000 | 400 | 40 | 4: 0:0 | 8/- | 2,000 | 200 | 16:13:4 | 2: 1:8 |
| 6 | 4,800 | 480 | 48 | 4:16:0 | 9/7.2 | 2,400 | 240 | 20: 0:0 | 2:10:0 |
| 7 | 5,600 | 560 | 56 | 5:12:0 | 11/2.4 | 2,800 | 280 | 23: 6:8 | 2:18:4 |
| 8 | 6,400 | 640 | 64 | 6: 8:0 | 12/9.6 | 3,200 | 320 | 26:13:4 | --------- |
| 9 | 7,200 | 720 | 72 | 7: 4:0 | 14/4.8 | 3,600 | 360 | 30: 0:0 | --------- |
| 10 | --------- | --------- | --------- | --------- | --------- | --------- | --------- | 33: 6:8 | --------- |
| 11 | --------- | --------- | --------- | --------- | --------- | --------- | --------- | 36:13:4 | --------- |

Table $L10^29$

| | 0 | −1 | −2 | −3 | −4 | S10 | S1 | D | D/8 |
|---|---|---|---|---|---|---|---|---|---|
| 1 | £900 | £90 | £9 | 18/- | 1/9.6 | £450 | £45 | £3:15:0 | 9/ 4.5d. |
| 2 | 1,800 | 180 | 18 | £1:16:0 | 3/7.2 | 900 | 90 | 7:10:0 | 18/ 9.0 |
| 3 | 2,700 | 270 | 27 | 2:14:0 | 5/4.8 | 1,350 | 135 | 11: 5:0 | £1: 8/ 1.5 |
| 4 | 3,600 | 360 | 36 | 3:12:0 | 7/2.4 | 1,800 | 180 | 15: 0:0 | 1:17/ 6.0 |
| 5 | 4,500 | 450 | 45 | 4:10:0 | 9/- | 2,250 | 225 | 18:15:0 | 2: 6/10.5 |
| 6 | 5,400 | 540 | 54 | 5: 8:0 | 10/9.6 | 2,700 | 270 | 22:10:0 | 2:16/ 3.0 |
| 7 | 6,300 | 630 | 63 | 6: 6:0 | 12/7.2 | 3,150 | 315 | 26: 5:0 | 3: 5/ 7.5 |
| 8 | 7,200 | 720 | 72 | 7: 4:0 | 14/4.8 | 3,600 | 360 | 30: 0:0 | --------- |
| 9 | 8,100 | 810 | 81 | 8: 2:0 | 16/2.4 | 4,050 | 405 | 33:15:0 | --------- |
| 10 | --------- | --------- | --------- | --------- | --------- | --------- | --------- | 37:10:0 | --------- |
| 11 | --------- | --------- | --------- | --------- | --------- | --------- | --------- | 41: 5:0 | --------- |

Table $L10^31$

| | 0 | −1 | −2 | −3 | −4 | S10 | S1 | D | D/8 |
|---|---|---|---|---|---|---|---|---|---|
| 1 | £1,000 | £100 | £10 | £1 | 2/- | £500 | £50 | £4: 3:4 | 10/ 5d. |
| 2 | 2,000 | 200 | 20 | 2 | 4/- | 1,000 | 100 | 8: 6:8 | £1: 0:10 |
| 3 | 3,000 | 300 | 30 | 3 | 6/- | 1,500 | 150 | 12:10:0 | 1:11: 3 |
| 4 | 4,000 | 400 | 40 | 4 | 8/- | 2,000 | 200 | 16:13:4 | 2: 1: 8 |
| 5 | 5,000 | 500 | 50 | 5 | 10/- | 2,500 | 250 | 20:16:8 | 2:12: 1 |
| 6 | 6,000 | 600 | 60 | 6 | 12/- | 3,000 | 300 | 25: 0:0 | 3: 2: 6 |
| 7 | 7,000 | 700 | 70 | 7 | 14/- | 3,500 | 350 | 29: 3:4 | 3:12:11 |
| 8 | 8,000 | 800 | 80 | 8 | 16/- | 4,000 | 400 | 33: 6:8 | --------- |
| 9 | 9,000 | 900 | 90 | 9 | 18/- | 4,500 | 450 | 37:10:0 | --------- |
| 10 | --------- | --------- | --------- | --------- | --------- | --------- | --------- | 41:13:4 | --------- |
| 11 | --------- | --------- | --------- | --------- | --------- | --------- | --------- | 45:16:8 | --------- |

Table $L10^32$

| | 0 | −1 | −2 | −3 | −4 | S10 | S1 | D | D/8 |
|---|---|---|---|---|---|---|---|---|---|
| 1 | £2,000 | £200 | £20 | £2 | 4/- | £1,000 | £100 | £8: 6:8 | £1:0:10d. |
| 2 | 4,000 | 400 | 40 | 4 | 8/- | 2,000 | 200 | 16:13:4 | 2:1: 8 |
| 3 | 6,000 | 600 | 60 | 6 | 12/- | 3,000 | 300 | 25: 0:0 | 3:2: 6 |
| 4 | 8,000 | 800 | 80 | 8 | 16/- | 4,000 | 400 | 33: 6:8 | 4:3: 4 |
| 5 | 10,000 | 1,000 | 100 | 10 | £1: 0:0 | 5,000 | 500 | 41:13:4 | 5:4: 2 |
| 6 | 12,000 | 1,200 | 120 | 12 | 1: 4:0 | 6,000 | 600 | 50: 0:0 | 6:5: 0 |
| 7 | 14,000 | 1,400 | 140 | 14 | 1: 8:0 | 7,000 | 700 | 58: 6:8 | 7:5:10 |
| 8 | 16,000 | 1,600 | 160 | 16 | 1:12:0 | 8,000 | 800 | 66:13:4 | --------- |
| 9 | 18,000 | 1,800 | 180 | 18 | 1:16:0 | 9,000 | 900 | 75: 0:0 | --------- |
| 10 | --------- | --------- | --------- | --------- | --------- | --------- | --------- | 83: 6:8 | --------- |
| 11 | --------- | --------- | --------- | --------- | --------- | --------- | --------- | 91:13:4 | --------- |

Table $L10^33$

| | 0 | −1 | −2 | −2 | −4 | S10 | S1 | D | D/8 |
|---|---|---|---|---|---|---|---|---|---|
| 1 | £3,000 | £300 | £30 | £3 | 6/- | £1,500 | £150 | £12:10:0 | £1:11: 3 |
| 2 | 6,000 | 600 | 60 | 6 | 12/- | 3,000 | 300 | 25: 0:0 | 3: 2: 6 |
| 3 | 9,000 | 900 | 90 | 9 | 18/- | 4,500 | 450 | 37:10:0 | 4:13: 9 |
| 4 | 12,000 | 1,200 | 120 | 12 | £1: 4:0 | 6,000 | 600 | 50: 0:0 | 6: 5: 0 |
| 5 | 15,000 | 1,500 | 150 | 15 | 1:10:0 | 7,500 | 750 | 62:10:0 | 7:16: 3 |
| 6 | 18,000 | 1,800 | 180 | 18 | 1:16:0 | 9,000 | 900 | 75: 0:0 | 9: 7: 6 |
| 7 | 21,000 | 2,100 | 210 | 21 | 2: 2:0 | 10,500 | 1,050 | 87:10:0 | 10:18: 9 |
| 8 | 24,000 | 2,400 | 240 | 24 | 2: 8:0 | 12,000 | 1,200 | 100: 0:0 | --------- |
| 9 | 27,000 | 2,700 | 270 | 27 | 2:14:0 | 13,500 | 1,350 | 112:10:0 | --------- |
| 10 | --------- | --------- | --------- | --------- | --------- | --------- | --------- | 125: 0:0 | --------- |
| 11 | --------- | --------- | --------- | --------- | --------- | --------- | --------- | 137:10:0 | --------- |

Table L10⁴

|   | 0 | −1 | −2 | −3 | −4 | S10 | S1 | D | D/8 |
|---|---|---|---|---|---|---|---|---|---|
| 1 | £4,000 | £400 | £40 | £4 | 8/− | £2,000 | £200 | £16:13:4 | £2: 1:8 |
| 2 | 8,000 | 800 | 80 | 8 | 16/− | 4,000 | 400 | 33: 6:8 | 4: 3:4 |
| 3 | 12,000 | 1,200 | 120 | 12 | £1: 4:0 | 6,000 | 600 | 50: 0:0 | 6: 5:0 |
| 4 | 16,000 | 1,600 | 160 | 16 | 1:12:0 | 8,000 | 800 | 66:13:4 | 8: 6:8 |
| 5 | 20,000 | 2,000 | 200 | 20 | 2: 0:0 | 10,000 | 1,000 | 83: 6:8 | 10: 8:4 |
| 6 | 24,000 | 2,400 | 240 | 24 | 2: 8:0 | 12,000 | 1,200 | 100: 0:0 | 12:10:0 |
| 7 | 28,000 | 2,800 | 280 | 28 | 2:16:0 | 14,000 | 1,400 | 116:13:4 | 14:11:8 |
| 8 | 32,000 | 3,200 | 320 | 32 | 3: 4:0 | 16,000 | 1,600 | 133: 6:8 | |
| 9 | 36,000 | 3,600 | 360 | 36 | 3:12:0 | 18,000 | 1,800 | 150: 0:0 | |
| 10 | | | | | | | | 166:13:4 | |
| 11 | | | | | | | | 183: 6:8 | |

Table L10⁵

|   | 0 | −1 | −2 | −3 | −4 | S10 | S1 | D | D/8 |
|---|---|---|---|---|---|---|---|---|---|
| 1 | £5,000 | £500 | £50 | £5 | 10/− | £2,500 | £250 | £20:16:8d. | £2:12:1d. |
| 2 | 10,000 | 1,000 | 100 | 10 | £1: 0:0 | 5,000 | 500 | 41:13:4 | 5: 4:2 |
| 3 | 15,000 | 1,500 | 150 | 15 | 1:10:0 | 7,500 | 750 | 62:10:0 | 7:16:3 |
| 4 | 20,000 | 2,000 | 200 | 20 | 2: 0:0 | 10,000 | 1,000 | 83: 6:8 | 10: 8:4 |
| 5 | 25,000 | 2,500 | 250 | 25 | 2:10:0 | 12,500 | 1,250 | 104: 3:4 | 13: 0:5 |
| 6 | 30,000 | 3,000 | 300 | 30 | 3: 0:0 | 15,000 | 1,500 | 125: 0:0 | 15:12:6 |
| 7 | 35,000 | 3,500 | 350 | 35 | 3:10:0 | 17,500 | 1,750 | 145:16:8 | 18: 4:7 |
| 8 | 40,000 | 4,000 | 400 | 40 | 4: 0:0 | 20,000 | 2,000 | 166:13:4 | |
| 9 | 45,000 | 4,500 | 450 | 45 | 4:10:0 | 22,500 | 2,250 | 187:10:0 | |
| 10 | | | | | | | | 208: 6:8 | |
| 11 | | | | | | | | 229: 3:4 | |

Table L10⁶

|   | 0 | −1 | −2 | −3 | −4 | S10 | S1 | D | D/8 |
|---|---|---|---|---|---|---|---|---|---|
| 1 | £6,000 | £600 | £60 | £6 | 12/− | £3,000 | £300 | £25 | £3: 2:6 |
| 2 | 12,000 | 1,200 | 120 | 12 | £1: 4:0 | 6,000 | 600 | 50 | 6: 5:0 |
| 3 | 18,000 | 1,800 | 180 | 18 | 1:16:0 | 9,000 | 900 | 75 | 9: 7:6 |
| 4 | 24,000 | 2,400 | 240 | 24 | 2: 8:0 | 12,000 | 1,200 | 100 | 12:10:0 |
| 5 | 30,000 | 3,000 | 300 | 30 | 3: 0:0 | 15,000 | 1,500 | 125 | 15:12:6 |
| 6 | 36,000 | 3,600 | 360 | 36 | 3:12:0 | 18,000 | 1,800 | 150 | 18:15:0 |
| 7 | 42,000 | 4,200 | 420 | 42 | 4: 4:0 | 21,000 | 2,100 | 175 | 21:17:6 |
| 8 | 48,000 | 4,800 | 480 | 48 | 4:16:0 | 24,000 | 2,400 | 200 | |
| 9 | 54,000 | 5,400 | 540 | 54 | 5: 8:0 | 27,000 | 2,700 | 225 | |
| 10 | | | | | | | | 250 | |
| 11 | | | | | | | | 275 | |

Table L10⁷

|   | 0 | −1 | −2 | −3 | −4 | S10 | S1 | D | D/8 |
|---|---|---|---|---|---|---|---|---|---|
| 1 | £7,000 | £700 | £70 | £7 | 14/− | £3,500 | £350 | £29: 3:4 | £3:12:11d. |
| 2 | 14,000 | 1,400 | 140 | 14 | £1: 8:0 | 7,000 | 700 | 58: 6:8 | 7: 5:10 |
| 3 | 21,000 | 2,100 | 210 | 21 | 2: 2:0 | 10,500 | 1,050 | 87:10:0 | 10:18: 9 |
| 4 | 28,000 | 2,800 | 280 | 28 | 2:16:0 | 14,000 | 1,400 | 116:13:4 | 14:11: 8 |
| 5 | 35,000 | 3,500 | 350 | 35 | 3:10:0 | 17,500 | 1,750 | 145:16:8 | 18: 4: 7 |
| 6 | 42,000 | 4,200 | 420 | 42 | 4: 4:0 | 21,000 | 2,100 | 175: 0:0 | 21:17: 6 |
| 7 | 49,000 | 4,900 | 490 | 49 | 4:18:0 | 24,500 | 2,450 | 204: 3:4 | 25:10: 5 |
| 8 | 56,000 | 5,600 | 560 | 56 | 5:12:0 | 28,000 | 2,800 | 233: 6:8 | |
| 9 | 63,000 | 6,300 | 630 | 63 | 6: 6:0 | 31,500 | 3,150 | 262:10:0 | |
| 10 | | | | | | | | 291:13:4 | |
| 11 | | | | | | | | 320:16:8 | |

Table L10⁸

|   | 0 | −1 | −2 | −3 | −4 | S10 | S1 | D | D/8 |
|---|---|---|---|---|---|---|---|---|---|
| 1 | £8,000 | £800 | £80 | £8 | 16/− | £4,000 | £400 | £33: 6:8d. | £4: 3:4 |
| 2 | 16,000 | 1,600 | 160 | 16 | £1:12:0 | 8,000 | 800 | 66:13:4 | 8: 6:8 |
| 3 | 24,000 | 2,400 | 240 | 24 | 2: 8:0 | 12,000 | 1,200 | 100: 0:0 | 12:10:0 |
| 4 | 32,000 | 3,200 | 320 | 32 | 3: 4:0 | 16,000 | 1,600 | 133: 6:8 | 16:13:4 |
| 5 | 40,000 | 4,000 | 400 | 40 | 4: 0:0 | 20,000 | 2,000 | 166:13:4 | 20:16:8 |
| 6 | 48,000 | 4,800 | 480 | 48 | 4:16:0 | 24,000 | 2,400 | 200: 0:0 | 25: 0:0 |
| 7 | 56,000 | 5,600 | 560 | 56 | 5:12:0 | 28,000 | 2,800 | 233: 6:8 | 29: 3:4 |
| 8 | 64,000 | 6,400 | 640 | 64 | 6: 8:0 | 32,000 | 3,200 | 266:13:4 | |
| 9 | 72,000 | 7,200 | 720 | 72 | 7: 4:0 | 36,000 | 3,600 | 300: 0:0 | |
| 10 | | | | | | | | 333: 6:8 | |
| 11 | | | | | | | | 366:13:4 | |

*Table L10³9*

|   | 0 | −1 | −2 | −3 | −4 | S10 | S1 | D | D/8 |
|---|---|---|---|---|---|---|---|---|---|
| 1 | £9,000 | £900 | £90 | £9 | 18/− | £4,500 | £450 | £37:10:0 | £4:13:9 |
| 2 | 18,000 | 1,800 | 180 | 18 | £1:16:0 | 9,000 | 900 | 75: 0:0 | 9: 7:6 |
| 3 | 27,000 | 2,700 | 270 | 27 | 2:14:0 | 13,500 | 1,350 | 112:10:0 | 14: 1:3 |
| 4 | 36,000 | 3,600 | 360 | 36 | 3:12:0 | 18,000 | 1,800 | 150: 0:0 | 18:15:0 |
| 5 | 45,000 | 4,500 | 450 | 45 | 4:10:0 | 22,500 | 2,250 | 187:10:0 | 23: 8:9 |
| 6 | 54,000 | 5,400 | 540 | 54 | 5: 8:0 | 27,000 | 2,700 | 225: 0:0 | 28: 2:6 |
| 7 | 63,000 | 6,300 | 630 | 63 | 6: 6:0 | 31,500 | 3,150 | 262:10:0 | 32:16:3 |
| 8 | 72,000 | 7,200 | 720 | 72 | 7: 4:0 | 36,000 | 3,600 | 300: 0:0 | --- |
| 9 | 81,000 | 8,100 | 810 | 81 | 8: 2:0 | 40,500 | 4,050 | 337:10:0 | --- |
| 10 | --- | --- | --- | --- | --- | --- | --- | 375: 0:0 | --- |
| 11 | --- | --- | --- | --- | --- | --- | --- | 412:10:0 | --- |

*Table L10⁴1*

|   | 0 | −1 | −2 | −3 | −4 | S10 | S1 | D | D/8 |
|---|---|---|---|---|---|---|---|---|---|
| 1 | £10,000 | £1,000 | £100 | £10 | £1 | £5,000 | £500 | £41:13:4 | £5: 4: 2 |
| 2 | 20,000 | 2,000 | 200 | 20 | 2 | 10,000 | 1,000 | 83: 6:8 | 10: 8: 4 |
| 3 | 30,000 | 3,000 | 300 | 30 | 3 | 15,000 | 1,500 | 125: 0:0 | 15:12: 6 |
| 4 | 40,000 | 4,000 | 400 | 40 | 4 | 20,000 | 2,000 | 166:13:4 | 20:16: 8 |
| 5 | 50,000 | 5,000 | 500 | 50 | 5 | 25,000 | 2,500 | 208: 6:8 | 26: 0:10 |
| 6 | 60,000 | 6,000 | 600 | 60 | 6 | 30,000 | 3,000 | 250: 0:0 | 31: 5: 0 |
| 7 | 70,000 | 7,000 | 700 | 70 | 7 | 35,000 | 3,500 | 291:13:4 | 36: 9: 2 |
| 8 | 80,000 | 8,000 | 800 | 80 | 8 | 40,000 | 4,000 | 333: 6:8 | --- |
| 9 | 90,000 | 9,000 | 900 | 90 | 9 | 45,000 | 4,500 | 375: 0:0 | --- |
| 10 | --- | --- | --- | --- | --- | --- | --- | 416:13:4 | --- |
| 11 | --- | --- | --- | --- | --- | --- | --- | 458: 6:8 | --- |

*Table L10⁴2*

|   | 0 | −1 | −2 | −3 | −4 | S10 | S1 | D | D/8 |
|---|---|---|---|---|---|---|---|---|---|
| 1 | £20,000 | £2,000 | £200 | £20 | £2 | £10,000 | £1,000 | £83: 6:8 | 10: 8:4d. |
| 2 | 40,000 | 4,000 | 400 | 40 | 4 | 20,000 | 2,000 | 166:13:4 | 20:16:8 |
| 3 | 60,000 | 6,000 | 600 | 60 | 6 | 30,000 | 3,000 | 250: 0:0 | 31: 5:0 |
| 4 | 80,000 | 8,000 | 800 | 80 | 8 | 40,000 | 4,000 | 333: 6:8 | 41:13:4 |
| 5 | 100,000 | 10,000 | 1,000 | 100 | 10 | 50,000 | 5,000 | 416:13:4 | 52: 1:8 |
| 6 | 120,000 | 12,000 | 1,200 | 120 | 12 | 60,000 | 6,000 | 500: 0:0 | 62:10:0 |
| 7 | 140,000 | 14,000 | 1,400 | 140 | 14 | 70,000 | 7,000 | 583: 6:8 | 72:18:4 |
| 8 | 160,000 | 16,000 | 1,600 | 160 | 16 | 80,000 | 8,000 | 666:13:4 | --- |
| 9 | 180,000 | 18,000 | 1,800 | 180 | 18 | 90,000 | 9,000 | 750: 0:0 | --- |
| 10 | --- | --- | --- | --- | --- | --- | --- | 833: 6:8 | --- |
| 11 | --- | --- | --- | --- | --- | --- | --- | 916:13:4 | --- |

*Table L10⁴3*

|   | 0 | −1 | −2 | −3 | −4 | S10 | S1 | D | D/8 |
|---|---|---|---|---|---|---|---|---|---|
| 1 | £30,000 | £3,000 | £300 | £30 | £3 | £15,000 | £1,500 | £125 | £15:12:6 |
| 2 | 60,000 | 6,000 | 600 | 60 | 6 | 30,000 | 3,000 | 250 | 31: 5:0 |
| 3 | 90,000 | 9,000 | 900 | 90 | 9 | 45,000 | 4,500 | 375 | 46:17:6 |
| 4 | 120,000 | 12,000 | 1,200 | 120 | 12 | 60,000 | 6,000 | 500 | 62:10:0 |
| 5 | 150,000 | 15,000 | 1,500 | 150 | 15 | 75,000 | 7,500 | 625 | 77:12:6 |
| 6 | 180,000 | 18,000 | 1,800 | 180 | 18 | 90,000 | 9,000 | 750 | 93:15:0 |
| 7 | 210,000 | 21,000 | 2,100 | 210 | 21 | 105,000 | 10,500 | 875 | 109: 7:6 |
| 8 | 240,000 | 24,000 | 2,400 | 240 | 24 | 120,000 | 12,000 | 1,000 | --- |
| 9 | 270,000 | 27,000 | 2,700 | 270 | 27 | 135,000 | 13,500 | 1,125 | --- |
| 10 | --- | --- | --- | --- | --- | --- | --- | 1,250 | --- |
| 11 | --- | --- | --- | --- | --- | --- | --- | 1,375 | --- |

*Table L10⁴4*

|   | 0 | −1 | −2 | −3 | −4 | S10 | S1 | D | D/8 |
|---|---|---|---|---|---|---|---|---|---|
| 1 | £40,000 | £4,000 | £400 | £40 | £4 | £20,000 | £2,000 | £166:13:4 | £20:16:8 |
| 2 | 80,000 | 8,000 | 800 | 80 | 8 | 40,000 | 4,000 | 333: 6:8 | 41:13:4 |
| 3 | 120,000 | 12,000 | 1,200 | 120 | 12 | 60,000 | 6,000 | 500: 0:0 | 62:10:0 |
| 4 | 160,000 | 16,000 | 1,600 | 160 | 16 | 80,000 | 8,000 | 666:13:4 | 83: 6:8 |
| 5 | 200,000 | 20,000 | 2,000 | 200 | 20 | 100,000 | 10,000 | 833: 6:8 | 104: 3:4 |
| 6 | 240,000 | 24,000 | 2,400 | 240 | 24 | 120,000 | 12,000 | 1,000: 0:0 | 125: 0:0 |
| 7 | 280,000 | 28,000 | 2,800 | 280 | 28 | 140,000 | 14,000 | 1,166:13:4 | 145:16:4 |
| 8 | 320,000 | 32,000 | 3,200 | 320 | 32 | 160,000 | 16,000 | 1,333: 6:8 | --- |
| 9 | 360,000 | 36,000 | 3,600 | 360 | 36 | 180,000 | 18,000 | 1,500: 0:6 | --- |
| 10 | --- | --- | --- | --- | --- | --- | --- | 1,666:13:4 | --- |
| 11 | --- | --- | --- | --- | --- | --- | --- | 1,833: 6:8 | --- |

Table L10⁴5

|   | 0 | −1 | −2 | −3 | −4 | S10 | S1 | D | D/8 |
|---|---|---|---|---|---|---|---|---|---|
| 1 | £50,000 | £5,000 | £500 | £50 | £5 | £25,000 | £2,500 | £208: 6:8 | £26: 0:10 |
| 2 | 100,000 | 10,000 | 1,000 | 100 | 10 | 50,000 | 5,000 | 416:13:4 | 52: 1: 8 |
| 3 | 150,000 | 15,000 | 1,500 | 150 | 15 | 75,000 | 7,500 | 625: 0:0 | 78: 2: 6 |
| 4 | 200,000 | 20,000 | 2,000 | 200 | 20 | 100,000 | 10,000 | 833: 6:8 | 104: 3: 4 |
| 5 | 250,000 | 25,000 | 2,500 | 250 | 25 | 125,000 | 12,500 | 1,041:13:4 | 130: 4: 2 |
| 6 | 300,000 | 30,000 | 3,000 | 300 | 30 | 150,000 | 15,000 | 1,250: 0:0 | 156: 5: 0 |
| 7 | 350,000 | 35,000 | 3,500 | 350 | 35 | 175,000 | 17,500 | 1,458: 6:8 | 182: 5:10 |
| 8 | 400,000 | 40,000 | 4,000 | 400 | 40 | 200,000 | 20,000 | 1,666:13:4 | |
| 9 | 450,000 | 45,000 | 4,500 | 450 | 45 | 225,000 | 22,500 | 1,875: 0:0 | |
| 10 | | | | | | | | 2,083: 6:8 | |
| 11 | | | | | | | | 2,291:13:4 | |

Table L10⁴6

|   | 0 | −1 | −2 | −3 | −4 | S10 | S1 | D | D/8 |
|---|---|---|---|---|---|---|---|---|---|
| 1 | £60,000 | £6,000 | £600 | £60 | £6 | £30,000 | £3,000 | £250 | £31: 5:0 |
| 2 | 120,000 | 12,000 | 1,200 | 120 | 12 | 60,000 | 6,000 | 500 | 62:10:0 |
| 3 | 180,000 | 18,000 | 1,800 | 180 | 18 | 90,000 | 9,000 | 750 | 93:15:0 |
| 4 | 240,000 | 24,000 | 2,400 | 240 | 24 | 120,000 | 12,000 | 1,000 | 125: 0:0 |
| 5 | 300,000 | 30,000 | 3,000 | 300 | 30 | 150,000 | 15,000 | 1,250 | 166: 5:0 |
| 6 | 360,000 | 36,000 | 3,600 | 360 | 36 | 180,000 | 18,000 | 1,500 | 187:10:0 |
| 7 | 420,000 | 42,000 | 4,200 | 420 | 42 | 210,000 | 21,000 | 1,750 | 218:15:0 |
| 8 | 480,000 | 48,000 | 4,800 | 480 | 48 | 240,000 | 24,000 | 2,000 | |
| 9 | 540,000 | 54,000 | 5,400 | 540 | 54 | 270,000 | 27,000 | 2,250 | |
| 10 | | | | | | | | 2,500 | |
| 11 | | | | | | | | 2,750 | |

Table L10⁴7

|   | 0 | −1 | −2 | −3 | −4 | S10 | S1 | D | D/8 |
|---|---|---|---|---|---|---|---|---|---|
| 1 | £70,000 | £7,000 | £700 | £70 | £7 | £35,000 | £3,500 | £291:13:4 | £36: 9: 2 |
| 2 | 140,000 | 14,000 | 1,400 | 140 | 14 | 70,000 | 7,000 | 583: 6:8 | 72:18: 4 |
| 3 | 210,000 | 21,000 | 2,100 | 210 | 21 | 105,000 | 10,500 | 875: 0:0 | 109: 7: 6 |
| 4 | 280,000 | 28,000 | 2,800 | 280 | 28 | 140,000 | 14,000 | 1,166:13:4 | 145:16: 8 |
| 5 | 350,000 | 35,000 | 3,500 | 350 | 35 | 175,000 | 17,500 | 1,458: 6:8 | 182: 5:10 |
| 6 | 420,000 | 42,000 | 4,200 | 420 | 42 | 210,000 | 21,000 | 1,750: 0:0 | 218:15: 0 |
| 7 | 490,000 | 49,000 | 4,900 | 490 | 49 | 245,000 | 24,500 | 2,041:13:4 | 255: 4: 2 |
| 8 | 560,000 | 56,000 | 5,600 | 560 | 56 | 280,000 | 28,000 | 2,333: 6:8 | |
| 9 | 630,000 | 63,000 | 6,300 | 630 | 63 | 315,000 | 31,500 | 2,625: 0:0 | |
| 10 | | | | | | | | 2,916:13:4 | |
| 11 | | | | | | | | 3,208: 6:8 | |

Table L10⁴8

|   | 0 | −1 | −2 | −3 | −4 | S10 | S1 | D | D/8 |
|---|---|---|---|---|---|---|---|---|---|
| 1 | £80,000 | £8,000 | £800 | £80 | £8 | £40,000 | £4,000 | £333: 6:8 | £41:13:4 |
| 2 | 160,000 | 16,000 | 1,600 | 160 | 16 | 80,000 | 8,000 | 666:13:4 | 83: 6:8 |
| 3 | 240,000 | 24,000 | 2,400 | 240 | 24 | 120,000 | 12,000 | 1,000: 0:0 | 125: 0:0 |
| 4 | 320,000 | 32,000 | 3,200 | 320 | 32 | 160,000 | 16,000 | 1,333: 6:8 | 166:13:4 |
| 5 | 400,000 | 40,000 | 4,000 | 400 | 40 | 200,000 | 20,000 | 1,666:13:4 | 208: 6:8 |
| 6 | 480,000 | 48,000 | 4,800 | 480 | 48 | 240,000 | 24,000 | 2,000: 0:0 | 250: 0:0 |
| 7 | 560,000 | 56,000 | 5,600 | 560 | 56 | 280,000 | 28,000 | 2,333: 6:8 | 291:13:4 |
| 8 | 640,000 | 64,000 | 6,400 | 640 | 64 | 320,000 | 32,000 | 2,666:13:4 | |
| 9 | 720,000 | 72,000 | 7,200 | 720 | 72 | 360,000 | 36,000 | 3,000: 0:0 | |
| 10 | | | | | | | | 3,333 6 8 | |
| 11 | | | | | | | | 3,666:13:4 | |

Table L10⁴9

|   | 0 | −1 | −2 | −3 | −4 | S10 | S1 | D | D/8 |
|---|---|---|---|---|---|---|---|---|---|
| 1 | £90,000 | £9,000 | £900 | £90 | £9 | £45,000 | £4,500 | £375 | £46:17:6 |
| 2 | 180,000 | 18,000 | 1,800 | 180 | 18 | 90,000 | 9,000 | 750 | 93:15:0 |
| 3 | 270,000 | 27,000 | 2,700 | 270 | 27 | 135,000 | 13,500 | 1,125 | 140:12:6 |
| 4 | 360,000 | 36,000 | 3,600 | 360 | 36 | 180,000 | 18,000 | 1,500 | 187:10:0 |
| 5 | 450,000 | 45,000 | 4,500 | 450 | 45 | 225,000 | 22,500 | 1,875 | 234: 7:6 |
| 6 | 540,000 | 54,000 | 5,400 | 540 | 54 | 270,000 | 27,000 | 2,250 | 281: 5:0 |
| 7 | 630,000 | 63,000 | 6,300 | 630 | 63 | 315,000 | 31,500 | 2,625 | 328: 2:6 |
| 8 | 720,000 | 72,000 | 7,200 | 720 | 72 | 360,000 | 36,000 | 3,000 | |
| 9 | 810,000 | 81,000 | 8,100 | 810 | 81 | 405,000 | 40,500 | 3,375 | |
| 10 | | | | | | | | 3,750 | |
| 11 | | | | | | | | 4,125 | |

What I claim is:

1. A machine for calculations involving non-uniform and decimal factors, comprising stored representations of products of all digits of all denominations of the first factor multiplied respectively, by all digits of all denominations of the second factor, said products being expressed in the final non-uniform denominations, a first set-up mechanism for selecting for operation representations corresponding to the desired digits of the desired denominations of the first factor, a second set-up mechanism for selecting for operation representations corresponding to the desired digit of the second factor, a third set-up mechanism for selecting for operation representations corresponding to the desired denomination of the second factor, means for sensing the selected representations, a totalizing register, value-entering means for entering the sensed values either additively or subtractively into the totalizing register, and operating means for actuating the said sensing means and the said value-entering means once during multiplication or division by any set-up digit of the second factor.

2. A calculating machine according to claim 1, comprising a carriage for relative displacement of said representations and of said sensing means, said carriage being displaceable under the control of said third set-up mechanism into a plurality of positions each associated with a denomination of the second factor.

3. A calculating machine according to claim 1, wherein the said representations are mounted on a carriage displaceable under the control of the said third set-up mechanism into a first plurality of positions each associated with a denomination of a decimal second factor, and into a second plurality of positions each associated with a denomination of a non-uniform second factor.

4. In a calculating machine according to claim 1, a carriage on which the said representations are mounted, the said carriage being displaceable relatively to the said sensing means under the control of the said third set-up mechanism into a first plurality of positions each associated with a denomination of a decimal second factor and into a second plurality of positions each associated with a denomination of a non-uniform second factor, and locking means arranged on the said carriage for rendering inoperative representations associated with the said second plurality of positions whilst the carriage is in any one position of the said first plurality, and vice-versa.

5. A calculating machine according to claim 1, wherein the said representations are arranged on a plurality of sets of displaceable members, each set being associated with a denomination of the first factor and each member within a set comprising representations of products of a certain digit of the respective denomination multiplied respectively by all digits of all denominations of the second factor.

6. In a calculating machine according to claim 1, a plurality of sets of members comprising the said representations, each set being associated with a denomination of the first factor and each member within a set being associated with a digit of the respective denomination, the said members being selectively displaceable under the control of the said first set-up mechanism, positioning means controllable by the said second set-up mechanism for displacing selected members of various sets jointly into positions each associated with a digit of the second factor, and means for coupling the selected members to the said positioning means.

7. A calculating machine according to claim 1, wherein the said non-uniform factors are in the sterling numerical system comprising pounds, shillings, pence and fractions of a penny.

8. In a machine for calculations involving sterling and decimal factors, stored representations of products of all digits of all denominations of the first factor multiplied, respectively, by all digits of all denominations of the second factor, said products being expressed in the final sterling denominations, a plurality of sets of displaceable members on which the said representations are arranged, each set being associated with a denomination of the first factor in the sterling numerical system comprising pounds, shillings, pence, and fractions of a penny, each member within a set being associated with a digit of the respective sterling denomination, wherein each member within a set associated with a shillings, pence, or fractions denomination comprises representations of products of the respective digit multiplied by all digits of all denominations of a decimal second factor, whereas each member within a set associated with a pounds denomination comprises representations of products of the respective digit of the respective pounds denomination multiplied by all digits of all denominations of a decimal second factor and also representations of products of the same digit of the respective decimal denomination multiplied by all digits of shillings, pence and fractions-of-penny denominations.

DANIEL BROIDO.

REFERENCES CITED

The following references are of record in the file of this patent:

UNITED STATES PATENTS

| Number | Name | Date |
|---|---|---|
| 1,332,543 | Cluley | Mar. 2, 1920 |
| 1,958,515 | Isherwood | May 15, 1934 |
| 2,113,352 | McClure | Apr. 5, 1938 |
| 2,178,913 | McClure | Nov. 7, 1939 |
| 2,342,529 | Chase | Feb. 22, 1944 |
| 2,379,169 | McClure | June 26, 1945 |
| 2,408,134 | Broido | Sept. 24, 1946 |

FOREIGN PATENTS

| Number | Country | Date |
|---|---|---|
| 542,476 | Great Britain | Jan. 12, 1942 |